United States Patent
Chesla et al.

(10) Patent No.: US 7,681,235 B2
(45) Date of Patent: Mar. 16, 2010

(54) DYNAMIC NETWORK PROTECTION

(75) Inventors: Avi Chesla, Tel-Aviv (IL); Lev Medvedovsky, Tel-Aviv (IL); Abraham Elboim, Tel-Aviv Jaffa (IL)

(73) Assignee: Radware Ltd., Tel-Aviv (IL)

( * ) Notice: Subject to any disclaimer, the term of this patent is extended or adjusted under 35 U.S.C. 154(b) by 1111 days.

(21) Appl. No.: 10/441,971

(22) Filed: May 19, 2003

(65) Prior Publication Data

US 2004/0250124 A1    Dec. 9, 2004

(51) Int. Cl.
G08B 23/00    (2006.01)

(52) U.S. Cl. .......................... 726/23; 726/22

(58) Field of Classification Search ............... 726/23, 726/11, 13, 22
See application file for complete search history.

(56) References Cited

U.S. PATENT DOCUMENTS

| | | | |
|---|---|---|---|
| 5,557,742 A | | 9/1996 | Smaha et al. |
| 5,638,490 A * | | 6/1997 | Eckert et al. .................. 706/4 |
| 5,991,881 A | | 11/1999 | Conklin et al. |
| 6,279,113 B1 | | 8/2001 | Vaidya |
| 6,321,338 B1 | | 11/2001 | Porras et al. |
| 6,370,648 B1 | | 4/2002 | Diep |
| 6,453,345 B2 | | 9/2002 | Trcka et al. |
| 6,487,666 B1 | | 11/2002 | Shanklin et al. |
| 6,519,703 B1 * | | 2/2003 | Joyce ........................ 726/22 |
| 6,622,135 B1 | | 9/2003 | Imbert De Tremiolles et al. |
| 6,715,084 B2 * | | 3/2004 | Aaron et al. ................. 726/23 |
| 6,795,402 B1 | | 9/2004 | Richardson et al. |
| 6,816,910 B1 | | 11/2004 | Ricciulli |
| 7,017,186 B2 * | | 3/2006 | Day ............................. 726/23 |
| 7,028,179 B2 * | | 4/2006 | Anderson et al. ........... 713/154 |
| 7,058,976 B1 * | | 6/2006 | Dark ............................ 726/23 |
| 7,222,366 B2 | | 5/2007 | Bruton, III et al. |
| 7,308,715 B2 | | 12/2007 | Gupta et al. |
| 7,370,357 B2 | | 5/2008 | Sekar |
| 7,454,499 B2 * | | 11/2008 | Cantrell et al. .............. 709/225 |
| 2002/0083175 A1 | | 6/2002 | Afek et al. |
| 2002/0103916 A1 | | 8/2002 | Chen et al. |
| 2002/0107953 A1 | | 8/2002 | Ontiveros et al. |
| 2002/0133586 A1 | | 9/2002 | Shanklin et al. |
| 2003/0014665 A1 | | 1/2003 | Anderson et al. |
| 2003/0145232 A1 * | | 7/2003 | Poletto et al. ................ 713/201 |
| 2004/0025044 A1 * | | 2/2004 | Day ............................ 713/200 |
| 2004/0093513 A1 * | | 5/2004 | Cantrell et al. .............. 713/201 |
| 2004/0098617 A1 | | 5/2004 | Sekar |
| 2004/0162994 A1 * | | 8/2004 | Cohen et al. ................ 713/201 |
| 2004/0196792 A1 | | 10/2004 | Davies et al. |
| 2005/0111460 A1 | | 5/2005 | Sahita |

FOREIGN PATENT DOCUMENTS

JP    2003218949    7/2003

OTHER PUBLICATIONS

"Characterizing and Tracing Packet Floods Using Cisco Routers" (C)1999 Cisco Systems Inc. Publication date of Oct. 13, 1999 verfied by the Internet Archive at http://www.archive.org. Full URL at http://web.archive.org/web/19991013090842/http://cisco.com/warp/public/707/22.html.*

(Continued)

Primary Examiner—Joe Pan
Assistant Examiner—Thomas Gyorfi
(74) Attorney, Agent, or Firm—Darby & Darby P.C.

(57) ABSTRACT

A method for protecting a network from an attack includes measuring a property of traffic entering the network, and analyzing the property using at least one fuzzy logic algorithm in order to detect the attack.

66 Claims, 26 Drawing Sheets

OTHER PUBLICATIONS

"CERT Coordination Center: Denial of Sevice Attacks" (C)1997, 1999 Carnegie Mellon University. Full URL at http://www.cert.org/tech_tips/denial_of_service.html.*

Web page "Fuzzy Firewalls" published Aug. 13, 2002 pp. 1-9 http://lists.netfilter.org/pipermail/netfilter-devel/2002-August/008999.html.*

Web page "Netfilter/iptables—Home" Publication date of Mar. 28, 2002 verified by the Internet Archive http://web.archive.org/web/20020328182656/http://www.netfilter.org/.*

Google Code Search: source code to patch-2.4.21-bk-1.1141-pom-20030429-base (published Apr. 29, 2003) http://www.google.com/codesearch?hl=en&q=+ipt_fuzzy.c+show:1tR9P_jh6Qg:-SXb2hm1P3E:pMlwdk_xmjo&sa=N&cd=12&ct=rc&cs_p=http://linux.1wt.eu&cs_f=kernel/patches-2.4.20-wt17/in/patch-2.4.21-bk-1.1141-pom-20030429-base#a0.*

Red Hat Linux 8.0 Official Security Guide, Chapter 7: Firewalls. Published Dec. 16, 2002 as verified by Internet Archive http://web.archive.org/web/20021216100349/http://www.redhat.com/docs/manuals/linux/RHL-8.0-Manual/security-guide/ch-fw.html.*

B. Irwin. "Reclaiming one's bandwidth: Dynamic filtering of traffic based on packet payload content" Published Jun. 2000. http://homes.cs.ru.ac.za/B.Irwin/research/Barry_irwin-dynamic-filtering_SACLA2002.pdf.*

"PacketShaper® Features (for Packetwise 5.2)" Document version dated Feb. 20, 2002. http://www.packetshaper.com/documentation/packetguide/5.3.0/documents/psFeatures.pdf.*

"Netfilter/iptables—security/2002-04-02-icmp-dnat.body" web page dated Apr. 2, 2002 (8 pages.) http://web.archive.org/web/20020601145514/http://www.netfilter.org/security/2002-04-02-icmp-dnat.html.*

Mguyen HT et al., A First Course in Fuzzy Logic, Second Edition, CRC Press (Jul. 1999).

Fuzzy Logic Toolbox For Use with MATLAB®, User's Guide Version 2, The Math Works, Inc., Natick, MA (Jul. 2002).

Hines JW, Fuzzy and Neural Approaches in Engineering, Wile-Interscience (Jan. 1997).

J.E. Dickerson, et al.; Fuzzy Network Profiling for Intrusion Detection; Proc. of NAFIPS 10th Int. Conf. of the North American Fuzzy Information Processing Society; pp. 301-306; Jul. 2000.

Milos Manic, et al., Fuzzy Preference Approach for Computer Network Attack Detection; IEEE, pp. 1345-1349, 2001.

Levent Ertoz, et al., Detection and Summarization of Novel Network Attacks Using Data Mining, pp. 1-20; AHPCRC Technical Report 2003.

German Florez, et al., An Improved Algorithm for Fuzzy Data Mining for Intrusion Detection; Proc. of the 2002 North American Fuzzy Information Processing Society (NAPIPS) Jun. 2002.

L.J. Kohout al., Activity Profiles for Intrusion Detection, 2002 Annual Meeting of the North American Fuzzy Information Processing Society Proceedings; Jun. 2002.

Cynthia S. Hood, et al., Proactive Network Fault Detection, INFOCOM'97, Sixteenth Annual Joint Conference of the IEEE Computer and Communications Societies Proceedings IEEE; pp. 1147-1155, Apr. 1997.

Dr. Myron L. Cramer, et al., New Methods Intrusion Detection using Control-Loop Measurement; Fourth Technology for Information Security Conf. 1996, Houston, Texas, pp. 1-8.

http://www.www.phrack.org/phrack, 2005, pp. 1-21.

Paul Barford, et al., A Signal Analysis of Network Traffic Anomalies; Proc. of the 2nd ACM SIGCOMM Workshop on internet measurement, Session 3, pp. 71-82, 2002.

R. Sekar, et al., Specification-based Anomaly Detection: A New Approach for Detecting Network Intrusions, CCS '02, Nov. 18-22, 2002, Washington, USA, pp. 265-274.

Steven T. Eckmann, et al., STATL; An Attack Language for State-based Intrusion Detection; J. Comput. Secur. Vo. 10, No. 1-2, 2002.

Ho-Yen Chang, et al., Real-Time Protocol Analysis for Detecting Link-State Routing Protocol Attacks, ACM Trans. On Information and System Security, vol. 4, Issue 1, 2001; pp. 1-36.

C.C. Michael et al., Simple State-bases approaches to Program-bases Anomaly Detection, ACM Trans. On Information and System Security, vol. 5, Issue 3, Aug. 2002, pp. 203-237.

Koral Ilgun, et al., State Transition Analysis: A Rule-Based Intrusion Detection Approach, IEEE Trans. On Software Engineering, vol. XX, No. Y, Month 1995, pp. 1-22.

Philip Andrew Porras; A State Transition Analysis Tool for Intrusion Detection; University of California, 1992.

Wang, Haining et at, "Detecting SYN Flooding Attacks". 2002.

Mirlcovic. Jelena, "D-WARD: DDoS Network Attack Recognition and Defense", Jan. 2002.

Tzerefos, P. et al. "A Comparative Study of Simple Mail Transfer Protocol (SMfP), Post Office Protocol (POP) and *XAOO* Electronic Mail Protocols", 1997 IEEE.

Ohsita, Yuichi. et at. "Detecting Distributed Denial-of-Service Attacks by Analyzing TCP SYN Packets Statistically", Nov.-Dec. 2004.

Peng, Tao, et al., "Detecting Distributed Denial of Service Attacks Using source IP Address Monitoring", Nov. 2002.

Stevens, W. Richard et al. TCP/IP Illustrated, vol. 2: The Implementation. ©1995 Addison Wesley Professional excerpt from pp. 758-760.

* cited by examiner

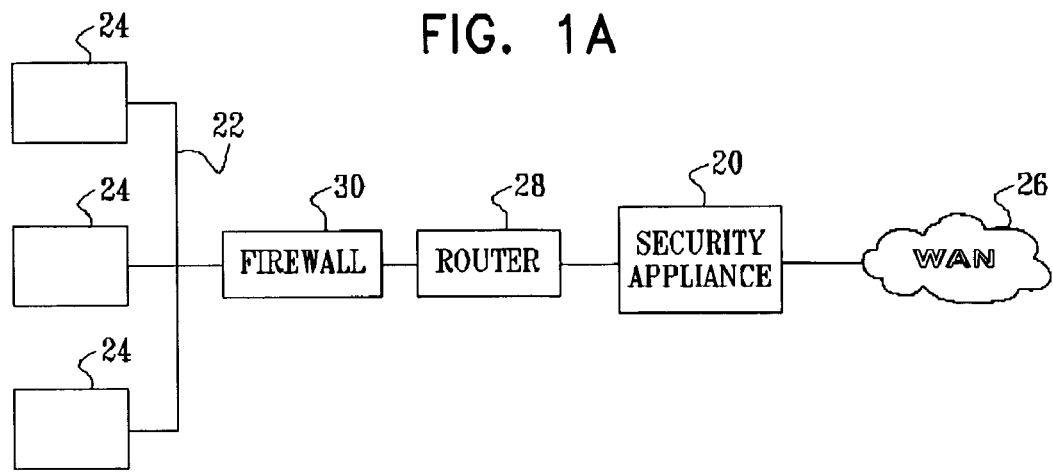
FIG. 1A
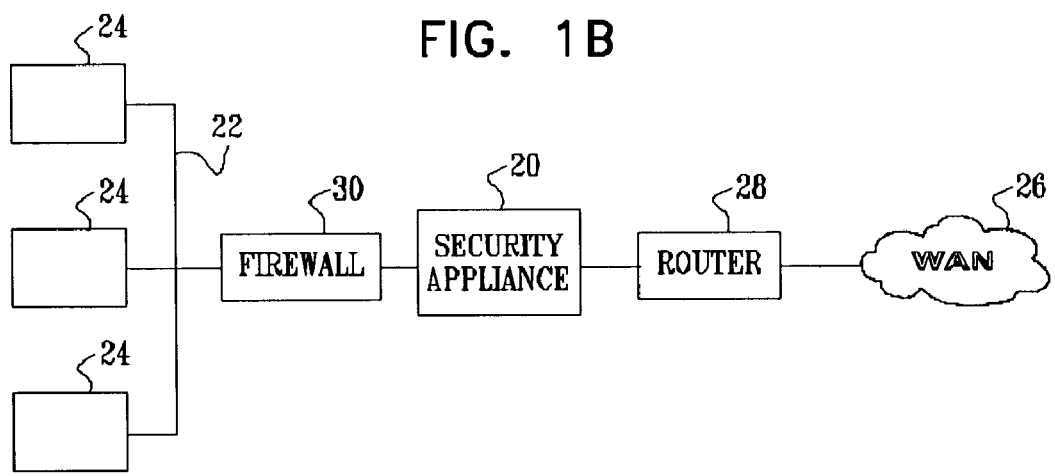
FIG. 1B
FIG. 1C
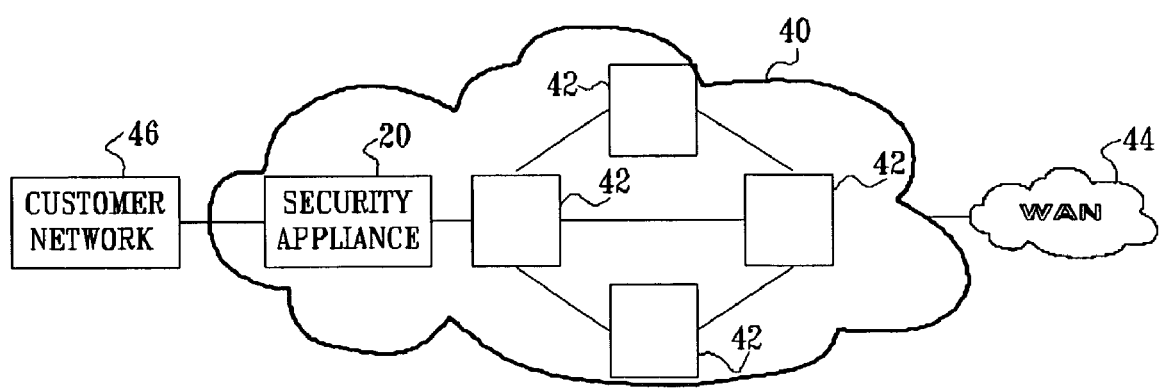

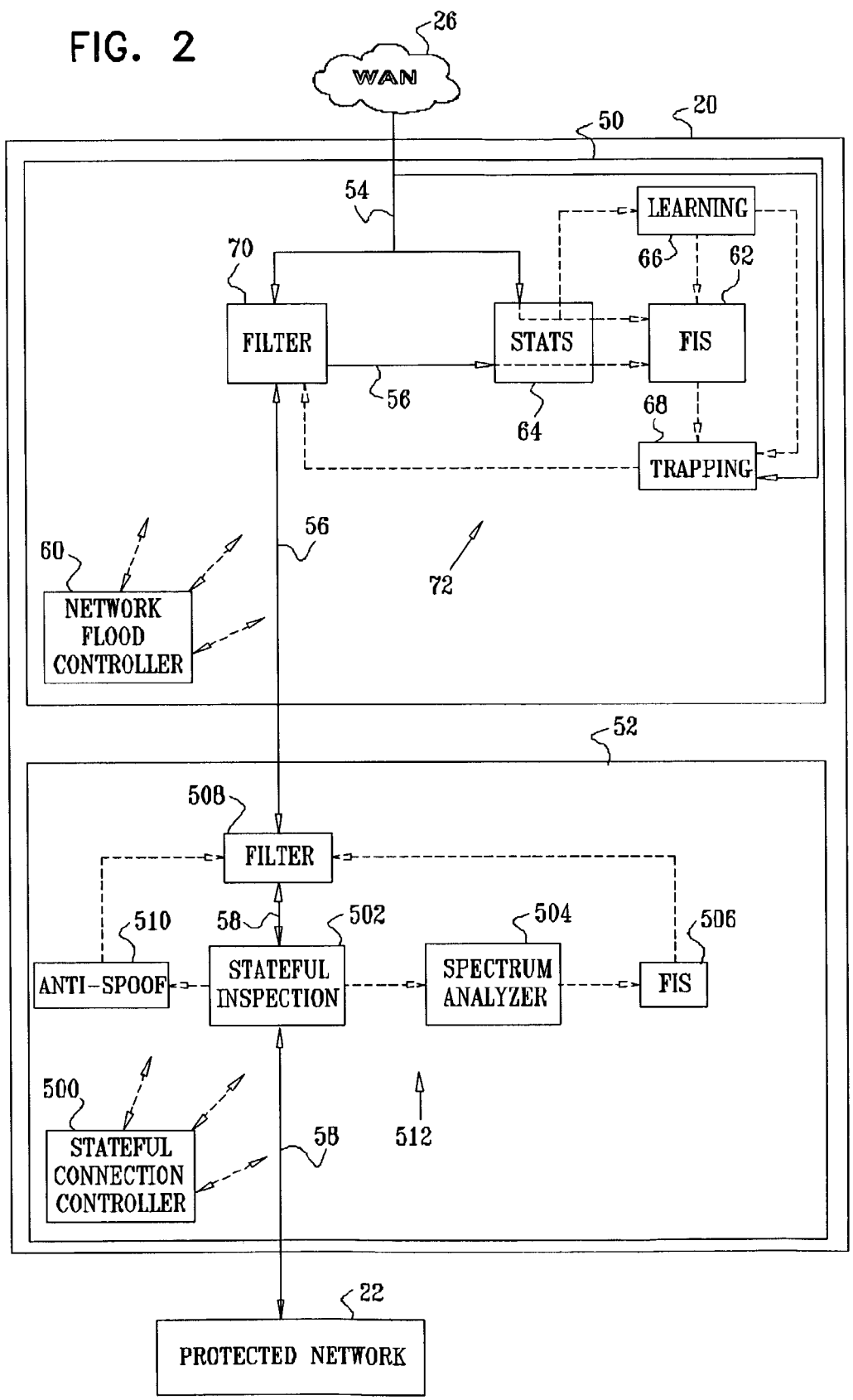

FIG. 9A

| STATE | ATTACK INDICATED | ACTIONS | COMMENTS |
|---|---|---|---|
| TRAP BUFFERS | NO | RETURN TO DETECTION STATE (NORMAL STATE); RESET ALL PARAMETERS. | ATTACK STOPPED |
| FILTERING | NO | INCREMENT NON-ATTACK COUNTER; TRANSITION TO SUB-HIERARCHY OR CONVERGENCE STATE ACCORDING TO NON-ATTACK COUNTER CONDITION (AFTER STATE TIMEOUT) HIERARCHY COUNTER = CONST - 1; RESET ATTACK COUNTER; REDUCE SESSION TIME-OUT ACCORDING TO PROTOCOL TYPE. | GOOD&STABLE SIGNATURES |
| SUB-HIERARCHY | NO | OPTIMIZE FILTERING FEEDBACK; REDUCE SESSION TIME-OUT ACCORDING TO PROTOCOL TYPE. | OPTIMIZATION PROCESS |
| CONVERGENCE | NO | IF ANALYSIS OF UNFILTERED TRAFFIC INDICATES AN ATTACK: HIERARCHY COUNTER = CONST - 1; RESET ATTACK COUNTER. | GOOD SIGNATURE LOCK; ATTACK IN PROGRESS |
| | | IF ANALYSIS OF UNFILTERED TRAFFIC DOES NOT INDICATE AN ATTACK: RETURN TO DETECTION STATE ACCORDING TO STABLE COUNTER; RESET ATTACK COUNTER. | ATTACK WAS STOPPED |
| COLLECTIVE BLOCKING | NO | STOP COLLECTIVE BLOCK; RESET HIERARCHY COUNTER; TRANSITION TO TRAP BUFFERS STATE. | ATTACK WAS STOPPED |
| ... | ... | ... | ... |

FIG. 9B

| STATE | ATTACK INDICATED | ACTIONS | COMMENTS |
|---|---|---|---|
| ... | ... | ... | ... |
| TRAP BUFFERS | YES | REDUCE SESSION HANDLERS' TIMEOUT ACCORDING TO ATTACK TYPE | ATTACK SIGNATURES DETECTION DURATION |
| FILTERING | YES | TRANSITION CONDITION TO CONVERGENCE STATE STATE AFTER 3 SECONDS (NON-ATTACK COUNTER); INCREMENT ATTACK COUNTER; TRANSITION TO TRAP BUFFERS STATE ACCORDING TO ATTACK COUNTER CONDITION; REDUCE SESSION TIMEOUT ACCORDING TO PROTOCOL TYPE. | NON-STABLE PROCESS |
| SUB-HIERARCHY | YES | OPTIMIZATION OF FILTERING FEEDBACK; REDUCE SESSION TIMEOUT ACCORDING TO PROTOCOL TYPE. | OPTIMIZATION PROCESS |
| CONVERGENCE | YES | INCREMENT ATTACK COUNTER; TRANSITION TO TRAP BUFFERS STATE ACCORDING TO ATTACK COUNTER CONDITION. | BAD SIGNATURE DETECTION OR SIGNATURE HAS CHANGED |
| COLLECTIVE BLOCKING | YES | DO NOTHING. | ATTACK IN PROGRESS |

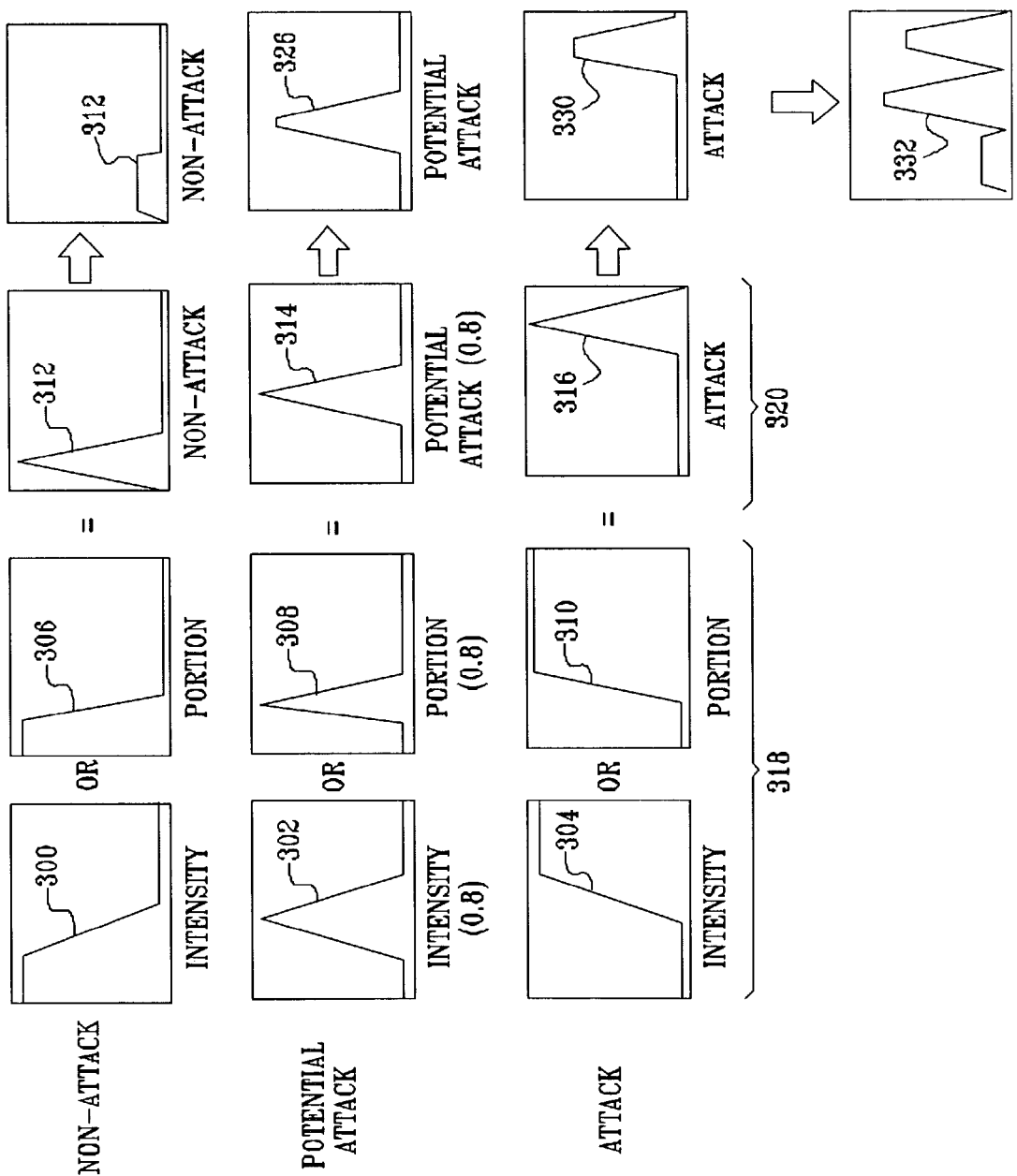

| SIGNATURE TYPE | PROBABILITY ($\Omega \equiv M$) | BUFFER SIZE ($N_{trap}$) | OBLIVION TIME [SEC] ($\Delta t_{ob}$) |
|---|---|---|---|
| TCP SEQUENCE NUMBER | $2^{32}$ | 50 | 1 |
| IP IDENTIFICATION NUMBER | $2^{16}$ | 50 | 1 |
| SOURCE PORT | $2^{16}$ | 50 | 0.2 |
| SOURCE IP ADDRESS | $2^{31}$ | 50 | 0.1 |
| DESTINATION UNDEFINED PORT | $2^{16}$ | 50 | 1 |
| DESTINATION UNDEFINED IP ADDRESS | $2^{31}$ | 50 | 1 |
| PACKET SIZE | $2^{16}$ | 50 | 0.1 |
| TRANSPORT CHECKSUM | $2^{16}$ | 50 | 1 |
| DNS ID NUMBER | $2^{16}$ | 50 | 1 |

390            FIG. 17B

| SIGNATURE TYPE | BUFFER SIZE ($N_{trap}$) | REFRESH TIME [SEC] ($\Delta t_{ob}$) | THRESHOLD ($N_{block}$) $\beta_i$ ≡ Signature_intensity_factor |
|---|---|---|---|
| ICMP MESSAGE TYPE | 16 | 1 | $I_{PPS} \times \beta_i$ |
| DESTINATION DEFINED PORT | 50 | 1 | $I_{PPS} \times \beta_i$ |
| DESTINATION DEFINED ADDRESS | 50 | 1 | $I_{PPS} \times \beta_i$ |
| TYPE OF SERVICE | 256 | 1 | $I_{PPS} \times \beta_i$ |
| TIME-TO-LIVE (TTL) | 256 | 1 | $I_{PPS} \times \beta_i$ |
| DNS QCOUNT | 2 | 1 | $I_{PPS} \times \beta_i$ |

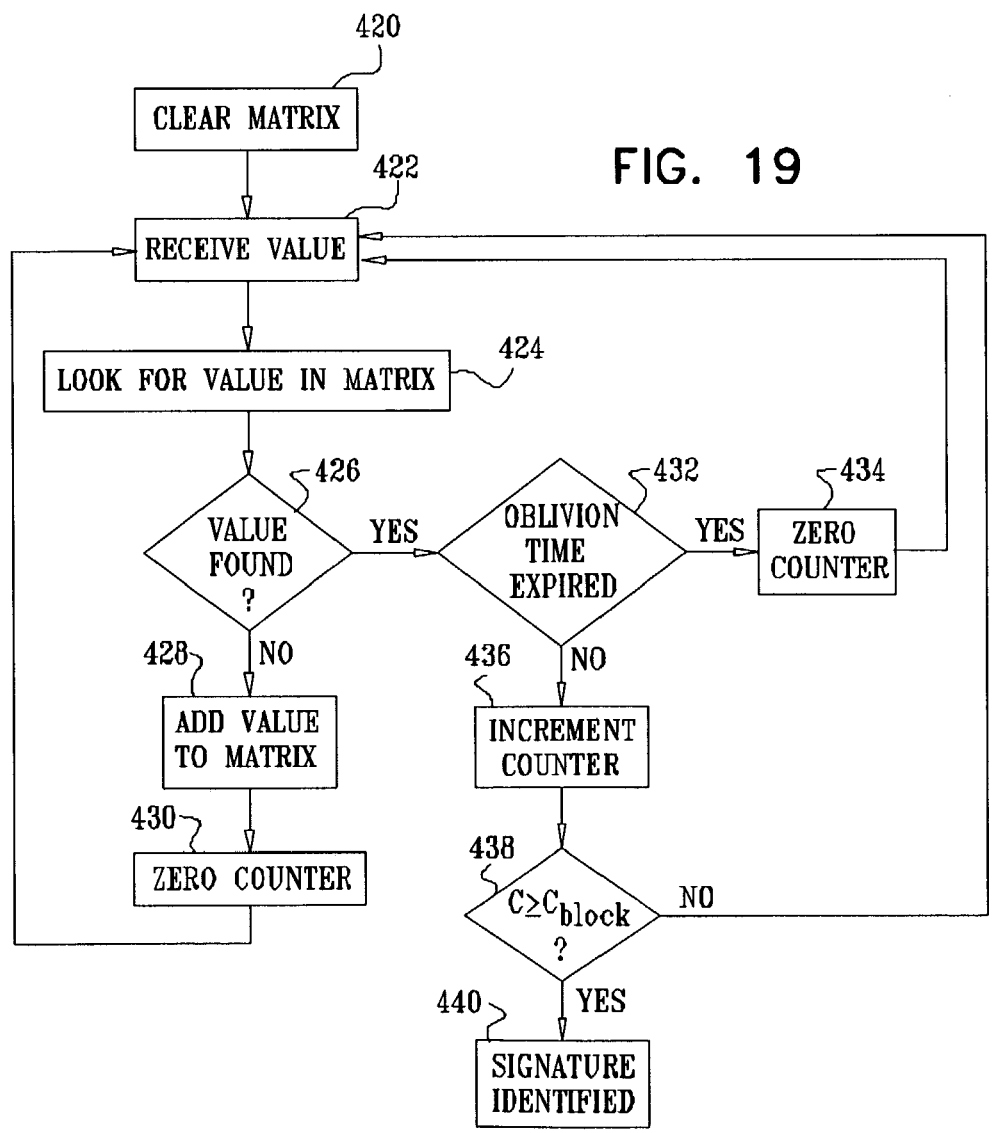

FIG. 23A

| STATE | ATTACK INDICATED | I>M ? | TIC>U ? | STABIL COUNTER>T ? | ATTACK CEASED ? | ACTION | FEEDBACK |
|---|---|---|---|---|---|---|---|
| DETECTION | YES | | | | | TRANSITION TO MISUSE STATE; RESET NON-ATTACK COUNTER | MISUSE STARTED |
| MISUSE | YES | NO | NO | | | RESET NON-ATTACK COUNTER; INCREMENT TIC | MISUSE CONTINUES |
| MISUSE | YES | NO | YES | | | RESET NON-ATTACK COUNTER; INCREMENT TIC | MISUSE CONTINUES |
| MISUSE | YES | YES | | | | RESET TIC; TRANSITION TO BLOCKING STATE; SET STABIL COUNTER TO 4; BLOCK ONE SOURCE FROM SORT BUFFER; RESET CONNECTIONS; RESET STATE EXPIRATION TIME (2) | ATTACK STARTED |
| MISUSE | NO | | | | | | NO ATTACK ACTIVITY AT THE MOMENT (ATTACK WILL BE CLOSED BY NON-ATTACK COUNTER) |
| ... | ... | ... | ... | ... | ... | | |

FIG. 23B

| STATE | ... | ATTACK INDICATED | I>M ? | ... | TIC>U ? | STABIL COUNTER>T ? | ... | ATTACK CEASED ? | ACTION | ... | FEEDBACK |
|---|---|---|---|---|---|---|---|---|---|---|---|
| BLOCKING | | YES | YES | | | YES | | | BLOCK NEXT TWO ADDRESSES IN SORT BUFFER; UPDATE STATE EXP TIME (2); RESET STABIL COUNTER | | DISTRIBUTED ATTACK; STABLE NEGATIVE FEEDBACK |
| BLOCKING | | YES | | | | NO | | | INCREMENT STABIL COUNTER | | DISTRIBUTED ATTACK; STABLE NEGATIVE FEEDBACK |
| BLOCKING | | YES | NO | | | YES | | | TRANSITION TO MISUSE STATE; REMOVE ADDRESSES FROM BLOCK LIST; RESET NON-ATTACK COUNTER | | NO ADDRESS WITH ENOUGH INTENSITY TO BLOCK; MISUSE ACTIVATIES |
| BLOCKING | | YES | NO | | | NO | | | INCREMENT STABIL COUNTER | | STABLE NEGATIVE FEEDBACK |
| BLOCKING | | NO | | | | | | NO | DO NOTHING | | GOOD BLOCKING DECISION (POSITIVE FEEDBACK) |
| BLOCKING | | NO | | | | | | YES | TRANSITION TO MISUSE STATE | | ATTACK STOPPED FEEDBACK |

|   | PAYLOAD GROUP |   |   |   |   |   |   |
|---|---|---|---|---|---|---|---|
|   | 1 | 2 | 3 | 4 | 5 | 6 | 7 |
| 1 | 16.01 | 8.02 | 4.28 | 0.34 | 0.08 | 0.00 | 0.00 |
| 2 | 7.98 | 4.56 | 4.45 | 4.06 | 2.64 | 2.89 | 2.40 |
| 3 | 4.12 | 3.00 | 2.00 | 5.65 | 3.89 | 1.98 | 4.37 |
| 4 | 0.98 | 5.33 | 2.56 | 3.11 | 2.22 | 4.97 | 1.05 |
| 5 | 3.81 | 1.32 | 1.29 | 3.26 | 4.43 | 3.14 | 3.52 |
| 6 | 4.18 | 3.06 | 3.24 | 2.59 | 4.57 | 1.40 | 3.51 |

FREQUENCY GROUP

FIG. 26

| BANDWIDTH RANGE [Mbit/sec] | ICMP | | UDP | | | TCP | | |
|---|---|---|---|---|---|---|---|---|
| | QUOTA (%) | NORMAL FACTOR | MIN | QUOTA (%) | NORMAL FACTOR | MIN | QUOTA (%) | NORMAL FACTOR | SYN MIN | TCP MIN |

| BANDWIDTH RANGE [Mbit/sec] | QUOTA (%) | NORMAL FACTOR | MIN | QUOTA (%) | NORMAL FACTOR | MIN | QUOTA (%) | NORMAL FACTOR | SYN MIN | TCP MIN |
|---|---|---|---|---|---|---|---|---|---|---|
| 100≥B>80 | 5 | 0.1 | 0.0015 | 50 | 0.4 | 0.02 | 75 | 0.014 | 0.002 | 0.004 |
| 80≥B>20 | 5 | 0.1 | 0.0015 | 50 | 0.4 | 0.02 | 75 | 0.014 | 0.002 | 0.004 |
| 40≥B>20 | 5 | 0.1 | 0.0025 | 50 | 0.4 | 0.025 | 75 | 0.02 | 0.003 | 0.006 |
| 20≥B>10 | 5 | 0.1 | 0.0025 | 50 | 0.4 | 0.075 | 75 | 0.03 | 0.006 | 0.012 |
| 10≥B>8 | 10 | 0.1 | 0.005 | 50 | 0.4 | 0.075 | 75 | 0.04 | 0.01 | 0.02 |
| 8≥B>6 | 10 | 0.1 | 0.005 | 50 | 0.5 | 0.07 | 80 | 0.04 | 0.01 | 0.02 |
| 6≥B>4 | 10 | 0.1 | 0.006 | 50 | 0.5 | 0.1 | 80 | 0.04 | 0.01 | 0.02 |
| 4≥B>2 | 20 | 0.1 | 0.008 | 50 | 0.5 | 0.1 | 80 | 0.06 | 0.01 | 0.02 |
| 2≥B>1 | 30 | 0.1 | 0.015 | 60 | 0.5 | 0.2 | 90 | 0.07 | 0.02 | 0.04 |
| 1≥B>512Kbit | 50 | 0.1 | 0.025 | 70 | 0.6 | 0.2 | 90 | 0.12 | 0.03 | 0.06 |
| 512Kbit≥B≥256Kbit | 60 | 0.1 | 0.03 | 80 | 0.6 | 0.25 | 100 | 0.18 | 0.05 | 0.1 |
| 256Kbit≥B>0 | 100 | 0.1 | 0.03 | 100 | 0.6 | 0.3 | 100 | 0.18 | 0.07 | 0.14 |

900

DYNAMIC NETWORK PROTECTION

FIELD OF THE INVENTION

The present invention relates generally to computer networks, and specifically to methods and apparatus for protecting networks from malicious traffic.

BACKGROUND OF THE INVENTION

Computer networks often face malicious attacks originating from public networks. Such attacks currently include pre-attack probes, worm propagation, network flooding attacks such as denial of service (DoS) and distributed DoS (DDOS) attacks, authorization attacks, and operating system and application scanning. In order to evade detection, attackers may utilize spoofed IP addresses.

Attackers often mount pre-attack probes as reconnaissance prior to attempting an attack. Using such probes, the attacker typically attempts to map the structure of the target network, probe firewall access-list policies, determine server operating systems, and/or uncover running services, applications, remote connections, and maintenance backdoors.

Worms are self-replicating programs that spread over public networks, typically by exploiting security flaws in common services. Some worms, such as Code Red and Nimba, utilize scanning mechanisms for finding vulnerable systems to infect. During an authorization attack, the attacker automatically and rapidly sends a large number of possible passwords to a server or application, in an attempt to determine the correct password.

DoS and DDOS attacks dispatch large numbers of network packets or application requests, in order to overwhelm victim bandwidth, network resources, and/or victim servers, resulting in denial of services to legitimate users. Examples of DoS/DDoS attacks include Internet Control Message Protocol (ICMP) flood attacks, User Datagram Protocol (UDP) flood attacks, and Transmission Control Protocol (TCP) SYN flood attacks. During an ICMP flood attack, the attacker attempts to saturate the victim network by sending a continuous stream of ICMP echo requests to one or more hosts on the network. The hosts respond with ICMP echo replies. The continuous requests and responses may overwhelm network bandwidth. During a UDP flood attack, the attacker attempts to saturate a random port of a host in a protected network with UDP packets. The host attempts to determine which application is listening on the port. When the host determines that no application is listening on the port, the host returns an ICMP packet to the forged IP address notifying the sender that the destination port is unreachable. As in an ICMP flood attack, the continuous requests and responses may overwhelm network bandwidth.

Some TCP SYN flood attacks are stateless, i.e., the attacker does not attempt to establish a connection with a particular host, but rather attempts to generally flood the victim network with SYN packets. Other SYN flood attacks are stateful. In these attacks, the attacker sends multiple SYN packets from one or more spoofed addresses to a victim host. The victim host responds to each SYN packet by sending a SYN/ACK packet to the spoofed address, and opens a SYN_RECVD state, which consumes host CPU resources. The attacker never responds with the expected ACK packet. As a result, the host's resources are consumed and unavailable for legitimate operations.

NAPTHA is a stateful DoS attack in which the attacker opens multiple connections with a victim host, and leaves the connections open indefinitely (or until the host times out the connections). To open each connection, the attacker participates in the normal three-way TCP handshake (SYN, SYN/ACK, ACK), resulting in an ESTABLISHED state on the victim host. NAPTHA also may attempt to block the victim host from closing the connections. To close a connection, the host sends a FIN packet to the attacker, and enters the FIN_WAIT-1 state. The attacker does not respond with the expected ACK packet, causing some hosts to remain in the FIN_WAIT-1 state, until the connection eventually times out.

Common systems used to protect networks at their peripheries include firewalls and intrusion detection systems (IDSs). Firewalls examine packets arriving at an entry to the network in order to determine whether or not to forward the packets to their destinations. Firewalls employ a number of screening methods to determine which packets are legitimate. IDSs typically provide a static signature database engine that includes a set of attack signature processing functions, each of which is configured to detect a specific intrusion type. Each attack signature is descriptive of a pattern which constitutes a known security violation. The IDS monitors network traffic by sequentially executing every processing function of a database engine for each data packet received over a network.

U.S. Pat. No. 6,487,666 to Shanklin et al., which is incorporated herein by reference, describes a method for describing intrusion signatures, which are used by an intrusion detection system to detect attacks on a local network. The signatures are described using a "high level" syntax having features in common with regular expression and logical expression methodology. These high level signatures may then be compiled, or otherwise analyzed, in order to provide a process executable by a sensor or other processor-based signature detector.

U.S. Pat. No. 6,279,113 to Vaidya, which is incorporated herein by reference, describes a signature-based dynamic network IDS, which includes attack signature profiles that are descriptive of characteristics of known network security violations. The attack signature profiles are organized into sets of attack signature profiles according to security requirements of network objects on a network. Each network object is assigned a set of attack signature profiles, which is stored in a signature profile memory together with association data indicative of which sets of attack signature profiles correspond to which network objects. A monitoring device monitors network traffic for data addressed to the network objects. Upon detecting a data packet addressed to one of the network objects, packet information is extracted from the data packet. The extracted information is utilized to obtain a set of attack signature profiles corresponding to the network object based on the association data. A virtual processor executes instructions associated with attack signature profiles to determine if the packet is associated with a known network security violation. An attack signature profile generator is utilized to generate additional attack signature profiles configured for processing by the virtual processor in the absence of any corresponding modification of the virtual processor.

U.S. Pat. No. 6,453,345 to Trcka et al., which is incorporated herein by reference, describes a network security and surveillance system that passively monitors and records the traffic present on a local area network, wide area network, or other type of computer network, without interrupting or otherwise interfering with the flow of the traffic. Raw data packets present on the network are continuously routed (with optional packet encryption) to a high-capacity data recorder to generate low-level recordings for archival purposes. The raw data packets are also optionally routed to one or more cyclic data recorders to generate temporary records that are used to automatically monitor the traffic in near-real-time. A set of analysis applications and other software routines allows authorized users to interactively analyze the low-level traffic recordings to evaluate network attacks, internal and external security breaches, network problems, and other types of network events.

U.S. Pat. No. 6,321,338 to Porras et al., which is incorporated herein by reference, describes a method for network surveillance, the method including receiving network packets handled by a network entity and building at least one long-term and a least one short-term statistical profile from a measure of the network packets that monitors data transfers, errors, or network connections. A comparison of the statistical profiles is used to determine whether the difference between the statistical profiles indicates suspicious network activity.

U.S. Pat. No. 5,991,881 to Conklin et al., which is incorporated herein by reference, describes techniques for network surveillance and detection of attempted intrusions, or intrusions, into the network and into computers connected to the network. The system performs: (a) intrusion detection monitoring, (b) real-time alert, (c) logging of potential unauthorized activity, and (d) incident progress analysis and reporting. Upon detection of any attempts to intrude, the system initiates a log of all activity between the computer elements involved, and sends an alert to a monitoring console. When a log is initiated, a primary surveillance system continues to monitor the network. The system also starts a secondary monitoring process, which interrogates the activity log in real-time and sends additional alerts reporting the progress of the suspected intruder.

US Patent Application Publications 2002/0107953 to Ontiveros et al. and 2002/0133586 to Shanklin et al., which are incorporated herein by reference, describe a method for protecting a network by monitoring both incoming and outgoing data traffic on multiple ports of the network, and preventing transmission of unauthorized data across the ports. The monitoring system is provided in a non-promiscuous mode and automatically denies access to data packets from a specific source based upon an associated rules table. All other packets from sources not violating the rules are allowed to use the same port. The system provides for dynamic writing and issuing of firewall rules by updating the rules table. Information regarding the data packets is captured, sorted and cataloged to determine attack profiles and unauthorized data packets.

US Patent Application Publication 2002/0083175 to Afek et al., which is incorporated herein by reference, describes techniques for protecting against and/or responding to an overload condition at a victim node in a distributed network. The techniques include diverting traffic otherwise destined for the victim node to one or more other nodes, which can filter the diverted traffic, passing a portion of the traffic to the victim node, and/or effect processing of one or more of the diverted packets on behalf of the victim.

SUMMARY OF THE INVENTION

In embodiments of the present invention, a dynamic network security system detects and filters malicious traffic entering a protected network. The security system uses adaptive fuzzy logic algorithms to analyze traffic patterns in real-time, in order to detect anomalous traffic patterns indicative of an attack. The system periodically adapts the fuzzy logic algorithms to the particular baseline traffic characteristics of the protected network.

Upon detection of an attack, the network security system determines characteristic parameters of the anomalous traffic, and then filters new traffic entering the network using these parameters. The system uses a feedback control loop in order to determine the effectiveness of such filtering, by comparing the expected and desired results of the filtering. Based on the feedback, the system adjusts the filtering rules appropriately, so as to generally optimize the blocking of malicious traffic, while minimizing the blocking of legitimate traffic. The security system typically uses these techniques for protecting against stateless DoS or DDOS network flood attacks, such as UDP, ICMP, and stateless SYN flood attacks.

In some embodiments of the present invention, the security system additionally performs stateful inspection of traffic entering the protected network. The system applies signal processing techniques to perform spectral analysis of traffic patterns of users within the protected network. The system analyzes the results of the spectral analysis using adaptive fuzzy logic algorithms, in order to detect stateful connection attacks, such as NAPTHA flood attacks. Upon detection of an attack, the system filters incoming packets to block the attack. As noted above, the system uses a feedback control loop in order to determine the effectiveness of the filtering and adjust the filtering rules appropriately.

The security system is typically configured to screen incoming traffic in two layers. In the first layer, the system implements the network flood detection and filtering described hereinabove. The system passes the filtered traffic to the second layer, in which the system implements the stateful connection attack detection and filtering. Filtered traffic from the second layer is passed to the protected network. The use of stateless inspection in the first layer, which generally consumes less CPU and memory resources, enables the system to perform the broad and rapid analysis of high volumes of packets that is necessary for detecting network flood attacks. On the other hand, the use of stateful inspection in the second layer, which generally requires greater CPU and memory resources, is typically possible because stateful connection attacks are generally not characterized by high volumes or rates of packet delivery.

The security system is typically implemented as a network appliance deployed on the perimeter of the protected network, and may be located outside a firewall that also protects the network. The security system typically comprises several modules and a controller, which coordinates the operations of the modules. These modules generally include at least one attack detection module, at least one signature detection module, and at least one filtering module.

The controller is typically implemented as a finite state machine. The controller makes transitions between states according to predetermined rules, responsively to its current operational state and to real-time input from the modules. The controller is typically connected together with the attack detection module in a feedback loop, and thereby continuously receives input indicating the effectiveness of filtering in light of current attack levels and characteristics.

In some embodiments of the present invention, the attack detection module uses fuzzy logic to detect anomalous traffic patterns. The fuzzy logic implements adaptive algorithms, so that the sensitivity of its fuzzy decision engine is continually tuned to fit characteristics of the protected network. The adaptive algorithms typically include Infinite Impulse Response (IIR) filters, which continually average traffic parameters and shape fuzzy logic membership functions accordingly. The use of fuzziness for representing the quantitative features monitored for intrusion detection generally smoothes the abrupt separation of abnormality from normality, providing a measure of the degree of abnormality or normality of a given feature.

In some embodiments of the present invention, when the attack detection module determines that an attack is occurring, the signature detection module uses trap buffers in order to characterize the attack. The signature detection module typically characterizes the attack by using statistical analysis to develop one or more signatures of packets participating in the attack, such as values of one or more packet header fields, or, in some cases, information from the packet payload, e.g., a UDP DNS query string. The intrusion response module filters incoming traffic participating in the attack, using the signatures developed by the signature detection module The security system is adaptive, automatically reacting to changes in characteristics of an attack during the attack's life cycle. Unlike conventional IDSs, the security system does not use signature-based attack detection. Such conventional signature-based attack detection uses attack signature profiles that are descriptive of characteristics of a known network security violations.

There is therefore provided, in accordance with an embodiment of the present invention, a method for protecting a network from an attack, the method including:

measuring a property of traffic entering the network; and analyzing the property using at least one fuzzy logic algorithm in order to detect the attack.

In an embodiment of the present invention, analyzing the property includes analyzing the property in order to detect a level of the attack.

In an embodiment of the present invention, the traffic includes packets, traffic participating in the attack includes packets of a certain protocol type, and analyzing the property includes fuzzifying, using one or more fuzzy membership functions, a ratio of a number of the packets of the certain protocol type entering the network to a total number of the packets of the traffic entering the network.

For some applications, analyzing the property includes fuzzifying a time-related property of the traffic using one or more fuzzy membership functions. Analyzing the property may includes fuzzifying a rate of the traffic using the fuzzy membership functions.

In an embodiment of the present invention, the method includes measuring an outbound property of traffic exiting the network, analyzing the property includes analyzing the property of the traffic entering the network using at least a first fuzzy logic algorithm, and analyzing the outbound property using at least a second fuzzy logic algorithm. For some applications, the traffic entering the network includes User Datagram Protocol (UDP) packets, and the traffic exiting the network includes Internet Control Message Protocol (ICMP) packets. The outbound property may include a comparison of a number of inbound UDP packets and a number of outbound ICMP packets.

In an embodiment of the present invention, the method includes filtering the traffic entering the network in order to block traffic participating in the attack. Typically, analyzing the property includes analyzing the filtered traffic using the at least one fuzzy logic algorithm. Filtering the traffic may include determining at least one parameter characteristic of the participating traffic, and filtering the traffic by blocking traffic characterized by the parameter. For some applications, filtering the traffic includes performing an analysis of the filtered traffic using the at least one fuzzy logic algorithm, and modifying the at least one parameter responsively to the analysis.

For some applications, the traffic includes packets, the at least one parameter is a member of a set of a plurality of parameters, and determining the at least one parameter includes counting occurrences of packets characterized by each of the plurality of parameters in the traffic, and designating one of the plurality of parameters as the at least one parameter when a number of occurrences of the packets characterized by the one of the plurality of parameters exceeds a threshold value. Designating the one of the plurality of parameters as the at least one parameter may include determining the number of occurrences occurred within a certain period of time.

Alternatively or additionally, the at least one parameter includes at least a first parameter and a second parameter, and filtering the traffic includes:

determining the first parameter and the second parameter;

applying a traffic filter to block the traffic characterized by the first parameter;

using the at least one fuzzy logic algorithm, performing an analysis of the filtered traffic; and responsively to the analysis, modifying the filter so as to block the traffic characterized by at least one of the first parameter and the second parameter.

The first and second parameters are typically selected such that a greater portion of the traffic is characterized by the second parameter than by the first parameter.

In an embodiment of the present invention, the at least one parameter includes at least a first parameter and a second parameter, and filtering the traffic includes:

determining the first parameter;

filtering the traffic by blocking the traffic characterized by the first parameter;

performing an analysis of the filtered traffic using the at least one fuzzy logic algorithm; and responsively to the analysis, determining the second parameter and filtering the traffic by blocking the traffic characterized by both the first parameter and the second parameter.

For some applications, the traffic includes packets having packet header fields, and the at least one parameter includes a value of one of the packet header fields. The one of the packet header fields may be selected from a list consisting of: Transmission Control Protocol (TCP) sequence number, Internet Protocol (IP) identification number, source port, source IP address, type of service (ToS), packet size, Internet Control Message Protocol (ICMP) message type, destination undefined port, destination undefined IP address, destination defined port, destination defined IP address, time-to-live (TTL), and transport layer checksum. Alternatively or additionally, the traffic includes packets having payloads, and the at least one parameter includes a value of one of the packet payloads.

For some applications, analyzing the property includes detecting a first type of attack, filtering the traffic includes blocking the traffic participating in the attack of the first type, and analyzing the property further includes analyzing the filtered traffic to detect a second type of attack. The method may include filtering the filtered traffic in order to block the traffic participating in the attack of the second type. Alternatively or additionally, analyzing the filtered traffic includes: measuring a time-related property of the filtered traffic; transforming the time-related property of the filtered traffic into a frequency domain; and analyzing the property in the frequency domain in order to detect the attack of the second type. The first type of attack may include a network flood attack, and the second type of attack includes a stateful protocol attack.

For some applications, the attack includes a network flood attack. The network flood attack may include a User Datagram Protocol (UDP) flood attack, an Internet Control Message Protocol (ICMP) flood attack, a Transmission Control Protocol (TCP) SYN flood attack, a mixed protocol flood attack, a fragmented flood attack, and/or a stateful protocol attack.

In an embodiment of the present invention, analyzing the property includes determining at least one baseline characteristic of the traffic, and adapting the at least one fuzzy logic algorithm responsively to the baseline characteristic. For some applications, determining the at least one baseline characteristic includes applying Infinite Impulse Response (IIR) filtering to at least one parameter of the traffic. Determining the at least one baseline characteristic may include determining separate baseline characteristics for each hour of a week.

For some applications, adapting the at least one fuzzy logic algorithm includes adapting at least one input membership function of the at least one fuzzy logic algorithm, responsively to the baseline characteristic. The at least one input membership function may include an attack input membership function, and adapting the at least one fuzzy logic algorithm includes setting a parameter of the attack input membership function responsively to a maximum bandwidth of a connection between the protected network and a wide-area network from which the traffic enters the protected network.

For some applications, the traffic participating in the attack includes the packets of a particular protocol type, and the baseline characteristic is an average normal rate of packets of the traffic of the particular protocol type, and adapting the at least one fuzzy logic algorithm includes setting a further parameter of the attack input membership function responsively to a relation between the average normal rate and the maximum bandwidth.

In an embodiment of the present invention, measuring the property includes measuring a time-related property of the traffic, and analyzing the property includes transforming the time-related property of the traffic into a frequency domain, and analyzing the property in the frequency domain in order to detect the attack.

In an embodiment of the present invention, measuring the property includes determining a parameter characteristic of the traffic, and analyzing the property includes fuzzifying the parameter using an input membership function of the at least one fuzzy logic algorithm. The input membership function may include at least one of a non-attack input membership function, a potential attack input membership function, and an attack input membership function.

For some applications, determining the parameter includes measuring a first parameter and a second parameter characteristic of the traffic, and fuzzifying the parameter includes:

fuzzifying the first parameter and the second parameter using the input membership function, so as to determine a first degree of membership and a second degree of membership in the input membership function for the first parameter and the second parameter, respectively; and combining the first degree of membership and the second degree of membership in order to determine a combined degree of membership.

Combining the first degree of membership and the second degree of membership may include determining the combined degree of membership using a logical OR operation. Analyzing the property may further include applying the combined degree of membership to an output membership function. Applying the combined degree of membership may include applying a truncation fuzzy implication rule.

For some applications, fuzzifying the parameter includes determining a degree of membership using the input membership function, and analyzing the property further includes applying the degree of membership to an output membership function. Applying the degree of membership to the output membership function may include applying the degree of membership to at least one of a non-attack output membership function, a potential attack output membership function of the at least one fuzzy logic algorithm, and an attack output membership function of the at least one fuzzy logic algorithm. Analyzing the property may further include defuzzifying the output membership function in order to produce a value indicative of a degree of the attack.

In an embodiment of the present invention, analyzing the property includes defuzzifying an output membership function of the at least one fuzzy logic algorithm, in order to produce a value indicative of a degree of the attack.

In an embodiment of the present invention, the traffic includes packets, traffic participating in the attack includes the packets of a certain protocol type, and analyzing the property includes fuzzifying, using one or more fuzzy membership functions, (a) a ratio of a number of the packets of the certain protocol type entering the network to a total number of the packets of the traffic entering the network, and (b) a rate of arrival of the packets of the certain protocol type.

There is also provided, in accordance with an embodiment of the present invention, method for protecting a network from an attack, the method including:

measuring a time-related property of traffic entering the network;

transforming the time-related property of the traffic into a frequency domain; and analyzing the property in the frequency domain in order to detect the attack.

In an embodiment of the present invention, measuring the time-related property includes measuring arrival times of packets, and transforming the time-related property includes determining a spectrum of packet arrival frequency. Alternatively or additionally, measuring the time-related property includes measuring lengths of arriving data packets. For some applications, measuring the time-related property includes applying an infinite impulse response (IIR) filter to measurements of the time-related property.

For some applications, measuring the time-related property includes measuring rates of arriving data packets on each of a plurality of network connections, and analyzing the property includes determining a spectral distribution of packet frequencies among the plurality of network connections.

In an embodiment of the present invention, analyzing the property includes constructing and analyzing a matrix of packet arrival intensity in the frequency domain. For some applications, constructing the matrix includes expressing lengths of arriving data packets on a first axis of the matrix, and rates of arriving data packets on a second axis of the matrix.

For some applications, analyzing the property further includes dividing the matrix into regions characterized by different degrees of packet arrival intensity, and selecting the packet arrival intensity of one of the regions to analyze as an indicator of the attack. Selecting the packet arrival intensity may include selecting the one of the regions that has a greatest packet arrival intensity.

In an embodiment of the present invention, analyzing the property further includes dividing the matrix into regions characterized by different degrees of packet arrival intensity, and computing a ratio of (a) a first sum of the packet arrival intensities over a first portion of the regions to (b) a second sum of the packet arrival intensities over a second portion of the regions.

In an embodiment of the present invention, analyzing the property includes determining at least one frequency-domain characteristic of the traffic, and applying at least one fuzzy logic algorithm to the frequency-domain characteristic in order to detect the attack. Applying the at least one fuzzy logic algorithm may include analyzing the frequency domain characteristic in order to detect a level of the attack.

For some applications, analyzing the property includes determining at least one baseline characteristic of the traffic, and adapting the at least one fuzzy logic algorithm responsively to the baseline characteristic. Adapting the at least one fuzzy logic algorithm may include adapting at least one input membership function of the at least one fuzzy logic algorithm, responsively to the baseline characteristic. Analyzing the property may include determining a level of noise of the traffic in the frequency domain, and adapting the at least one fuzzy logic algorithm responsively to the level of the noise. Analyzing the property may include defuzzifying an output membership function of the at least one fuzzy logic algorithm, in order to produce a value indicative of a degree of the attack.

In an embodiment of the present invention, measuring the time-related property includes observing packets arriving on connections of a stateful protocol. For some applications, analyzing the property includes constructing and analyzing a matrix of packet arrival intensity in the frequency domain, the packet arrival intensity is expressed in terms of a number of the connections. Analyzing the matrix may include identifying as suspect the connections contributing to a high value of the arrival intensity in a region of the matrix. For some applications, determining one or more source addresses of the connections identified as suspect, and blocking the traffic entering the network from the one or more source addresses. The stateful protocol may include a Transmission Control Protocol (TCP).

In an embodiment of the present invention, the attack includes a stateful connection attack. The stateful connection attack may include a stateful Transmission Control Protocol (TCP) SYN flood attack, a NAPTHA flood attack, a Simple Mail Transfer Protocol (SMTP) HELO flood attack, a File Transfer Protocol (FTP) flood attack, a Post Office Protocol (POP) flood attack, and/or a Internet Message Access Protocol (IMAP) flood attack.

In an embodiment, the method includes filtering the traffic entering the network in order to block traffic participating in the attack. For some applications, filtering the traffic includes determining one or more source Internet Protocol (IP) addresses of the traffic participating in the attack, and filtering the traffic by blocking traffic having the determined source IP addresses.

For some applications, measuring the time-related property includes observing packets arriving on connections of a stateful protocol from a plurality of source Internet Protocol (IP) addresses, and determining the one or more source IP addresses participating in the attack includes:

determining that one or more of the connection are misused, by analyzing the property in the frequency domain; and identifying the one or more source IP addresses participating in the attack by counting the misused connections per each of the plurality of source IP addresses.

There is further provided, in accordance with an embodiment of the present invention, apparatus for protecting a network from an attack, including a network security processor, which is adapted to measure a property of traffic entering the network, and to analyze the property using at least one fuzzy logic algorithm in order to detect the attack.

Typically, the network security processor is not assigned an Internet Protocol (IP) address.

There is still further provided, in accordance with an embodiment of the present invention, apparatus for protecting a network from an attack, including a network security processor, which is adapted to measure a time-related property of traffic entering the network, to transform the time-related property of the traffic into a frequency domain, and to analyze the property in the frequency domain in order to detect the attack.

Typically, the network security processor is not assigned an Internet Protocol (IP) address.

There is additionally provided, in accordance with an embodiment of the present invention, a computer software product for protecting a network from an attack, the product including a computer-readable medium in which program instructions are stored, which instructions, when read by a computer, cause the computer to measure a property of traffic entering the network, and to analyze the property using at least one fuzzy logic algorithm in order to detect the attack.

There is still additionally provided, in accordance with an embodiment of the present invention, a computer software product for protecting a network from an attack, the product including a computer-readable medium in which program instructions are stored, which instructions, when read by a computer, cause the computer to measure a time-related property of traffic entering the network, to transform the time-related property of the traffic into a frequency domain, and to analyze the property in the frequency domain in order to detect the attack.

There is also provided, in accordance with an embodiment of the present invention, a computer network including:

a plurality of nodes, which are coupled to receive communication traffic from sources outside the network; and a network security device, which is coupled to measure a property of the traffic entering the network, and to analyze the property using at least one fuzzy logic algorithm in order to detect an attack on the network.

There is further provided, in accordance with an embodiment of the present invention, a computer network including:

a plurality of nodes, which are coupled to receive communication traffic from sources outside the network; and a network security device, which is coupled to measure a time-related property of traffic entering the network, to transform the time-related property of the traffic into a frequency domain, and to analyze the property in the frequency domain in order to detect the attack.

The present invention will be more fully understood from the following detailed description of embodiments thereof, taken together with the drawings, in which:

BRIEF DESCRIPTION OF THE DRAWINGS

FIGS. 1A and 1B are block diagrams that schematically illustrate a network security system deployed at the periphery of a protected network, in accordance with embodiments of the present invention;

FIG. 1C is a block diagram that schematically illustrates a network security system deployed at the periphery of an Internet Service Provider (ISP) facility, in accordance with an embodiment of the present invention;

FIG. 2 is a block diagram that schematically illustrates an architecture of a network security system, in accordance with an embodiment of the present invention;

FIGS. 9A and 9B are a table summarizing actions of the network flood controller in various states, in accordance with an embodiment of the present invention;

FIG. 13 is a set of graphs illustrating an exemplary application of fuzzy rules, implication, and aggregation in detecting an attack on a protected network, in accordance with an embodiment of the present invention;

FIGS. 17A and 17B are tables that set forth certain properties of trap buffers, in accordance with an embodiment of the present invention;

FIG. 18 is a schematic illustration of a trap buffer, in accordance with an embodiment of the present invention;

FIG. 19 is a flow chart that schematically illustrates a method for populating a matrix, in accordance with an embodiment of the present invention;

FIGS. 23A and 23B are a table summarizing actions of the stateful connection controller in various states, in accordance with an embodiment of the present invention;

FIG. 25 is a chart showing exemplary matrix indices of a spectrum matrix, in accordance with an embodiment of the present invention; and FIG. 26 is a table setting forth default values useful for determining baseline parameters, in accordance with an embodiment of the present invention.

DETAILED DESCRIPTION OF EMBODIMENTS

Figure 3:
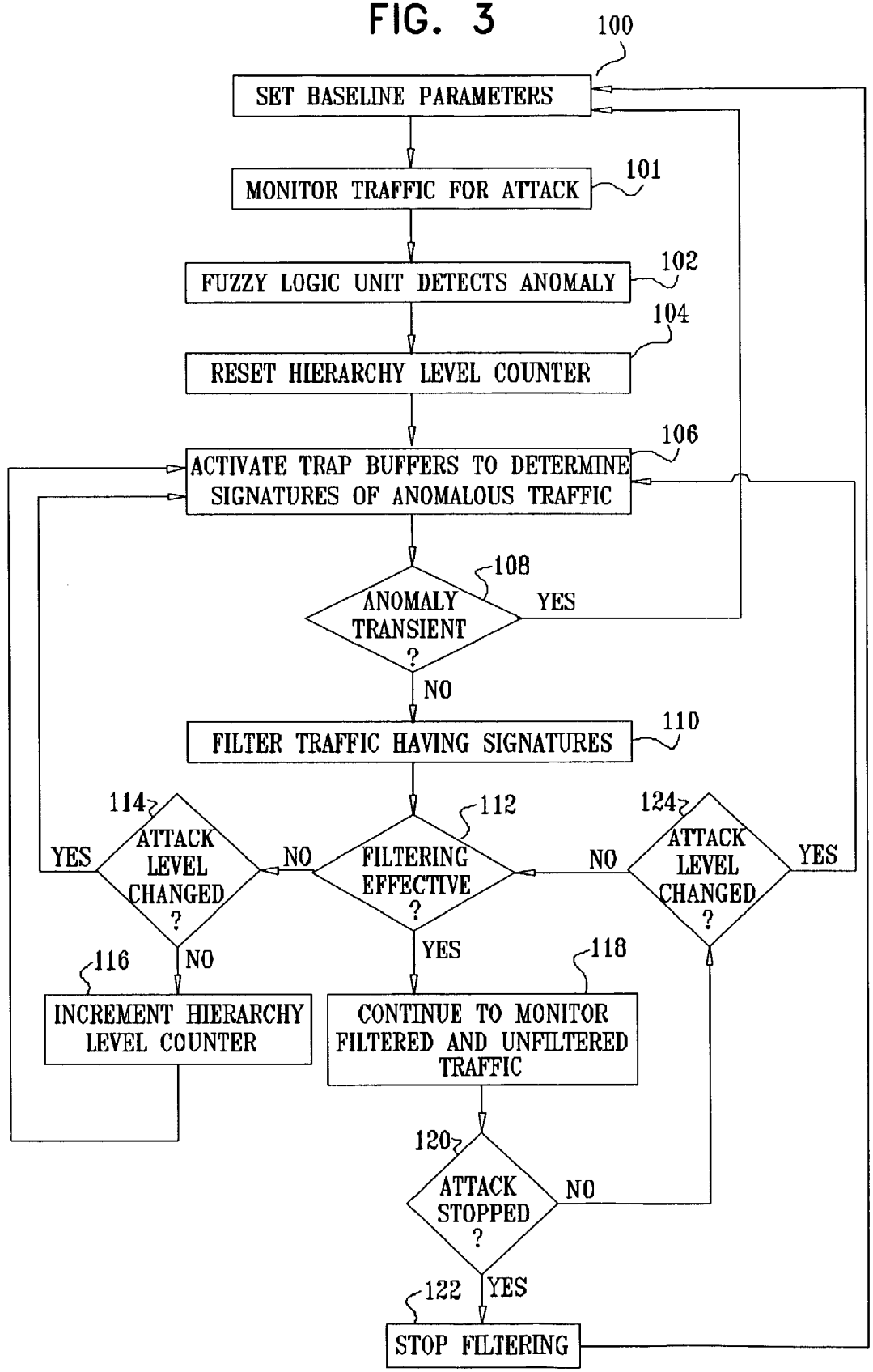
FIG. 3 is a flow chart that schematically illustrates a method for detecting and filtering an attack on a protected network, in accordance with an embodiment of the present invention.

FIGS. 1A and 1B are block diagrams that schematically illustrate a network security system 20 deployed at the periphery of a protected network 22, in accordance with embodiments of the present invention. Protected network 22 comprises various network elements 24, such as servers, clients, routers, switches, and bridges, connected by one or more local-area networks (LANs). Protected network 22 may be a private network, for example, such as an enterprise or campus network. The protected network is connected to a wide-area network (WAN) 26, such as the Internet, through at least one router 28. At least one firewall 30 is typically deployed at the periphery of protected network 22, between the protected network and router 28. Security system 20 may be deployed between router 28 and WAN 26, as shown in FIG. 1A, or between firewall 30 and router 28, as shown in FIG. 1B. Alternatively, system 20 may be deployed in front of a group of one or more network elements 24, such as in front of a critical server, in order to provide protection to the group of elements (configuration not shown). Further alternatively, system 20 may be deployed between two WANs (configuration not shown).

FIG. 1C is a block diagram that schematically illustrates network security system 20 deployed at the periphery of an Internet Service Provider (ISP) facility 40, in accordance with an embodiment of the present invention. The ISP facility typically comprises various network elements 42, such as routers, switches, bridges, servers, and clients. ISP 40 is connected to at least one WAN 44, typically the Internet, and many customer networks, such as a customer network 46. ISP 40 typically deploys security system 20 between the periphery of the ISP facility and customer network 46. The ISP may, for example, offer customers the security protection provided by system 20 as a managed service.

Security system 20 is typically implemented as a network appliance. The appliance typically is not assigned an IP address. As a result, the appliance is generally transparent to attackers, and therefore not subject to attack. The appliance typically supports multiple physical interfaces, such as 100 BaseT and 10BaseT Ethernet, V.35, E1, T1 and T3.

Security system 20 may comprise a general-purpose computer, which is programmed in software to carry out the functions described herein. The software may be downloaded to the computer in electronic form, over a network, for example, or it may alternatively be supplied to the computer on tangible media, such as CD-ROM. Alternatively, security system 20 may be implemented in dedicated hardware logic, or using a combination of hardware and software elements. The security system may be a standalone unit, or it may alternatively be integrated with other communication or computing equipment, such as router 28 or firewall 30.

FIG. 2 is a block diagram that schematically illustrates an architecture of security system 20, in accordance with an embodiment of the present invention. Security system 20 comprises a network flood protection module 50, and, optionally, a stateful connection protection module 52. Network flood protection module 50 receives unfiltered traffic 54 from WAN 26, and analyzes and filters the traffic to prevent network flood attacks, as described hereinbelow. Network flood protection module 50 passes filtered traffic 56 to stateful connection module 52, which analyzes and further filters traffic 56 to prevent stateful connection attacks. Alternatively, in embodiments of the present invention that do not comprises stateful connection protection module 52, network flood protection module 50 passes filtered traffic 56 to protected network 22. Stateful connection protection module 52 passes further-filtered traffic 58 to protected network 22. (Solid lines in the figure represent packet traffic flow, while dashed lines represent control data flow.)

The Network Flood Protection Module

Overview

Network flood protection module 50 comprises at least one network flood controller 60, which controls and coordinates the operation of the components of the network flood protection module. Network flood protection module 50 also typically comprises the following components:
- a fuzzy logic inference (FIS) module 62, which uses fuzzy logic to detect attacks;
- a real-time statistics module 64, which collects and analyzes real-time information regarding traffic;
- a learning module 66, which analyzes the collected statistics in order to develop adaptive baseline parameters for use by FIS module 62;
- a trapping module 68, which characterizes attacks detected by FIS module 62, and generates a set of rules based on the characterization; and
- a filtering module 70, which selectively filters incoming packets based on the rules generated by trapping module 68.

FIS module 62, trapping module 68, and filtering module 70 are arranged in a closed feedback loop 72, under the control of network flood controller 60, as described hereinbelow. Network flood protection module 50 typically comprises a separate network flood controller and set of modules for each different type of network flood attack against which the module is configured to protect.

Reference is now made to FIG. 3, which is a flow chart that schematically illustrates, in overview, a method for detecting and filtering an attack on protected network 22, in accordance with an embodiment of the present invention. Each of the steps of this method is described in more detail hereinbelow with reference to the specific component in which the step is implemented.

Before beginning attack detection, network flood protection module 50 sets baseline parameters for use by FIS module 62, at a set baseline parameters step 100. Network flood protection module 50 typically directs statistics module 64 to collect statistics regarding traffic parameters. Learning module 66 analyzes the collected statistics in order to develop adaptive baseline parameters for use by FIS module 62. This statistics collection and analysis typically occurs at all times other than during a detected attack. Alternatively, in order to begin network protection prior to performing sufficient baseline learning, network flood protection module 50 sets the baseline parameters using configurable default values, as described hereinbelow with reference to FIG. 26. During operation of the system, learning module 66 typically adjusts these baseline parameters based on input from statistics module 64.

Once the baseline parameters have been set, network flood protection module 50 directs FIS module 62 to monitor traffic from WAN 26 in order to detect an attack, at an attack monitoring step 101. The occurrence of an attack leads FIS module 62 to detect a traffic anomaly, at an anomaly detection step 102. In order to detect the anomaly, the FIS module uses one or more fuzzy logic algorithms, adapted responsively to baseline patterns developed by learning module 66.

Network flood module 50 begins the process of protecting against the detected attack by resetting a hierarchy counter, at a counter reset step 104. The module uses this counter to control the level of filtering in feedback loop 72, as described immediately hereinbelow. At a trap buffer step 106, network flood controller 60 activates trapping module 68 to determine as many signatures, i.e., characteristic parameters, of the anomalous traffic, as is possible. The trapping module uses a number of different signature types, which are ordered in a hierarchy from most to least restrictive, i.e., most to least narrow.

For a brief period of time, typically between about 5 and about 10 seconds, the network flood controller continues to monitor output from FIS module 62, in order to confirm that the detected anomaly is not transient, at a transient anomaly check step 108. If the anomaly is determined to be transient, the controller resumes statistics collection at step 100 and attack monitoring at step 101. Typically, the controller performs step 108 during only the first cycle of feedback loop 72 for each detected attack.

On the other hand, if the anomaly is not transient, filtering module 70 filters incoming traffic, at a filtering step 110, using the signatures determined by trapping module 68 at step 106. The controller directs the filtering module to select the number of signature types to use based on the value of the hierarchy counter. When the counter is at its initial, lowest level, the filtering module uses a relatively narrow set of signatures, in order to minimize the likelihood of blocking legitimate traffic (i.e., false positives). As the counter is incremented, as described hereinbelow with reference to step 116, the intensity of filtering provided by the signatures is gradually increased. Network flood controller 60 directs FIS module 62 to evaluate the filtered traffic to determine whether the filtering is effective in stopping the attack, at a filtering effectiveness check step 112. If the FIS module determines that the attack is continuing despite the filtering, the controller determines whether the attack level has changed, at a attack level change check step 114. A change in the attack level (negative feedback) is interpreted either as an indication that the nature of the attack has changed, or as an indication that a second, independent attack has begun in addition to the attack already detected. In either case, the method returns to step 106 for new trapping to address the new attack or the modified old attack, as the case may be.

If the attack level has not changed, however, the controller increments the hierarchy counter, at an increment counter step 116. Because the attack level has not changed, the controller assumes that the same attack is continuing, but that the intensity of the current filtering is insufficient for effective attack prevention. The method returns to step 106, at which the trapping module again determines signatures, in case they have changed since the last determination. Filtering module 70 applies stricter filtering rules, responsively to the higher counter, at step 110. This feedback loop continues to tighten the filtering, if necessary, until the hierarchy counter reaches its maximum value, which is typically equal to the number of different signature types available, as described hereinbelow with reference to FIGS. 17A and 17B. If the filtering remains ineffective after these iterations, the controller typically directs the filtering module to take more drastic traffic blocking steps, such as blocking all traffic of a certain protocol, to a certain port, or from a certain IP address.

On the other hand, if the network flood controller determined at step 112 that the filtering was effective, i.e., the degree of the attack decreased as a result of filtering, the controller reacts to this positive feedback by increasing the filtering period and continuing to monitor the attack, at an attack monitoring step 118. In order to determine whether the attack is continuing, the controller directs FIS module 62 to evaluate both unfiltered traffic from WAN 26 and filtered traffic from filtering module 70. The level of attack in both of these streams is compared, at an attack stop check step 120. If both streams are evaluated as not containing an attack, the controller directs the filtering module to discontinue filtering, at a stop filtering step 122, and the controller resumes statistics collection at step 100 and attack monitoring at step 101. On the other hand, if the attack continues, the controller checks whether the attack level has increased, at a attack level check step 124. A change in the attack level is interpreted either as an indication that the nature of the attack has changed, or as an indication that a second, independent attack has begun in addition to the attack already detected. In either case, the method returns to step 106 for new trapping to address the new attack or the modified old attack, as the case may be.

If the network flood controller finds at step 124, however, that the attack level has not changed, the method returns to step 112 to reassess the effectiveness of filtering. This repeated reassessment of filtering generally enables the system to react quickly to changes in attack characteristics.

The Network Flood Controller

Figure 4:
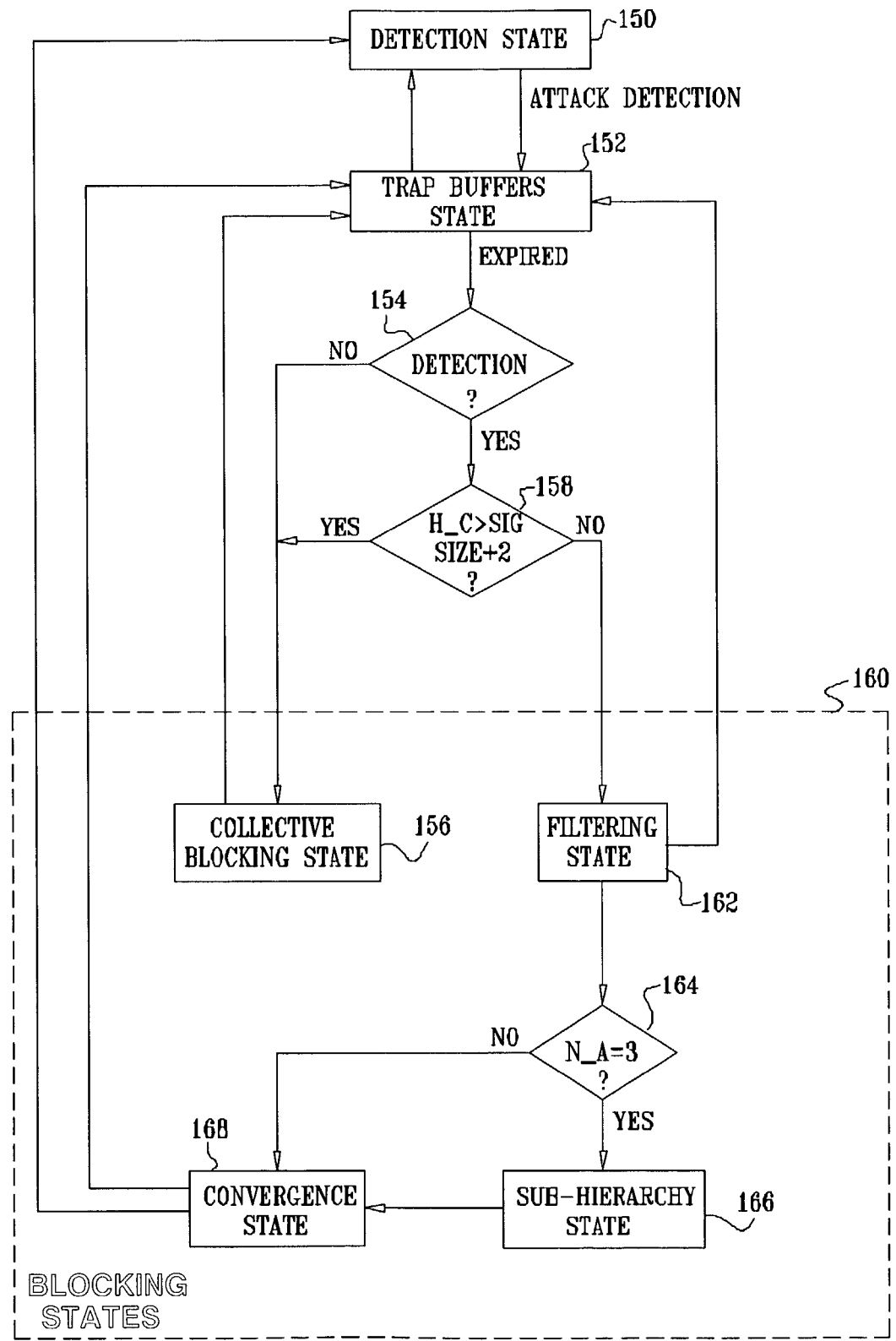
FIG. 4 is a block diagram that schematically illustrates states of a network flood controller, in accordance with an embodiment of the present invention.

FIG. 4 is a block diagram that schematically illustrates states of network flood controller 60, in accordance with an embodiment of the present invention. Network flood controller 60 is typically implemented as a finite state machine. The controller makes transitions between states according to predetermined rules, responsively to the previous operational state and to real-time input from FIS module 62 and other modules. As mentioned above, the controller implements a feedback loop, and therefore continuously receives input from the FIS module in order to determine the effective of filtering in light of current attack levels and characteristics.

Network flood controller 60 typically utilizes a number of flags and/or counters, including:

a hierarchy counter, which specifies the maximum number of signatures (different hierarchies) that are to be filtered by filtering module 70;

a non-attack counter, which indicates that the first phase of the blocking procedure has resulted in stable positive feedback, as described below with reference to filtering state 162;

an attack counter, which is used as a condition for transition from filtering state 162 and convergence state 168 back to trap buffers state 152, as described hereinbelow;

a signature counter, which indicates the number of signature types that trapping module 68 has identified for a given attack. Network flood controller 60 uses the signature counter to determine into which blocking state to transition at hierarchy check step 158, as described hereinbelow; and a stable counter, which is used to detect the cessation of an attack, as described hereinbelow with reference to convergence state 168.

The use of such counters is described herein by way of example and not limitation. Other possible control techniques will be readily apparent to those skilled in the art who have read the present patent application.

The default state of network flood controller 60 is a detection state 150. Each time the controller enters this state, the controller resets all of the counters, including the hierarchy counter, and directs learning module 66 to commence learning. The controller continuously monitors the output from FIS module 62, which output is indicative of a degree of attack.

When FIS module 62 outputs a degree of attack value indicative of an attack, the controller transitions to a trap buffers state 152. Upon entering state 152, the controller increments the hierarchy counter and directs learning module 66 to suspend learning for the duration of the attack. The controller directs at least one trapping module 68 to attempt to determine the signatures and sub-signatures (dependent signatures and sub-hierarchy signatures) of the attack. The controller allows the trapping module a certain period of time to make this determination. For example, during a first attempt to detect the signatures of any given attack, the controller may allow 10 seconds, while during subsequent attempts for the same attack the controller may allow 5 seconds. In embodiments of the present invention that comprise stateful connection protection module 52, as described hereinbelow, the controller typically reduces the timeouts of a stateful inspection module 502 for TCP connections, as described hereinbelow in more detail. The controller directs filtering module 70 to continue filtering signatures of any additional attacks that are ongoing (i.e., other than the currently detected new attack). If input from FIS module 62 indicates that the attack has ceased, the controller directs trapping module 68 to discontinue trapping, and transitions back to detection state 150.

Upon expiration of the determination period allotted to trapping module 68, the controller determines whether the trapping module has successfully detected at least one signature of the attack, at a detection check step 154. If no signature has been detected, the controller transitions to a collective blocking state 156. On the other hand, if at least one signature has been detected, the controller determines whether filtering module 70 has tried all possible signature types without producing an effective filter, at a hierarchy check step 158. The controller typically makes this determination by comparing the hierarchy counter, which indicates how many signature types filtering module 70 filters, to the signature counter, which indicates the total number of signatures trapping module 68 has identified. If the hierarchy counter is greater than the signature counter, indicating that all signature types have been exhausted without producing an effective filter, the controller transitions to collective blocking state 156.

For some applications, the controller transitions to collective blocking state 156 only if the hierarchy counter exceeds the signature counter by a predetermined constant X, such as 2. The controller thus allows filtering module 70 to attempt filtering X additional times using all of the identified signatures, before the controller transitions to collective blocking state 156. (The system can be configured to disable one or more signature types. If any types have been disabled, the determination the controller makes at step 158 is whether the hierarchy counter is greater than the signature counter, less the number of disabled signatures, plus the predetermined constant X.)

Collective blocking state 156 is one of four blocking states 160. The collective blocking state is a state of last resort when the system has failed to identify signatures effective for filtering. Upon entering the collective blocking state, the controller typically sets a global expiration countdown timer (which may be implemented using a scheduler) to a constant value, such as between about 60 and about 600 seconds. This timer runs as long as the controller remains in any blocking state 160, i.e., it is not reset upon transitions from one blocking state to another blocking state. Upon expiration of the timer, the controller automatically resets all counters, including the hierarchy counter, and returns to trap buffers state 152.

In the collective blocking state, the controller typically takes one of two actions, responsively to a predefined configuration rule:

The controller blocks all inbound packets, including fragments, that are of the same protocol type as the detected attacking packets. However, the controller typically does not block TCP packets, because this would result in a denial of service, the very goal of the flood attack; or The controller takes no blocking action.

The typical default rule specifies the second option (no blocking action).

In either case, the controller remains in collective blocking state 156 until the expiration of the global countdown timer, upon which the controller resets the hierarchy counter and transitions to trap buffers state 152.

On the other hand, if at step 158 the hierarchy counter was determined to be less than the signature counter plus the predetermined constant, the controller transitions to a filtering state 162. Upon entering the filtering state, the controller typically sets the global expiration countdown timer, as described hereinabove with reference to collective blocking state 156. In embodiments of the present invention that comprise stateful connection protection module 52, as described hereinbelow, in the filtering state the controller reduces the timeouts of stateful inspection module 502 for TCP connections, as described hereinbelow in more detail.

Figure 5:
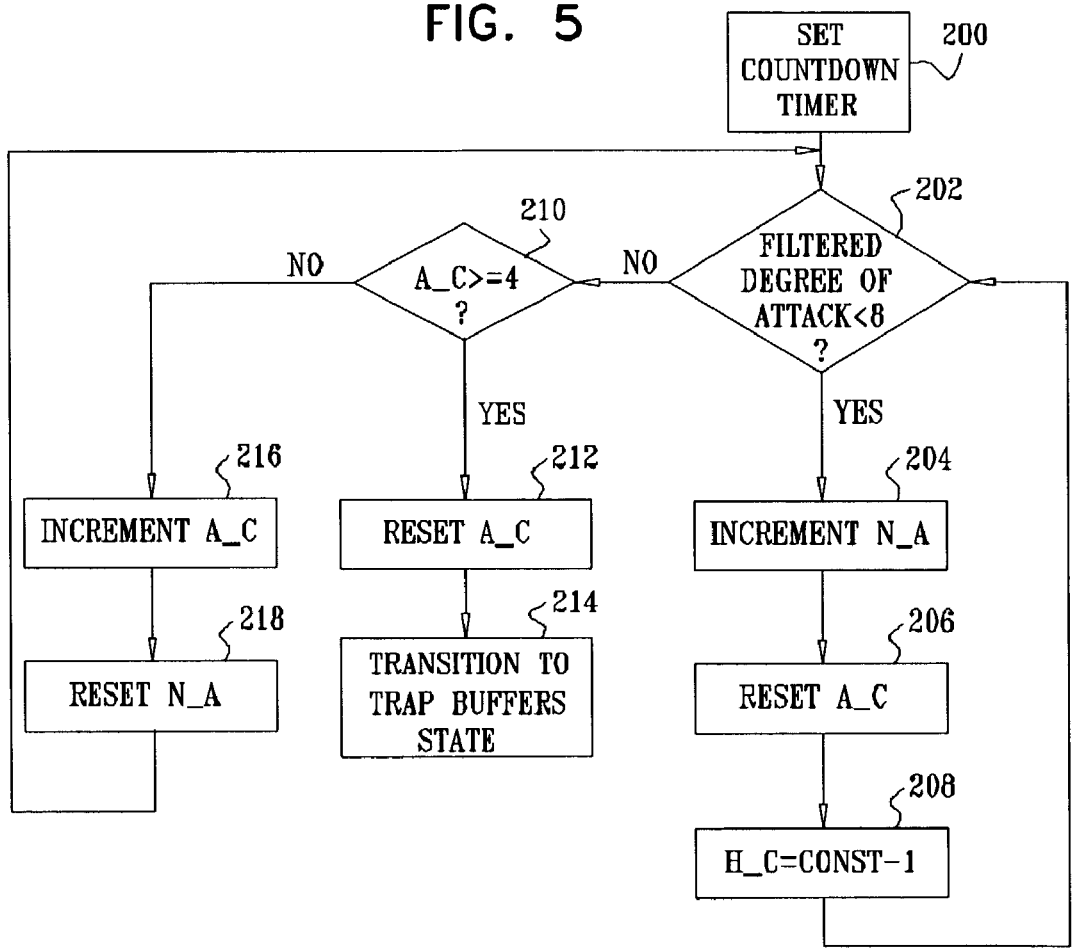
FIG. 5 is a flow chart that schematically illustrates a method for determining the success of filtering, in accordance with an embodiment of the present invention.

Reference is now made to FIG. 5, which is a flow chart that schematically illustrates a method for determining the success of filtering in filtering state 162, in accordance with an embodiment of the present invention. Upon entering filtering state 162, the controller sets a countdown timer for a predetermined period of time, such as between 3 and 10 seconds, at a set countdown step 200. While in filtering state 162, the controller directs filtering module 70 to block packets having the signature type or types determined in trap buffers state 152. Periodically, typically once per second, the controller directs FIS module 62 to analyze filtered traffic 56 to determine whether filtering module 70 successfully filtered the attack during the current second, at a filtered traffic check step 202. This analysis of the filtered traffic is an implementation of feedback loop 72 (FIG. 2). If the filtering module successfully filtered the attack, the controller:

at an increment non-attack counter step 204, increments the non-attack counter, which tracks the stability of successful filtering in filtering state 162, as measured by continuous seconds of successful filtering. The non-attack counter therefore serves as an indicator of positive feedback;

at a reset attack counter step 206, resets the attack counter, which tracks continuous seconds of unsuccessful filtering in filtering state 162 (and therefore serves as an indicator of negative feedback); and at a hierarchy counter set step 208, sets the hierarchy counter equal to the "Const" counter less one. The Const counter is set equal to the hierarchy counter each time the hierarchy counter is incremented (upon entering trap buffers state 152). The controller sets the value of the hierarchy counter to Const less one, so that the next time the hierarchy counter is incremented upon entrance to trap buffers state 152, the hierarchy counter returns to the same value it had during the previous iteration through the trap buffers state. As a result of this reduction of the hierarchy counter, the hierarchy counter is effectively incremented upon entering the trap buffers state only during stable negative feedback, as indicated by the attack counter and described below.

If at step 202, however, input from FIS module 62 indicates that filtering module 70 did not successfully filter the attack during the current second, the controller determines whether the attack counter has reached a predetermined threshold, typically 3 or 4 seconds, at an attack counter check step 210. If the counter has reached this threshold, indicating stable unsuccessful filtering, the controller resets the attack counter at a reset attack counter step 212, and transitions back to trap buffers state 152 (FIG. 4), at a trap transition step 214. In the trap buffers state, the controller attempts to increase the number of signatures for tighter filtering.

If at step 210, however, the controller finds that the attack counter has not reached the threshold, the controller:

at an increment attack counter step 216, increments the attack counter, indicating an additional second of continuous unsuccessful filtering;

at a non-attack counter reset step 218, resets the non-attack counter, since stable successful filtering is not occurring; and returns to step 202 for continued periodic checking of the effectiveness of the filtering.

Returning to FIG. 4, upon expiration of the filtering state countdown timer, the controller checks whether the non-attack counter has reached a predetermined constant, such as 3 seconds, at a feedback check step 164. If the counter equals the constant, indicating that stable positive (non-attack) feedback has been achieved, the controller transitions to a sub-hierarchy state 166, for refining (i.e., narrowing) of the filtering conditions. Otherwise, the controller transitions to a convergence state 168, described below.

In sub-hierarchy state 166, the controller directs filtering module 70 to reduce the restrictiveness of the filtering by additionally applying one or more sub-hierarchy signatures. These sub-hierarchy signatures were determined by trapping module 68 when the controller was in trap buffers state 152, as described in detail hereinbelow in the section entitled "The trapping module." Typically, the controller directs the filtering module to attempt to further define only the signature from the currently highest hierarchy level, i.e., the most recently added signature, by adding one or more sub-hierarchy signature by applying a logical "AND" operator. Sub-hierarchy signatures previously added to lower hierarchy levels may be discarded if the controller is able to determine that one or more sub-hierarchy signatures for the currently highest hierarchy level are effective. (If the controller enters sub-hierarchy state 166 more than once with the same hierarchy counter value, the controller directs the trapping module to attempt to define new sub-hierarchy signatures. This redefinition generally results in optimization of the highest hierarchy level using the most recent traffic statistics.)

Figure 6:
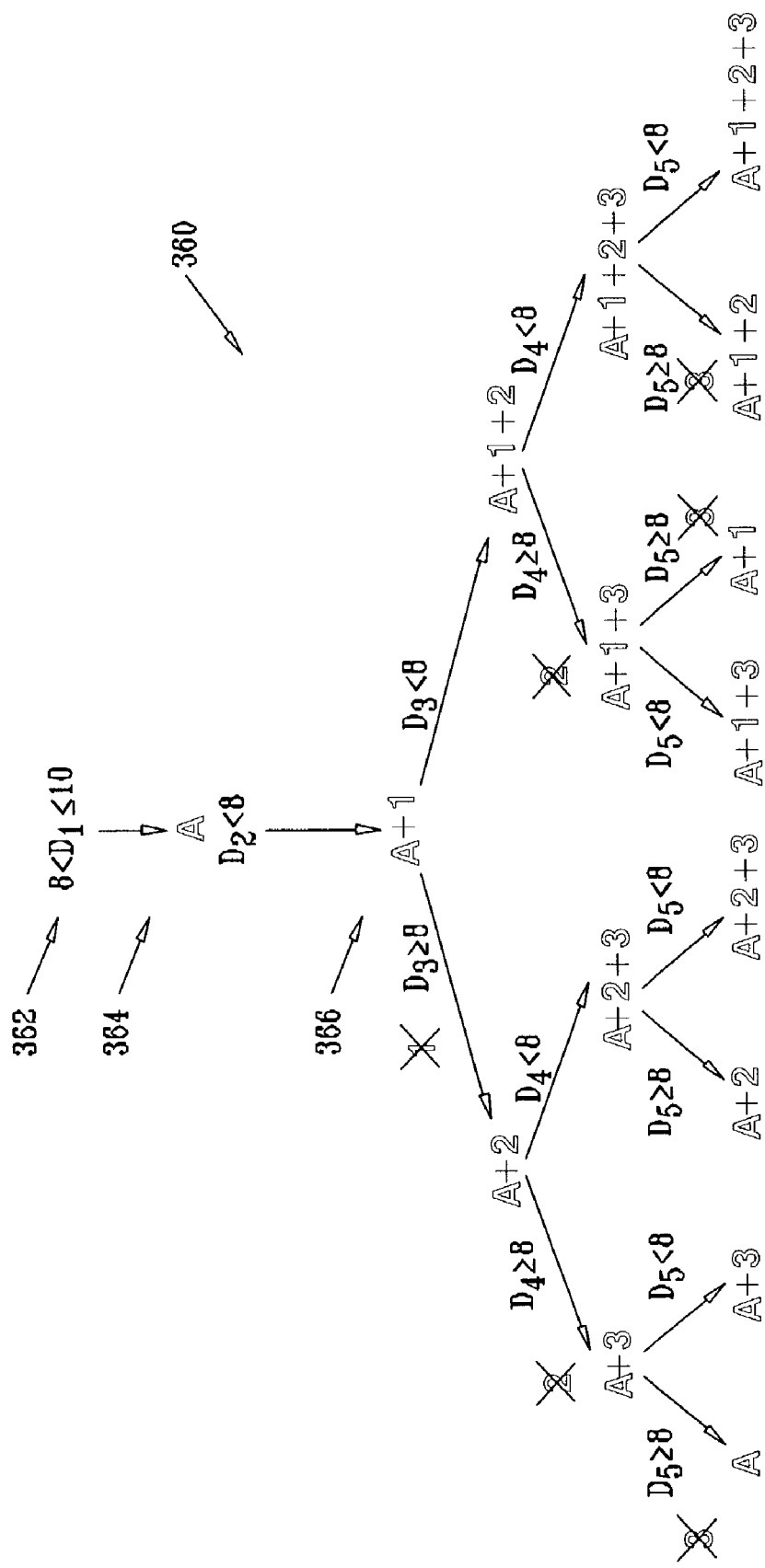
FIG. 6 is a decision tree used by a network flood controller, in accordance with an embodiment of the present invention.

Reference is now made to FIG. 6, which shows a decision tree 360 used by network flood controller 60 in sub-hierarchy state 166, in accordance with an embodiment of the present invention. The controller uses decision tree 360 in a convergence process for determining which combination of sub-hierarchy signatures types, if any, maintain the effectiveness of the filtering against the attack. The goal of the convergence process is to apply the maximum number of sub-hierarchy signatures, while maintaining the effectiveness of the filtering. In tree 360, $D_n$ represents the nth degree of attack value received by the controller from FIS module 62 for a given attack. Tree 360 includes three levels of convergence decisions, and therefore assumes that trapping module 68 determined three sub-hierarchy signatures. In cases in which the trapping module determined only two sub-hierarchy signatures, the tree has only two levels of convergence decisions.

A first level 362 of tree 360 indicates that in detection state 150 (FIG. 4) the controller received a degree of attack $D_1$ indicative of an attack. A signature "A" represents the hierarchy group signature identified in trap buffers state 152. This signature is applied by filter 70 in order to filter incoming traffic.

At a second level 364 of tree 360, the controller checks whether a degree of attack $D_2$, calculated by FIS module 62 based on the filtered traffic, is less than a threshold value, e.g., 8. A value of $D_2$ less than the threshold value indicates that application of signature A is successfully filtering the attack. Therefore, the controller proceeds to a third level 366 of tree 360, and applies both signature A and sub-hierarchy signature type 1 (packet size), in an "AND" relationship, so as to narrow the range of packets that are filtered to those of a particular size. (The sub-hierarchy signature types are described in detail hereinbelow in the section entitled "The trapping module.")

Depending on the resulting feedback from FIS module 62 when this more limited filtering criterion is applied, the controller continues to traverse the decision tree.

For example, if the narrower combination of signature types A and 1 results in an increase in the degree of attack ($D_3$) above the threshold value, the controller cancels signature type 1 and instead tries the combination of signature types A and 2 (TTL).

Alternatively, if the degree of attack remains below the threshold value despite the narrower combination A+1, the controller tries the still narrower combination of signature types A, 1 and 2. This process continues until the narrowest combination of signature type A with types 1, 2 and 3 is found that still gives a satisfactory degree of attack. Network flood module 50 typically reaches convergence on a combination of signature types in between about 2 and about 8 seconds, depending upon the number of sub-hierarchy signatures determined, which determines the number of decision levels of tree 360.

Upon completing this convergence process, the controller 60 transitions to convergence state 168, whether or not the controller successfully converged on any sub-hierarchy signatures. (During this convergence period, the controller directs filtering module 70 to filter using the currently defined signatures and any previously determined sub-hierarchy signatures.) In embodiments of the present invention that comprise stateful connection protection module 52, as described hereinbelow, the controller may also reduce the timeouts of stateful inspection module 502 for TCP connections, as described hereinbelow in more detail.

Figure 7:
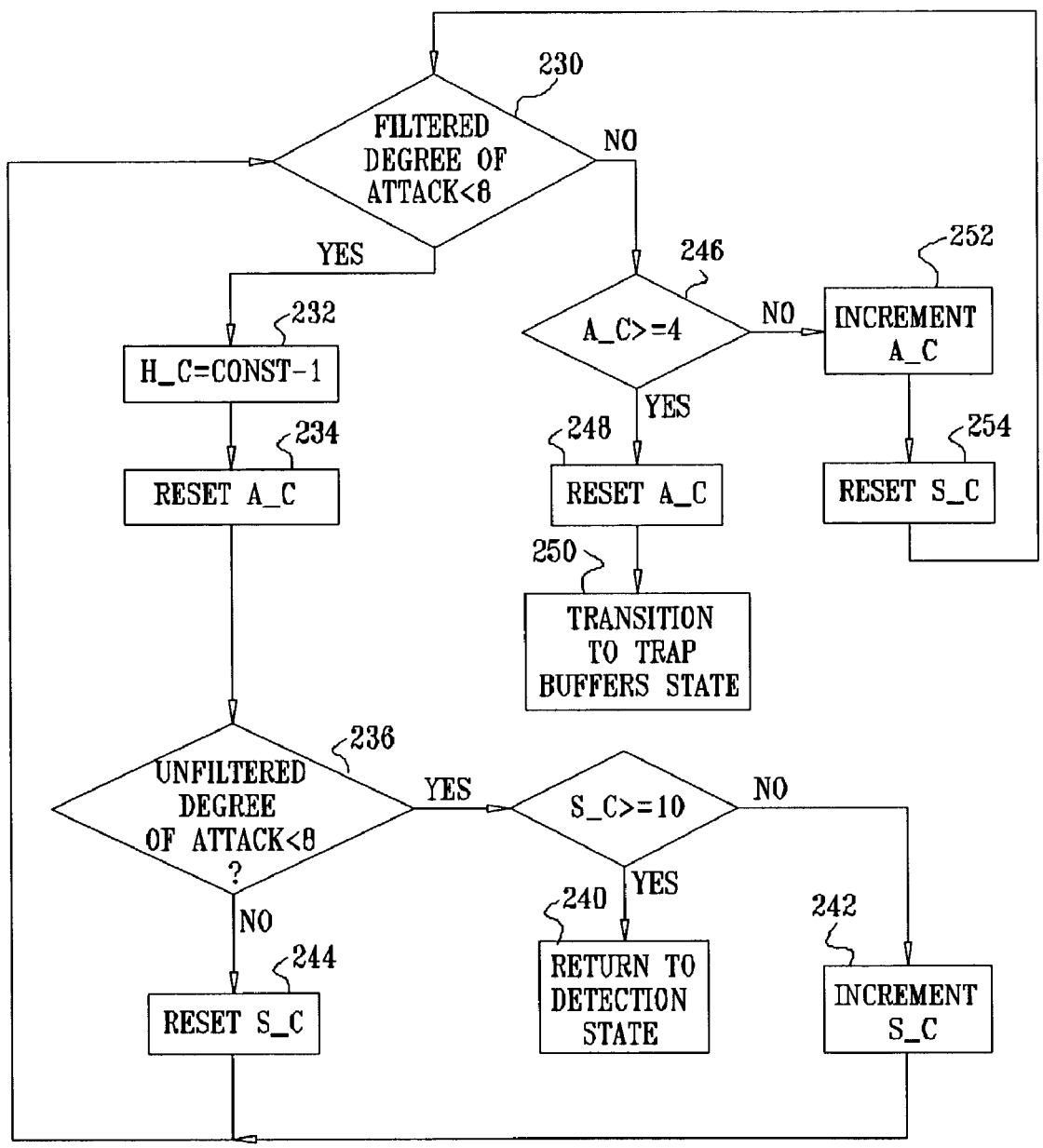
FIG. 7 is a flow chart that schematically illustrates a method for determining the success of filtering in a convergence state of the system, in accordance with an embodiment of the present invention.

Reference is now made to FIG. 7, which is a flow chart that schematically illustrates a method for determining the success of filtering in convergence state 168, in accordance with an embodiment of the present invention. In the convergence state, the controller directs filtering module 70 to continue filtering and directs FIS module 62 to periodically, typically once per second, analyze filtered traffic 56 to determine whether the filtering is successfully blocking the attack, at a filtered traffic check step 230. If the filtering is successful, the controller:

at a set hierarchy counter step 232, sets the hierarchy counter to Const less one, for the reason described above with reference to step 208;
at an attack counter reset step 234, resets the attack counter; and
directs FIS module 62 to additionally analyze non-filtered traffic 54, also periodically, typically once per second, to determine if the attack has ceased, at an unfiltered traffic check step 236.

If the analysis of the non-filtered traffic indicates that the attack has ceased, the controller checks whether the stable counter has reached a threshold value, such as 10 seconds, at a check stable counter step 238. If the stable counter has reached this threshold, indicating that the attack has ceased for 10 consecutive seconds, for example, the controller transitions back to detection state 150, at a detection state transition step 240. If, however, the stable counter has not reached the threshold, the controller increments the stable counter, at an increment stable counter step 242, and returns to step 230 for continued checking of the filtered traffic by FIS module 62.

If at step 236, however, the FIS module indicates that the attack is continuing (but is being successfully blocked), the controller resets the stable counter, at a reset stable counter step 244, and returns to step 230 for continued checking of the filtered traffic by FIS module 62.

On the other hand, if at step 230 input from FIS module 62 indicates that filtering module 70 did not successfully filter the attack during the current second, the controller determines whether the attack counter has reached a predetermined threshold, typically 3 or 4 seconds, at an attack counter check step 246. If the counter has reached this threshold, indicating stable unsuccessful filtering, the controller resets the attack counter at a reset attack counter step 248, and transitions back to trap buffers state 152 (FIG. 4), at a trap transition step 250. In the trap buffers state and subsequent filtering state, the controller attempts to increase the number of signatures for tighter filtering.

If at step 246, however, the controller finds that the attack counter has not reached the threshold, the controller:

at an increment attack counter step 252, increments the attack counter, indicating an additional second of continuous unsuccessful filtering;
at a stable counter reset step 254, resets the non-attack counter, since stable successful filtering is not occurring; and
returns to step 230 for continued periodic checking of the effectiveness of the filtering.

As mentioned above, in embodiments of the present invention that comprise stateful connection protection module 52, in trap buffers state 152, filtering state 162, and sub-hierarchy state 166, the controller may reduce the timeouts of stateful inspection module 502 for TCP connections. Such a reduction in the timeouts generally reduces the likelihood that the stateful inspection module will be saturated with attack packets during the initial stages of an attack before network flood protection module 50 begins filtering the attack packets. In the TCP automat states SYN_RCV and SYN_ACK_SND, the controller typically reduces the timeout to 4 seconds. The controller also typically reduces the timeout of UDP and ICMP sessions to 4 seconds.

In order to keep track of signatures and sub-hierarchy signatures that should be filtered, network flood module 50 typically implements a blocking list. The blocking list includes all of the signature types and signatures (i.e., values of signature fields) to be blocked, and logical relationships among the various signatures and sub-hierarchy signatures (AND or OR). The blocking list can contain more than one signature for each signature type. The system may set a maximum number of allowed signatures per signature type, e.g., to prevent degradations in system performance.

Figure 8:
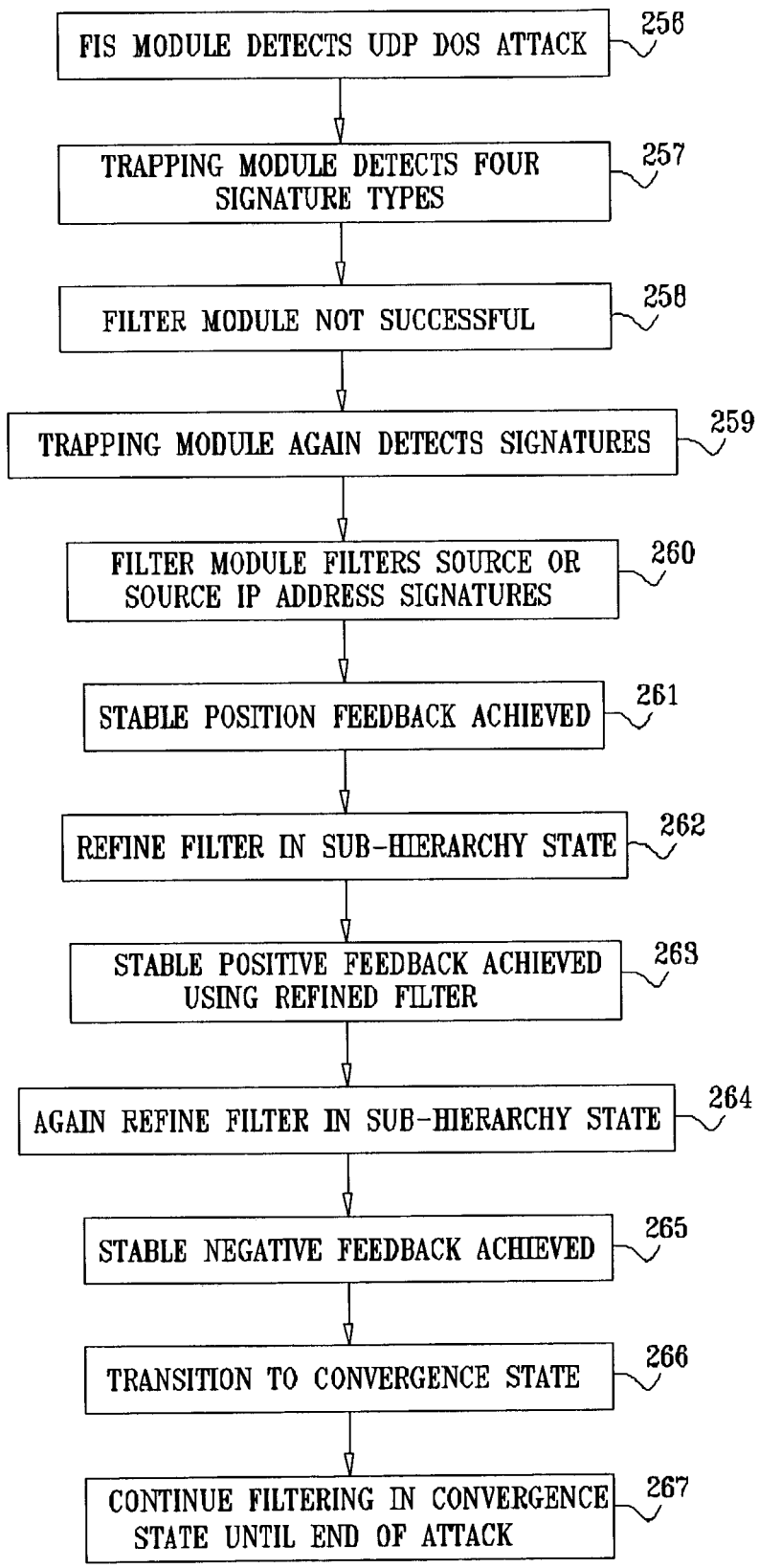
FIG. 8 is a flow chart illustrating an example of a signature detection and filtering procedure, in accordance with an embodiment of the present invention.

Reference is now made to FIG. 8, which is a flow chart illustrating an example of signature detection and filtering carried out by module 50, in accordance with an embodiment of the present invention. In this example, FIS module 62 detects a UDP DoS flood attack in detection state 150, at a detection step 256. At a trapping step 257, network flood controller 60 transitions to trap buffers state 152, in which trapping module 68 successfully detects signatures of four signature types, in the following order:

1. Source port

2. Source IP address

3. Packet size

4. TTL

Trapping module 68 additionally determined at least the following sub-hierarchy signatures for the source IP address hierarchy signature type: packet size and TTL. Controller 60 sets the signature counter to the number of hierarchy signatures detected, in this example 4. In addition, the hierarchy counter is incremented from 0 to 1 (which incrementing occurs every time the controller enters the trap buffers state).

Controller 60 enters filtering state 162, in which the controller directs filtering module 70 to filter traffic using the first signature, because the hierarchy counter equals 1. Feedback from FIS module 62 indicates that the filtering was not successful, at a non-success step 258. Therefore, the controller increments the hierarchy counter (to 2) and returns to trap buffers state 152. At a trapping step 259, trapping module 68 again detects signature types, because the nature of the attack may have changed, resulting in different signatures. In this example, the signatures remain the same.

At a filtering step 260, the controller again enters filtering state 162, and directs filtering module 70 to filter traffic. However, because the hierarchy counter now equals 2, the controller instructs the filtering module to use the first two signatures, rather than just the first signature. The filtering module filters using both of these signatures in a logical OR relationship: "source port OR source IP address." At a positive feedback step 261, the filtering module achieves stable positive feedback, i.e., the FIS module does not detect an attack in the filtered traffic for three seconds.

As a result of the stable positive feedback, at a refine filter step 262, the controller transitions to sub-hierarchy state 166, in which the controller directs filtering module 70 to apply a signature from the sub-hierarchy group, which signature was already identified by trapping module 68. In this example, the new filter additionally includes a sub-signature for the source IP address signature, resulting in the refined filter: "source port OR (source IP address AND packet size)."

The controller remains in sub-hierarchy state 166, and again determines whether the new filter is successful. In this example, the filter is successful, and the system again achieves stable positive feedback, at a positive feedback step 263. The controller therefore attempts to further refine the signature (source IP address) already refined with a sub-signature (packet size). At a refine filter step 264, the controller successfully adds a second sub-signature previously determined by trapping module 68, resulting in the further refined filter: "source port OR (source IP address AND packet size AND TTL)."

The controller again determines whether the new filter is successful. This time, the filter is unsuccessful, and stable negative feedback results, at a negative feedback step 265. Therefore, the controller transitions to convergence state 168, at a convergence transition step 266. In the convergence state, the controller directs filtering module 70 to filter using the most recent successful filter, i.e., "source port OR (source IP address AND packet size)," at a convergence state step 267.

The controller continues filtering in the convergence state until stable attack stop feedback is achieved, as indicated by the consistency counter.

Network flood protection module 50 is typically configurable to ignore certain signatures (i.e., certain values of a signature type). Ignoring certain signatures may be desirable, for example, for signature values that are common values for legitimate traffic. Overridden signatures are typically removed from the blocking list, but remain on the signature list. (Leaving the overridden signatures on the signature list enables a security engineer to perform analysis to determine whether the decision to ignore these signatures was justified.) Signature types that are configurable in such a manner typically include:

Packet size. Network flood module 50 is configurable to exclude signatures of the packet size signature type having certain common values. For example, common TCP packet sizes typically include 60 bytes (SYN), 62 bytes (ACK), 66 bytes (SACK), and 74 bytes (SACK). Common ICMP packets sizes typically include 74 bytes (echo request). Additional values can be added during configuration. Generally, the default configuration is to ignore these values for packet size signatures in the sub-hierarchy group, but not to ignore these values for packet size signatures in the hierarchy group. (The sub-hierarchy and hierarchy groups are described hereinbelow in the section entitled "The trapping module.")

Time-to-Live (TTL). Network flood module 50 is configurable to exclude signatures of the TTL signature type having certain common values for the particular protected network. Generally, the default configuration is to ignore these values for TTL signatures in the sub-hierarchy group, but not to ignore these values for TTL signatures in the hierarchy group.

Type of Service (ToS). Trapping module 68 is typically configured to ignore the normal ToS value 00X.

In addition, network flood protection module 50 has a configuration option to allow disabling/enabling of each of the signature types. The default configuration typically is to enable all signature types (other than TTL and sub-hierarchy packet size, as described above).

FIGS. 9A and 9B show a table 268 summarizing actions of the controller in various states, in accordance with an embodiment of the present invention. The table shows typical actions network flood controller 60 takes in each of its states (excluding detection state 150). The first column lists the different states, and the second column indicates whether or not FIS module 62 currently detects an attack, based on an analysis of filtered traffic.

In an embodiment of the present invention, security system 20 has a detection-only mode (a "virtual blocking" mode). In this mode, the system detects attacks (and optionally determines signatures) as in normal operation, but does not filter traffic to protect against the attacks. Administrators, before making a decision to enable true blocking, are able to monitor and analyze attacks and assess the expected behavior of system 20 were true blocking to be enabled. The system is typically configurable to enable detection-only mode by type of attack and/or type of controller.

The Fuzzy Logic Inference System (FIS)

FIS module 62 is the decision engine of network flood module 50. The FIS module receives (a) parameters of filtered and/or unfiltered traffic from statistics module 64, as described hereinbelow in the section entitled "The real-time statistics module," and (b) baseline statistics from learning module 66, as described hereinbelow with reference to FIG.

16. The FIS module uses adaptive fuzzy logic to analyze the traffic parameters, in light of the baseline statistics. The result of this analysis is a value indicative of a real-time degree of attack.

Fuzzy inference is the process of formulating the mapping of one or more inputs to one or more outputs using fuzzy logic. Decisions are then made based on the mapping. The following publications, which are incorporated herein by reference, provide information regarding fuzzy logic and fuzzy inference:

*Fuzzy Logic Toolbox For Use with MATLAB®, User's Guide Version* 2, The MathWorks, Inc., Natick, Mass. (July 2002) (available online at www.mathworks.com)

Hines J W, *Fuzzy and Neural Approaches in Engineering*, Wiley-Interscience (January 1997)

Nguyen H T et al., *A First Course in Fuzzy Logic*, Second Edition, CRC Press (July 1999)

Figure 10:
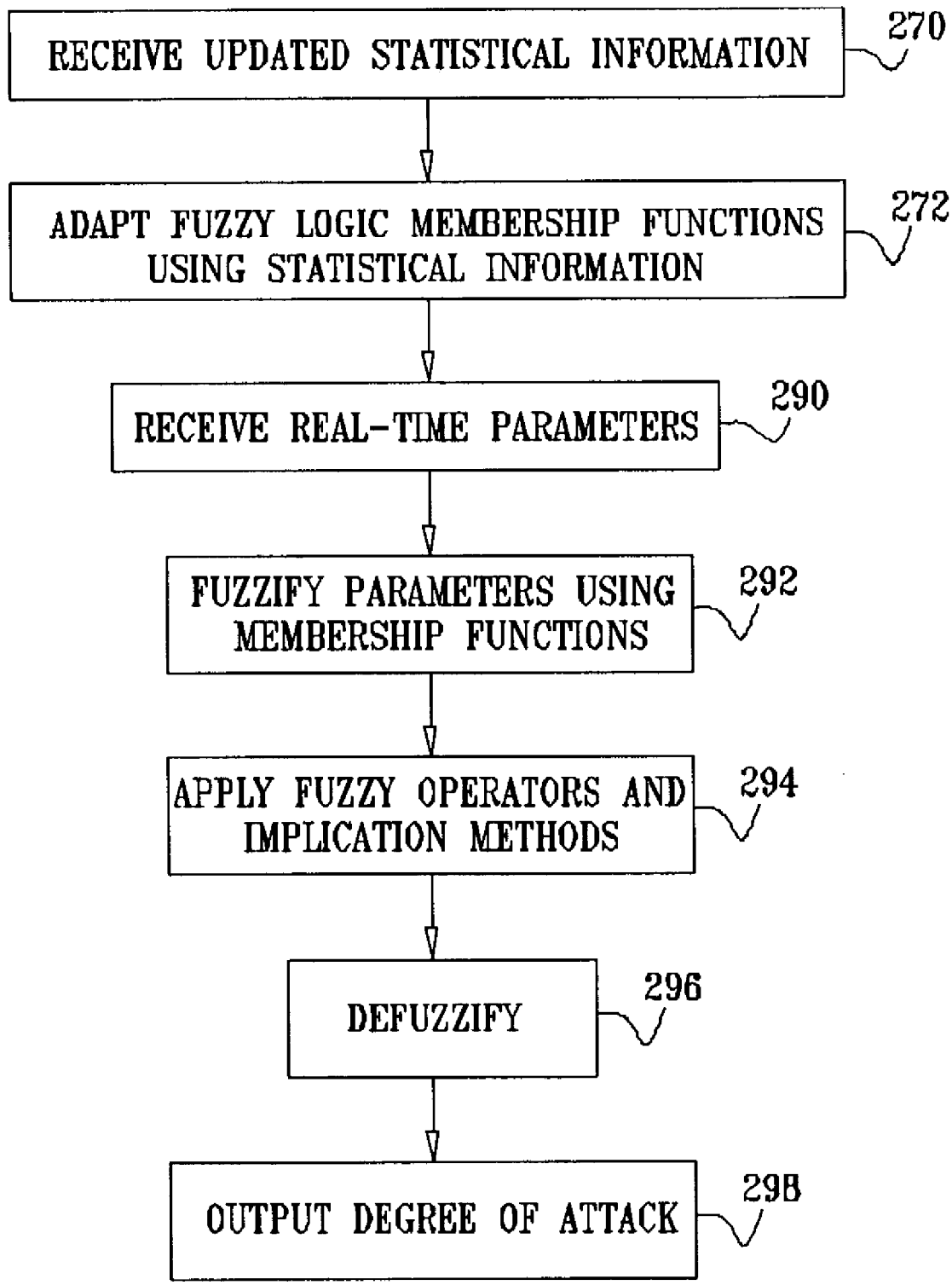
FIG. 10 is a flow chart that schematically illustrates a method for detecting an attack on a protected network using fuzzy logic, in accordance with an embodiment of the present invention.

FIG. 10 is a flow chart that schematically illustrates a method for detecting an attack on protected network 22 using fuzzy logic, in accordance with an embodiment of the present invention. In order to adapt the FIS module to current network characteristics and conditions, the FIS module periodically (e.g., at least once every 60 minutes) receives updated statistical information from learning module 66, at an update statistics step 270. This statistical information is generally indicative of normal baseline network behavior, and has typically been collected and derived as described hereinbelow with reference to FIG. 16. Using this statistical information, FIS module 62 adapts the fuzzy logic membership functions (typically the input membership functions) that are used for fuzzification, at a membership function adaptation step 272. (A membership function is a curve that defines how each point in a fuzzy input space is mapped to a degree of membership (i.e., a membership value) between 0 and 1.)

Figure 11:
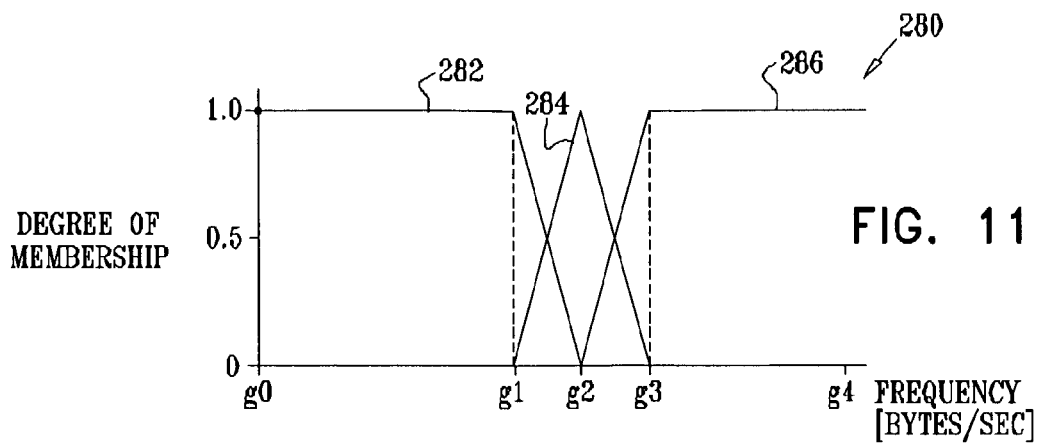
FIG. 11 is a graph showing three exemplary adapted membership functions, in accordance with an embodiment of the present invention.

Reference is made to FIG. 11, which is a graph showing three exemplary adapted membership functions 280, in accordance with an embodiment of the present invention. A non-attack membership function 282 is defined by the trapezoid having vertices {(0,0), (0,1), (g1,1), (g2,0)}, a potential attack membership function 284 is defined by the triangle having vertices {(g1,0), g2,1), g3,0)}, and an attack membership function 286 is defined by the trapezoid having vertices {(g2,0), g3,1), g4,1), g4,0)}.

The FIS module adapts these exemplary membership functions for one or more types of parameters, and for one or more types of packet (e.g., UDP, TCP, or ICMP). To perform this adaptation, the FIS module uses statistical information provided by learning module 66, or, if appropriate, default learning values, as described hereinbelow with reference to FIG. 26. For example, in order to adapt these functions for a frequency parameter (i.e., a data rate parameter) of a certain protocol type of packet, expressed in bytes (or kilobytes) per second, the FIS module may:

- set g1 equal to the average normal rate of packets of the selected type, expressed in bytes per second;
- set g4 equal to the maximum inbound bandwidth of the physical connection of protected network 22 to WAN 26 (FIGS. 1A and 1B), expressed in bytes per second;
- set g3 equal to the square root of g1*g4; and
- set g2 equal to the square root of g1*g3.

In order to adapt these functions for a portion parameter for a certain protocol type of packet, the FIS module may:

- set g1 equal to the average normal portion of traffic of packets of the selected type, expressed as a fraction;
- set g4 equal to the maximum pre-defined portion value, typically between about 0.75 and about 0.85;
- sets g3 equal to the linear average of g1 and g4; and
- sets g2 equal to the linear average of g1 and g3.

Returning to FIG. 10, at a parameter receipt step 290, FIS module 62 receives real-time parameters from statistics module 64. The FIS module uses these parameters as inputs into the fuzzy logic algorithms. FIS module 62 typically uses different parameters depending on the type of attack the module is attempting to detect, as described hereinbelow. FIS module 62 typically aggregates the real-time parameters for a brief period, e.g., about one second, and then fuzzifies each aggregated parameter using the appropriate adapted membership function, at a fuzzification step 292. The result of the fuzzification is a degree of membership for each of the parameters. (A degree of membership is a value between 0 and 1 indicative of a level of partial membership of an element in a set.)

At a fuzzy application step 294, FIS module 62 applies fuzzy operators in order to combine the degrees of membership derived at step 292. Using fuzzy implications methods, the FIS module applies the resulting combined degrees of membership to one or more output fuzzy membership functions. The FIS module aggregates the resulting fuzzy sets into a single output fuzzy set. The FIS module defuzzifies this fuzzy set, i.e., resolves the fuzzy set into a single value representing a degree of the attack, at a defuzzification step 296. For example, the degree of attack may have a range between 2 and 10, with higher numbers indicative of a greater likelihood that an attack is occurring. A degree of attack value between 2 and 4 may represent a normal (non-attack) degree, a value between 4 and 8 may represent a suspect (potential) attack degree, and a value between 8 and 10 may represent an attack degree. The FIS module passes the degree of attack to network flood controller 60, at an degree of attack output step 298. The controller typically interprets the output as an indication of the occurrence of an attack when the degree of attack exceeds a certain threshold, e.g., 8 out of a range between 2 and 10.

Figure 12A:
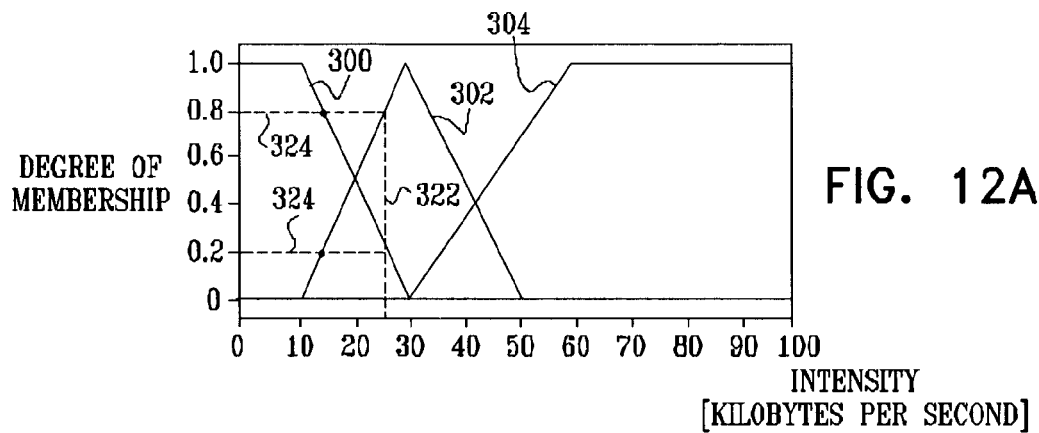
FIGS. 12A, 12B, and 12C are graphs showing exemplary membership functions, in accordance with an embodiment of the present invention.
Figure 12B:
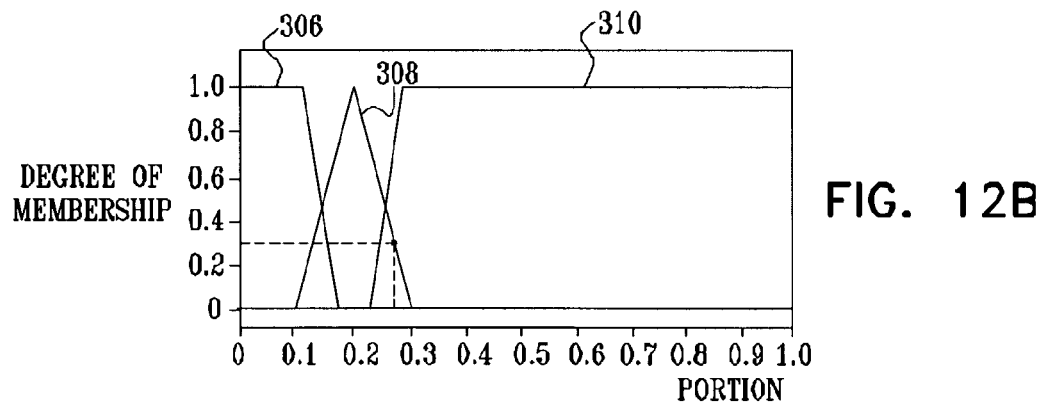
Figure 12C:
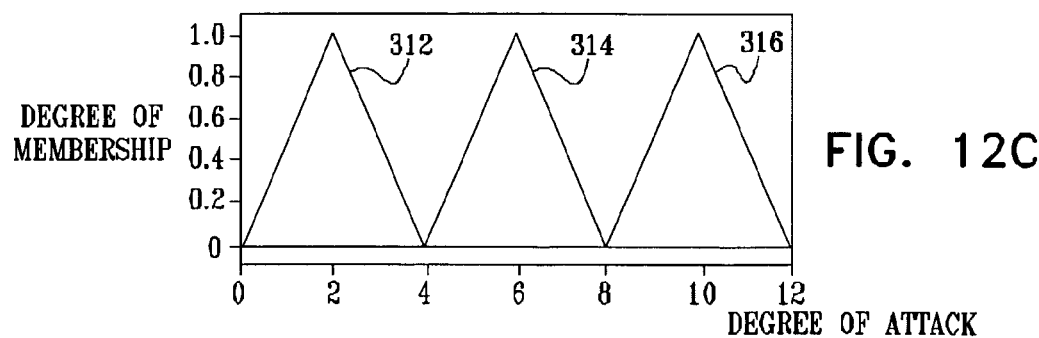

FIGS. 12A, 12B, and 12C are graphs showing exemplary membership functions, in accordance with an embodiment of the present invention. In this embodiment, network flood protection module 50 is configured to detect ICMP ping flood attacks. FIS module 62 typically uses parameters that include the intensity of ICMP inbound packets (measured in bytes per second or packets per second), and the ICMP inbound traffic portion (measured as ICMP inbound packets as a percentage of total inbound packets). (When the expected value of the ICMP inbound traffic portion is greater than about 80%, the FIS module may exclude this parameter.) Each of the parameters typically has three corresponding membership functions (for a combined total of six membership functions for the two parameters). The value of each of parameters is mapped to each of its corresponding membership functions.

FIG. 12A shows three exemplary membership functions having ICMP intensity as their input parameter. A non-attack membership function 300 defines how each point in the input parameter space is mapped to a degree of membership between 0 and 1. Similarly, a potential attack membership function 302 and an attack membership function 304 define how the input parameters are mapped to respective degrees of membership. FIG. 12B shows three exemplary membership functions having ICMP portion as their input parameter: a non-attack membership function 306, a potential attack membership function 308, and an attack membership function 310.

Using fuzzy operators and implication methods, the input parameters are mapped to three membership functions, shown by way of example in FIG. 12C: a non-attack membership function 312, a suspected attack membership function 314, and an attack membership function 316. The FIS module typically aggregates the output membership functions, and performs defuzzification of the aggregates membership function using a Mamdani fuzzy algorithm and a centroid calculation, as is known in the art of fuzzy inference systems. These aspects of fuzzy inference are described, for example, in the above-mentioned *Fuzzy Logic Toolbox For Use with MATLAB®, User's Guide Version* 2 and *Fuzzy and Neural Approaches in Engineering*. The resulting value is the degree of ICMP flood attack.

FIG. 13 is a set of graphs illustrating an exemplary application of fuzzy rules, implication, and aggregation, in accordance with an embodiment of the present invention. Six input membership functions 318 comprise the input membership functions shown in FIGS. 12A and 12B, while three output membership functions 320 comprise the output membership functions shown in FIG. 12C. At fuzzification step 292, FIS module 62 fuzzifies an input parameter for each of input membership functions 318. For example, the intensity of ICMP packets may be about 28 kilobytes per second, as indicated by a vertical line 322. This intensity translates into a degree of membership of about 0.8 in non-attack membership function 300, and of about 0.2 in potential attack membership function 302, as indicated by horizontal lines 324. A similar fuzzification of a portion of about 0.28 results in a degree of membership in potential attack membership function 308 of about 0.3, as seen in FIG. 12B. Combining the potential attack degrees of membership of the intensity and portion membership functions, using a logical OR (max) operator, results in a combined degree of membership of about 0.8.

The FIS module applies this combined degree of membership to output membership function 314, using a truncation (min) fuzzy implication rule, resulting in a fuzzy set 326. (Alternatively or additionally, for some applications the FIS applies a product (i.e., multiplication) implication function, which scales the output fuzzy set.) The FIS module applies the same techniques to the non-attack and attack parameters and membership functions, producing fuzzy sets 328 and 330, respectively. The FIS module then aggregates fuzzy sets 326, 328, and 330, producing an aggregate output fuzzy set 332, which the FIS module defuzzifies at defuzzification step 296, resulting in a single value indicative of a degree of attack.

Figure 14:
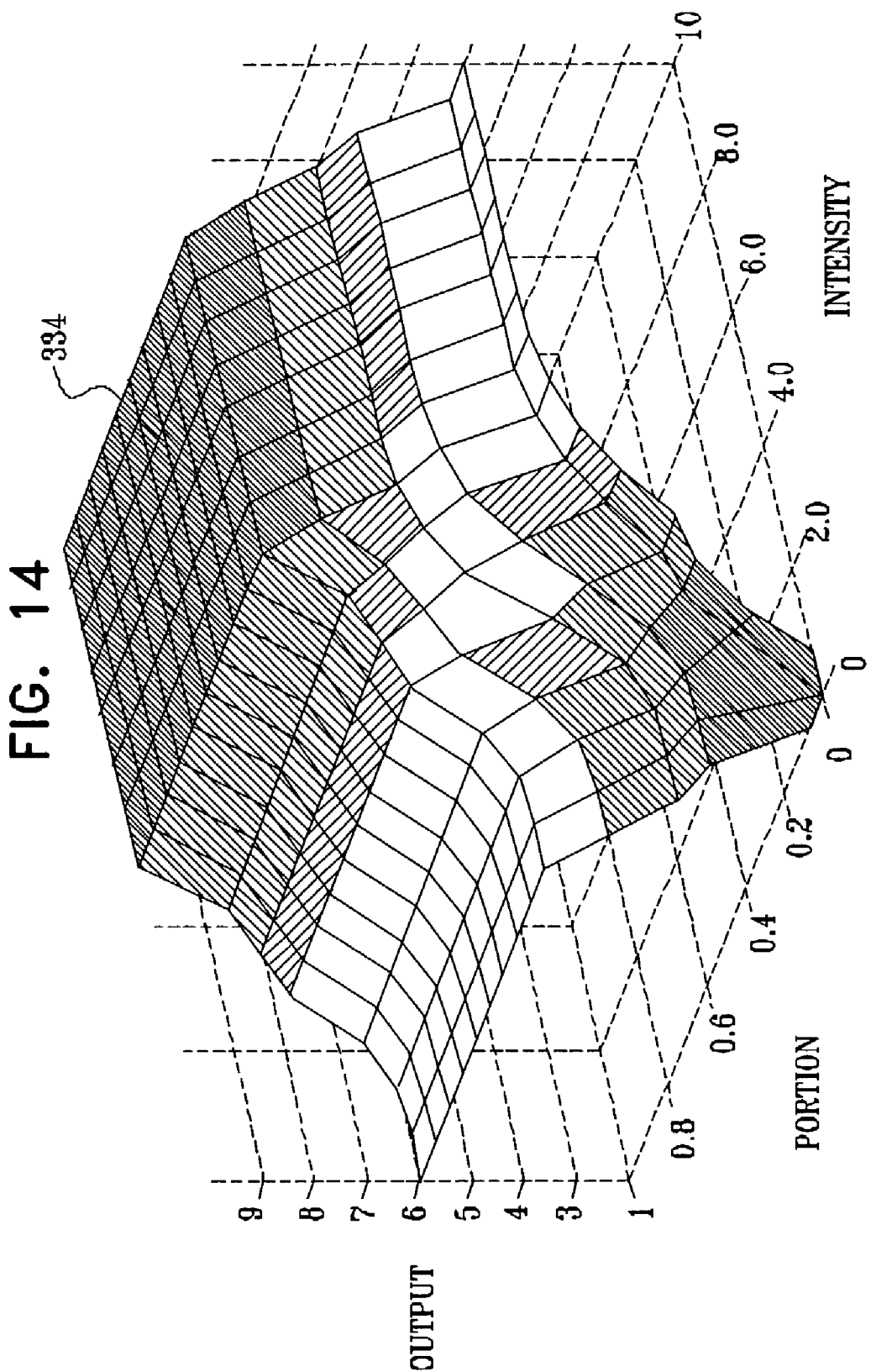
FIG. 14 is a graph showing an exemplary decision surface, in accordance with an embodiment of the present invention.

FIG. 14 is a graph showing an exemplary decision surface 334, in accordance with an embodiment of the present invention. Decision surface 334 was derived for illustrative purposes by preprocessing all possible fuzzy inputs and outputs for an exemplary set of membership functions. The output value, on the vertical axis in FIG. 14, represents the degree of attack, as noted above.

In another embodiment of the present invention, network flood protection module 50 is configured to detect UDP flood attacks. Parameters and techniques described hereinabove for detection of ICMP ping flood attacks are employed for this purpose, as well, mutatis mutandis.

Figure 15:
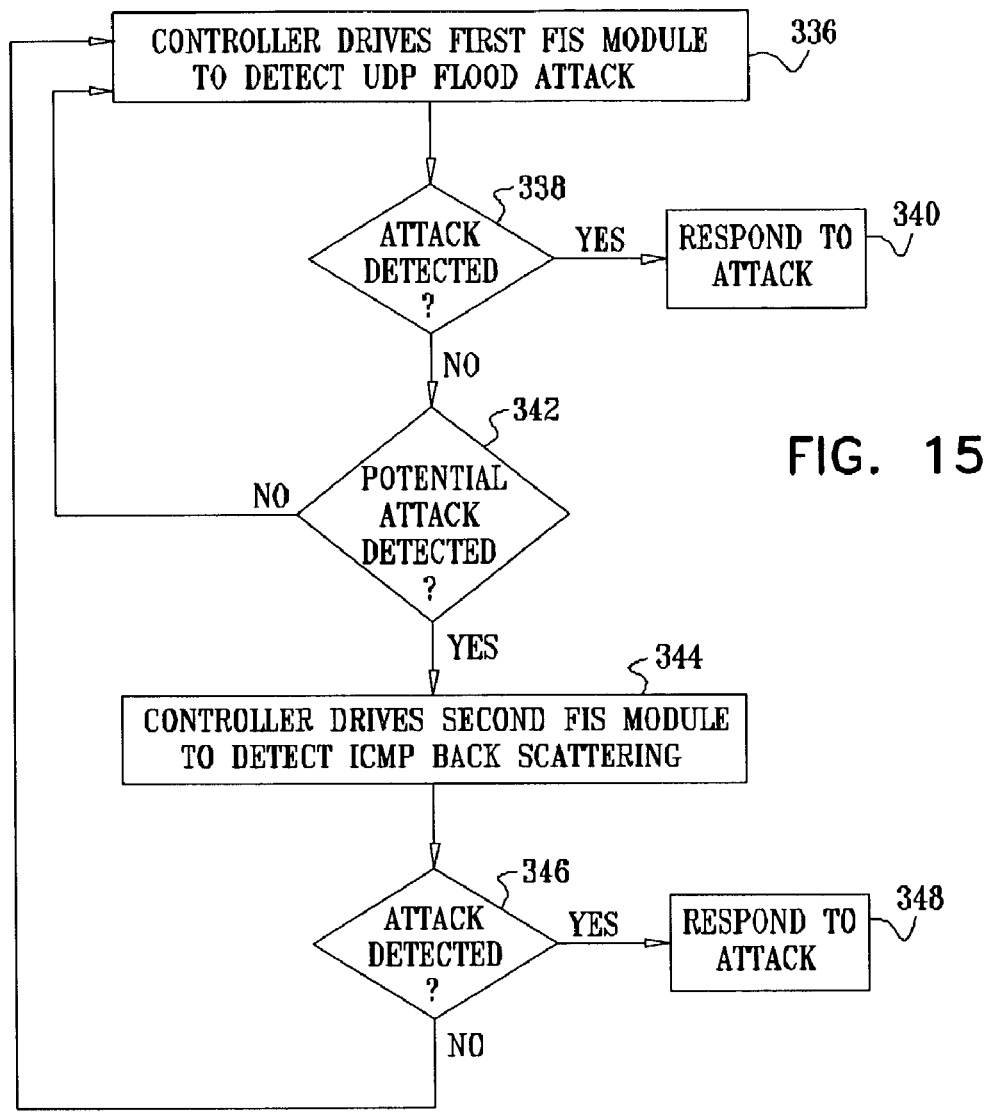
FIG. 15 is a flow chart that schematically illustrates a method for detecting UDP flood attacks using two FIS modules, in accordance with an embodiment of the present invention.

FIG. 15 is a flow chart that schematically illustrates a method for detecting UDP flood attacks using two FIS modules, in accordance with an embodiment of the present invention. At a first controller activation step 336, the controller drives a first FIS module to detect UDP flood attacks as described in the previous paragraph. The controller determines whether an attack has been detected, at an attack detection check step 338. Typically, the controller interprets a degree of attack value greater than a first threshold value as an indication that an attack is occurring. For example, the first threshold value may be 8 within the range of values 2 to 10. If an attack has been detected, the controller responds to the attack, as described hereinabove with reference to FIGS. 3 and 4, for instance, at an attack response step 340.

On the other hand, if a UDP flood attack has not been detected, network flood controller 60 determines whether there is at least a certain likelihood that an attack is occurring, at a potential attack detection check step 342. The controller interprets a degree of attack value greater than a second threshold value as an indication than a potential attack may be occurring, wherein the second threshold value is less than the first threshold value. For example, the second threshold value may be 7 with the range of values 2 to 10. If a potential attack is not detected, the method returns to step 336, at which the controller continues to monitor the first FIS module for an indication of a UDP flood attack.

If the controller detects a potential attack at step 342, the controller drives a second FIS module to detect ICMP back scattering, at an ICMP back scattering detection step 344. ICMP back scattering, also known as ICMP back propagation, is the outbound transmission of ICMP packets in response to receipt of spurious UDP packets by a host in the protected network. An increased level of ICMP back scattering generally occurs during a UDP flood attack. Based on the output of the second FIS module, the controller determines whether an attack has been detected, at an attack detection check step 346. If an attack has been detected, the controller responds to the attack, as described hereinabove with reference to FIGS. 3 and 4, for instance, at an attack response step 348. On the other hand, if no attack has been detected, the method returns to step 336 for continued UDP attack monitoring using the first FIS module.

The second FIS module operates in a manner generally similar to that of the first FIS module. The real-time input parameters of the second FIS module, however, typically include the degree of UDP attack outputted by the first FIS module (between 7 and 10, using the exemplary values described above), and a parameter representing a comparison of the number of inbound UDP packets and the number of outbound ICMP packets, which may be expressed on a logarithmic scale. The first of these parameters typically is mapped to three input membership functions (non-attack, potential attack, and attack), while the second parameter is typically mapped to two input membership functions (potential attack and attack). The degrees of membership outputted by the fuzzy analysis are applied to the output membership functions, which are typically the same three output membership functions used by the first FIS module. Two fuzzy logical OR (max) rules are generally used to combine the determined degrees of membership, using a similar approach to that illustrated in FIG. 13. For some applications, the second FIS module does not adapt the second membership function, because the normal value of the second parameter is typically deterministic. (ICMP errors should normally be minimal to non-occurring.) The second FIS module is typically configurable to adjust the detection according to the protected environment.

Additionally or alternatively, at potential attack detection check step 342, the controller may detect yet a third level of attack likelihood. Typically, the controller interprets a degree of attack value greater than a third threshold value as an indication that a potential attack may be occurring, wherein the third threshold value is less than the first and second threshold values. For example, the third threshold value may be 5 within the range of values 2 to 10. If a potential attack is detected, the controller detects suspect ICMP outbound bandwidth consumption by using non-fuzzy techniques. Such non-fuzzy techniques may include, for example, checking whether the ICMP portion of outbound traffic is greater than a threshold value, e.g., 90%. Upon detecting such suspect ICMP bandwidth consumption, the controller responds to the attack at attack response step 348. The controller may perform this additional ICMP back propagation detection either in addition to or instead of the potential attack determination described hereinabove.

In a further embodiment of the present invention, network flood module 50 is configured to detect stateless TCP SYN flood attacks. Parameters and techniques described hereinabove for detection of ICMP ping flood attacks may be employed for this purpose, mutatis mutandis. For example, the parameters typically include the intensity of inbound SYN packets and the SYN packet inbound traffic portion of all incoming TCP packets.

In yet another embodiment of the present invention, network flood module 50 is configured to detect mixed protocol flood attacks. Mixed protocol attacks are designed to saturate network bandwidth without changing the protocol distribution of packets entering the network. To detect such attacks, network flood module 50 typically utilizes two FIS modules, one for detecting inbound ICMP traffic, and the second for detecting inbound UDP traffic. The input parameters are inbound ICMP intensity and inbound UDP intensity, respectively. Protocol type portion input parameters are typically not used. The FIS modules outputs respective degrees of attack, which are analyzed in combination by the controller to detect a mixed flood attack. For some applications, the controller utilizes yet a third FIS module for this analysis. The third FIS module uses the two degrees of fulfillment as input parameters, and outputs a degree of fulfillment indicative of a mixed flood attack. Alternatively, the FIS module uses two intensities, of different types of traffic, as input parameters.

FIS module 62 may be adapted to detect fragmented flood attacks, as well. For this purpose, the FIS module analyzes UDP, ICMP, and TCP fragmented packets in the same manner as the module analyzes non-fragmented packets. Fragmented TCP SYN packets are likewise analyzed, but generally only if the fragmented packet size is greater than a threshold value, e.g., 60 bytes. Typically, trapping module 68, as described hereinbelow in the section entitled "The trapping module," takes fragmented packets into account when updating the trap buffers for only the following signature types: identification IP number, source IP address, destination IP address, packet size, and TTL.

The Real-Time Statistics Module

Reference is again made to FIG. 2. As shown in the figure, real-time statistics module 64 receives raw, unfiltered traffic arriving from WAN 26. The statistics module analyzes the traffic in real-time to calculate the parameters used as inputs into FIS module 62, as described hereinabove with reference to step 290 of FIG. 10. The statistics module also sends these parameters to learning module 66, for use in determining baseline traffic characteristics, as described hereinbelow with reference to FIG. 16.

In addition, the statistics module receives filtered traffic from filtering module 70. The statistics module analyzes this filtered traffic in real-time to calculate the parameters used as inputs into FIS module 62 for implementing closed feedback loop 72, as described hereinabove with reference to filtering state 162 and convergence state 168 of FIG. 4.

The Learning Module

Figure 16:
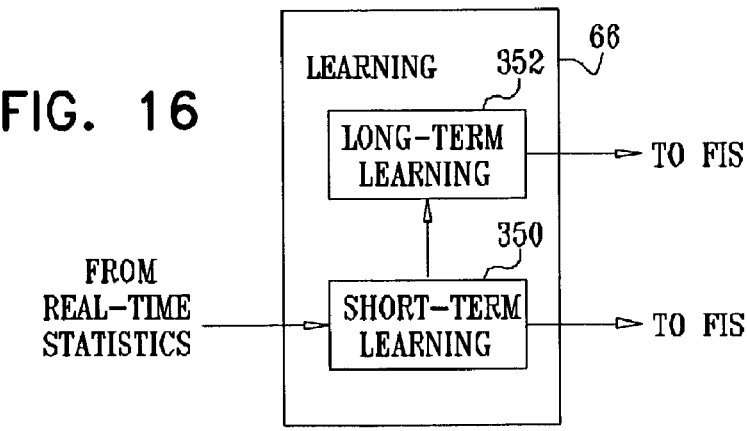
FIG. 16 is a block diagram that schematically illustrates components of a learning module, in accordance with an embodiment of the present invention.

FIG. 16 is a block diagram that schematically illustrates components of learning module 66, in accordance with an embodiment of the present invention. Learning module 66 typically comprises a short-term learning module 350 and a long-term learning module 352. In embodiments in which security system 20 is implemented as a network appliance, short-term learning module 350 is typically implemented in the appliance itself. Long-term learning module 352 may be implemented either in the appliance or external to the appliance, for example in a management server using a database.

FIS module 62 typically uses two types of statistics supplied by learning module 66: time of day/week differential averaging (24×7 statistics, which represent the average levels of different traffic parameters during each hour of each day in a typical week) and continuous Infinite Impulse Response (IIR) filtering (continuous averaging, with statistical weighting of the input traffic parameters decreasing as they become more remote in time). FIS module 62 typically uses the 24×7 statistics in situations in which network flood module 50 has stabilized over a sufficiently long period of time. Otherwise, the FIS module uses continuous IIR averaging over the entire period during which statistics have been collected.

Short-term learning module 350 typically performs two functions. Its first function is to act as an intermediary between statistics module 64 and long-term learning module 352. The short-term learning module receives parameters from statistics module 64, aggregates the parameters, and periodically updates long-term learning module 352, e.g., between about once every ten minutes and about once every hour, with the aggregated parameters. The short-term learning module typically performs this aggregation using simple linear averaging. The second function of the short-term learning module is to compile the IIR continuous averaging statistics, and periodically update FIS module 62 with these statistics.

Long-term learning module 352 receives the aggregated statistics from short-term learning module 350, and uses IIR filters to aggregate these statistics into separate hourly period for each hour of the week. The long-term learning module periodically (typically hourly) sends these hourly statistics to FIS module 62. The long-term learning module typically stores statistics for about six months.

For some applications, long-term learning module 352 uses the following formula to determine whether FIS module 62 should use 24×7 statistics:

$$R = \frac{\sum_{n=1}^{n=N}\left|1 - \frac{Y_n}{Y_{n-1}}\right|}{N} = \frac{\sum_{n=1}^{n=N} R_n}{N}$$

wherein R is an average value of convergence, N is the number of hours in one week (168 hours), and $Y_n$ is a series of average values measured during a given hour/day of the week over a certain number of previous weeks, e.g., 25 weeks. A value of R less than a threshold value, e.g. 4%, indicates that the data are sufficiently stable to allow the use of 24×7 statistics.

In order to develop 24×7 statistics, long-term learning module 352 typically averages each parameter of interest separately for each hour of the week, so as to determine an expected value for each parameter. Averaging for each hour is typically performed using asymptotical averaging with an IIR filter, such that the current expected value is a linear combination of the mean value for the most recent hour and the last expected value, taken with complementary weights:

$$Y_n = \alpha \cdot X_n + 1(1-\alpha) \cdot Y_{n-1},$$

wherein $Y_n$ is the expected value after the nth iteration, $X_n$ is the last mean value of the same parameter, and $\alpha$ is a weighting constant between 0 and 1. The equation can also be expressed as:

$$Y_n = \alpha \cdot \sum_{k=0}^{\infty}(1-\alpha)^k \cdot X_{n-k},$$

The value to be used for $\alpha$ may be determined from the following equation:

$$\alpha = \frac{\Delta T}{T}\ln\frac{1}{\beta}.$$

where $\Delta T$ is the interval between iterations, T is the fading period, and $\beta$ is an asymptotical limit (an accuracy factor). For example, if $\Delta T$=one week, $\alpha$=0.15, and $\beta$=0.05, the fading period T is up to 20 weeks. For all values of $\alpha$, the equations above give greater weight to recent values than to older values.

For some applications, learning module 66 may be configured to use the following values of $\alpha$, depending on how quickly an administrator would like the learning module to react to changes in parameter values:

Low: $\alpha$=1.2383×10$^{-6}$ (30 day response)

Med: $\alpha$=4.95×10$^{-6}$ (7 days response)

High: $\alpha$3.4673×10$^{-5}$ (day response)

Long-term learning module 352 typically discards extreme measurements when calculating the current value of each parameter (i.e., the value for the current hour). To discard the extreme measurements, the module typically divides each hour into a number of equal intervals, and calculates the mean of the values during each of the intervals. The module then calculates the mean and the standard deviation of these mean values. Any mean value for an interval that falls outside a certain number of standard deviations of the mean for the entire hour, e.g. 2 standard deviations, is discarded. The current value of each parameter is calculated by taking the mean of the non-discarded mean values of the intervals.

In order to perform continuous averaging (i.e., not 24×7 averaging), short-term learning module 350 continuously calculates mean values of each parameter for each time interval. The module applies IIR filtering to these mean values, typically using the equations described hereinabove. Appropriate values for the constants may be, for example, T=one hour, $\Delta T$=one second, $\beta$=0.05, and $\alpha$=0.00083. The result of the IIR filtering is a continuous average value for each parameter.

In an embodiment of the present invention, learning module 66 sets minimum floors for each of the frequency (data rate) parameters, using pre-configured default values. If a calculated frequency parameter is less than the floor, the learning module returns the value of the floor instead. The learning module may determine these floor for each protocol type by multiplying the bandwidth of the protected network by the appropriate Min value shown in a table 900 in FIG. 26.

Typically, both short-term learning module 350 and long-term learning module 352 additionally collect statistics for use by trapping module 68 as baseline values. Such statistics may include, for example, incoming frequencies of different types of packets (typically expressed in packets per second).

In collecting these statistics, the learning modules typically employ the same techniques they use for collection of statistics for FIS module 62, mutatis mutandis.

The Trapping Module

When network flood controller 60 determines that an attack is occurring, the controller directs trapping module 68 to attempt to characterize the attack by developing one or more signatures of packets participating in the attack. Filtering module 70 uses these signatures to filter out packets participating in the attack. The signatures typically are values of one or more packet header fields, or, in some cases, information from the packet payload, e.g., UDP DNS query string. Trapping module 68 may employ a number of different signature types. A signature type identifies the packet header field in which a signature is found, and a signature is a value of the field.

Trapping module 68 typically determines signatures of attack packets using a separate trap buffer for each signature type. The trap buffers use probability analysis to distinguish between expected and unexpected repetition rates of each signature value. The trapping module receives baseline historical repetition rates of the signature values from learning module 66. (System 20 may be configurable to allow setting of minimum threshold values, and/or to provide default threshold values.)

The different signature types are typically organized into several groups. A first group of signature types is the "hierarchy group." Examples and further explanation of the hierarchy groups are provided hereinbelow. This group of signature types is ordered based on the probability of repetition of values of the signature, i.e., the level of specificity of each signature type. The more specific a signature type is (i.e., the lower the probability of repetition), the more likely the signature type is to block only packets participating in the attack, thereby avoiding false positives. However, greater specificity often results in incomplete or ineffective blocking of attack packets.

Upon entering trap buffers state 152, controller 60 directs trapping module 68 to attempt to determine as many signature types from the hierarchy group as possible. The hierarchy group typically includes the following signature types in the following order, from most specific to least specific:

TCP Sequence Number
IP Identification Number
Source Port
Source IP Address
Type of Service (ToS)
Packet Size
ICMP Message Type
Destination Undefined Port
Destination Undefined IP Address
Destination Defined Port
Destination Defined IP Address
Time-to-Live (TTL)

Each of these signature types can be used as a stand-alone criterion for filtering attack packets, i.e., independently of any other signature types in the hierarchy group or any other group. Therefore, as filtering module 70 adds more signature types to the filtering in order to increase the level of filtering, each additional signature type from the hierarchy group is typically added with an "OR" relationship.

A second group of signatures types is the "dependent group," which includes conditional signature types. Trapping module 68 attempts to identify signatures of these types only when the module detects signatures of certain types in the hierarchy group. Signatures of types in the dependent group are filtered only in conjunction with their parent signatures in the hierarchy group, i.e., using an "AND" relationship between the parent signature and the dependent signature.

The dependent group typically includes the following signature types:
- Transport layer checksum
- DNS query signatures, which include ID number, Qcount, and Qname Trapping module 68 typically attempts to identify a transport layer checksum signature pursuant to the following conditions:
- During a UDP flood attack, the trapping module attempts to identify a transport layer checksum signature only if all of the following hierarchy group signatures have been identified: source port, source address, destination port, destination address, and packet size.
- During an ICMP flood attack, the trapping module attempts to identify a transport layer checksum signature only if both of the following hierarchy group signatures have been identified: message type and packet size.
- During a stateless TCP SYN flood attack, the trapping module does not attempt to identify a transport layer checksum signature.

Trapping module 68 typically attempts to identify one or more DNS query signatures only upon identifying a Destination Defined Port signature (from the hierarchy group) having a value of 53, which indicates a UDP port. To identify these DNS query signatures, the trapping module analyzes only UDP DNS query packets, as indicated by the QR flag. Each of the three types of DNS query signatures (ID number, Qcount, and Qname) is typically separately configurable to be enabled or disabled.

A third group of signatures types is the "sub-hierarchy group," which includes signature types that are used in conjunction with signatures of the hierarchy group, in an "AND" relationship. Trapping module 68 attempts to identify signatures of these types upon entering trap buffers state 152, although controller 60 only directs filtering module 70 to use sub-hierarchy signatures when in sub-hierarchy state 166, as described hereinabove with reference to FIG. 4.

The sub-hierarchy group typically includes the following signature types:
- Packet size (sub-hierarchy signature type 1)
- TTL (sub-hierarchy signature type 2)
- ToS (sub-hierarchy signature type 3)

Reference is now made to FIGS. 17A and 17B, which are tables that set forth certain properties of trap buffers, in accordance with an embodiment of the present invention. Trapping module 68 typically comprises more than one general type of trap buffer. For example, the trapping module may implement a first type of trap buffer for more complex signature identification (referred to herein as a "Type I trap buffer"), and a second type of trap buffer for less complex signature identification (referred to herein as a "Type II trap buffer"). The trapping module assigns each signature type (from all signature groups) to an appropriate trap buffer. FIGS. 17A and 17B show a table 380 and a table 390, respectively, that set forth certain properties of Type I and Type II trap buffers, respectively, as configured for signature types that use such trap buffers. The properties set forth in the tables are described hereinbelow with reference to FIGS. 13 and 14.

FIG. 18 is a schematic illustration of a trap buffer, in accordance with an embodiment of the present invention. Trapping module 68 uses the trap buffer in order to determine a signature for a particular signature type. Each trap buffer comprises a limited-length matrix 400. The number of rows of the matrix, $N_{trap}$, varies depending upon the signature type; for example, the values for $N_{trap}$ shown in tables 380 and 390 may be used. Trapping module 68 uses matrix 400 to accumulate information regarding incoming values of the signature type. Typically, matrix 400 has three columns:
- an arrival time column 402, for storing the most recent time of arrival of a packet with a given signature value;
- a value column 404, for storing the signature value; and
- a counter column 406, for counting the number of occurrences of the value.

FIG. 19 is a flow chart that schematically illustrates a method for populating a Type I trap buffer, in accordance with an embodiment of the present invention. Upon initialization of a new Type I trap buffer, trapping module 68 clears matrix 400, at a clear matrix step 420. The trapping module receives a value of the signature type being trapped, at a receive value step 422. The trapping module looks for the value in column 404 of matrix 400, at a value search step 424. The trapping module determines whether the value was found, at a value found check step 426. If the value was not found, the trapping module stores the value in an empty row of matrix 400, along with the arrival time of the value, at an add value step 428. If all rows of the matrix have previously been populated with values, the trapping module clears the row with the oldest arrival time value, and inserts the new value in its place. (The trapping module may maintain a pointer to the oldest entry in order to facilitate rapid determination of the oldest value.) The trapping module zeroes the entry in counter column 406 of the row in which the new signature value has been placed, at a zero counter step 430.

On the other hand, if the signature value was found at check step 426, the trapping module determines whether the value arrived within the oblivion time of the value, at an oblivion check step 432. The trapping module makes this determination by comparing the arrival time of the value with the previous arrival time for the value stored in column 402 of matrix 400. The trapping module interprets a difference between these arrival times that is greater than an oblivion value, $\Delta t_{ob}$, as an indication that the newly-received value is probably unrelated to the previously received value from a risk-of-attack point of view. Therefore, if the oblivion time has expired, the trapping module zeroes the counter of the value in column 406, at a zero counter step 434. The trapping module stores the new arrival time in column 402 and returns to step 422 to receive another value.

If the oblivion time has not expired, however, the trapping module increments the counter of the value, at an increment counter step 436. At a threshold check step 438, the trapping module then checks whether the counter exceeds a threshold value, $C_{block}$, which may be calculated as described hereinbelow. If the counter exceeds the threshold, the trapping module interprets the value as a signature of an attack, and returns the value to the controller, at a signature identification step 440. Otherwise, the trapping module returns to step 422 to receive another value.

For some applications, for Type I trap buffers, trapping module 68 dynamically updates $C_{block}$ each time network flood controller 60 transitions to trap buffers state 152 (FIG. 4). The trapping module typically uses the following equation to determine $C_{block}$:

$$C_{block} = \text{MAX}\left\{C_{LOWER\_LIMIT}, C_{min}, \left[\frac{N_{trap}}{M}\left(\frac{r_n \Delta t_{ob}}{2} + N_{trap}\right)\right] \times \text{factor}\right\}$$

wherein:
$C_{LOWER\_LIMIT}$ is a constant lower limit for $C_{block}$, e.g., 100 in the first transition to trap buffers state 152 for a given attack, and 50 in subsequent transitions to state 152 for the same attack;

$C_{min}$ is a packets per second limitation factor, as determined using the following equation:

$$C_{min} = I_{REL} \times \text{state\_duration} \times \text{dist\_factor}$$

wherein:

$I_{REL} = I_{ATTACK} - I_{NORMAL}$, state_duration=the duration of operation of trap buffer state 152, measured in seconds, and dist_factor=a distribution factor (default typically equals 0.02);

$N_{trap}$ is the size of the trap buffer;

$r_n$ is the adapted normal rate, i.e., the normal packets per second values (TCP, UDP or ICMP) learned by learning module 66;

$\Delta t_{ob}$ is the oblivion time; and

M is the maximum number of different possible signature values for a given signature type, as shown for example in the second column of FIG. 17A.

The default factor is typically set to 20.

The oblivion time, $\Delta t_{ob}$, is typically pre-defined for each signature type. In order to derive pre-defined default oblivion times, the following inequality may be used to determine the range of values that should be used for this parameter:

$$\Delta t_{ob} << \frac{2}{r_n}\left(\frac{C_{block} M}{N_{trap}} - N_{trap}\right)$$

To derive pre-defined default oblivion times for trap buffers for IP/Port signatures, the following inequality may be used instead of the inequality above:

$$\Delta t_{ob} < \frac{1}{r_{IP}/r_{PORT}}$$

In the case of Type II buffers, the controller calculates the threshold, $N_{block}$, in real-time by multiplying the current intensity of traffic of the type participating in the attack, $I_{PPS}$, measured in packets per second, by $\beta_i$, which is a value between 0 and 1. The controller typically performs this calculation each time the controller enters trap buffers state 152. Network flood protection module 50 may assign an independent value to $\beta_i$ for each combination of signature type and protocol type. For example, values of $\beta_i$ for ICMP, TCP, and UDP may be 0.01, 0.1, and 0.05, respectively.

For populating a Type II trap buffer, trapping module 68 typically uses a method similar to that described hereinabove with reference to FIG. 19 for populating a Type I trap buffer. Upon initialization of a new Type II trap buffer, trapping module 68 clears matrix 400. When the trapping module receives a value of the signature type being trapped, the trapping module looks for the value in column 404 of matrix 400. If the trapping module does not find the value, it adds the received value to the matrix. However, if the trapping module finds the value in the matrix, the trapping module determines whether the duration between receipt of two consecutive packets, T, is greater than the timeframe used by the system (typically one second). If T is greater than the timeframe, the trapping module resets the entry in counter column 406 of the matrix. In any event, the trapping module increments the counter of the value.

The trapping module then checks whether the counter exceeds a threshold value, $N_{block}$, which may be calculated as described hereinabove. If the counter exceeds the threshold, the trapping module interprets the value as a signature of an attack, and returns the value to the controller. Otherwise, the trapping module returns to the beginning of the method to receive another value.

The Filtering Module

When activated by network flood controller 60, filtering module 70 (a) receives traffic from WAN 26, (b) selectively filters the traffic using the signatures determined by trapping module 68, and (c) passes filtered traffic 56 to protected network 22. Alternatively, in implementations that include stateful connection module 52, the filtering module instead passes filtered traffic 56 to the stateful connection module for further attack detection and filtering, as appropriate. In addition, filtering module 70 passes filtered traffic 56 to statistics module 64, for analysis as input to FIS module 62.

In embodiments in which security system 20 is implemented as a network appliance, filtering module 70 is typically implemented within the appliance. Alternatively, the filtering module may be remotely implemented upstream from the appliance (i.e., towards WAN 26), for example in a router or other network element.

The Stateful Connection Protection Module

Overview

Reference is again made to FIG. 2. Stateful connection protection module 52 comprises at least one stateful connection controller 500, which controls and coordinates the operation of the components of the stateful connection protection module. Module 52 also typically comprises the following components:

a stateful inspection module 502, which tracks all connections between elements 24 of protected network 22 and remote elements communicating with the protected network over WAN 26 (FIGS. 1A and 1B);

a spectrum analyzer module 504, which aggregates time measurements made by stateful inspection module 502, and transforms the time measurements into the frequency domain;

a fuzzy logic inference (FIS) module 506, which uses fuzzy logic to analyze the frequency domain characteristics that are output by spectrum analyzer module 504, in order to detect attacks;

a filtering module 508, which selectively filters incoming packets to block attacks, and determines when an attack has terminated;

an anti-spoof module 510, which validates IP source addresses by confirming the receipt of retransmit SYN packets, as expected from legitimate (non-spoofed) TCP/IP stacks.

Stateful inspection module 502, spectrum analyzer module 504, FIS module 506, and filtering module 508 are arranged in a feedback loop 512, under the control of stateful connection controller 500, as described hereinbelow. Stateful connection protection module 52 may comprise a separate controller and set of modules for each different type of network service that the module is configured to protect.

The Stateful Connection Controller

Figure 20:
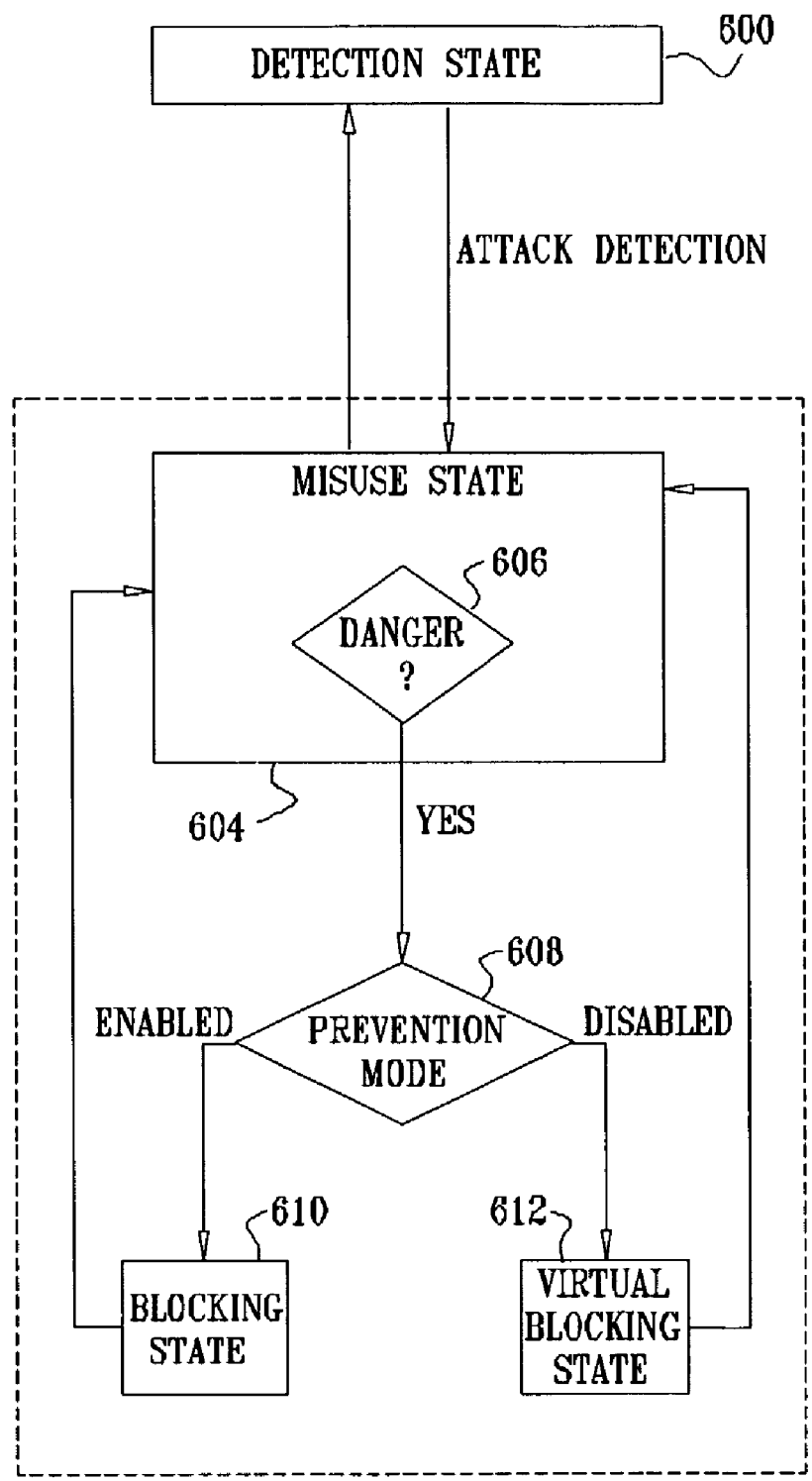
FIG. 20 is a block diagram that schematically illustrates states of a stateful connection controller, in accordance with an embodiment of the present invention.

FIG. 20 is a block diagram that schematically illustrates states of stateful connection controller 500, in accordance with an embodiment of the present invention. Stateful connection controller 500 is typically implemented as a finite state machine. The controller makes transitions between states according to predetermined rules, responsively to its previous operational state and to real-time input from FIS module 506 and other modules. As mentioned above, the controller is part of a feedback loop, and therefore continuously receives input from the FIS module in order to determine the effective of filtering in light of current attack levels and characteristics.

Stateful connection controller 500 typically utilizes a number of flags and/or counters, including:

- a stabilization counter (measured in seconds, and alternatively referred to hereinbelow and in the figures as "TIC"), which is an indication of the stability of an attack degree in misuse state 604, as described hereinbelow. The controller increments the stabilization counter periodically, typically once per second, when the attack degree is high in the misuse state;
- a non-attack counter, which measures continuous seconds of absence of attack in misuse state 604 (the non-attack counter may be implemented as a timer using a scheduler); and
- a consistency counter (measured in seconds, and alternatively referred to hereinbelow and in the figures as "Stabil"), which is a measure of the consistency of an attack degree in blocking states 610 and 612, as described below. The consistency counter thus serves as a measure of negative feedback stability, i.e., indicating the occurrence of a stable, continuing attack. Controller 500 increments the consistency counter periodically, typically once per second, when the attack degree is high in the blocking states. The controller uses the consistency counter and the stabilization counter in generally the same manner, but in different states.

The use of such counters is described herein by way of example and not limitation. Other possible control techniques will be readily apparent to those skilled in the art who have read the present patent application.

The default state of stateful connection controller 500 is a detection state 600. Each time the controller enters this state, the controller resets all of the counters and clears the sort buffer, which are described hereinbelow. The controller continuously monitors the output from FIS module 506, which output is indicative of a degree of attack.

When FIS module 62 outputs a degree of attack value indicative of an attack, the controller transitions to a misuse state 604. Given a range of possible degree of attack values between 2 and 10, stateful connection controller 500 typically interprets a value of at least 8 as indicative of an attack.

Controller 500 maintains a sort buffer, which is a list of the most dangerous source addresses and their connection parameters (e.g., source port), for each protected service. For each source address in the sort buffer, the sort buffer maintains an intensity counter of the number of misused connections that the source address owns. The controller determines misused connections responsively to the results of the spectrum analysis, as provided by spectrum analyzer module 504, which is described hereinbelow. During an attack, the controller sorts the sort buffer once per timeframe (typically once per second) according to the intensity counter. The controller additionally maintains a blocking list, which contains a list of source addresses that are currently blocked by filtering module 508, as described hereinbelow with reference to FIG. 21.

While in misuse state 604, stateful connection controller 500 directs FIS module 506 to periodically determine the degree of attack, typically once per second. If the degree of attack indicates that an attack is occurring (e.g., a degree of attack greater than 8 in a range between 2 and 10), the controller increments the stabilization counter and resets the non-attack counter. On the other hand, for each period, typically each second, that the degree of attack indicates that an attack is not occurring (e.g., a degree of attack less than 8), the controller increments the non-attack counter and resets the stabilization counter.

At a danger check step 606, the controller determines whether an attack intensity of a dangerous level is occurring. The controller typically uses one of the following two approaches for making this determination, or both in combination. According to a first approach, the controller makes the danger determination when the stabilization counter reaches a certain threshold U, e.g., between about 2 and about 15 seconds, such as 5 seconds, indicating that an attack has continued for this period of time. According to a second approach, the controller makes the danger determination by evaluating the sort buffer for patterns indicative of an attack. For example, the controller may make the danger determination when the intensity counter (i.e., the number of misused connections) of the highest-ranked source address in the sort buffer exceeds a threshold value M, e.g., between about 10 and about 50 misused connections. If input from module 506 indicates that an attack has not occurred for a certain period of time, e.g., between about 10 and about 20 seconds, as indicated by the non-attack counter, the controller transitions back to detection state 600.

Upon determination that a dangerous attack intensity is occurring, the controller checks whether stateful connection protection module 52 has been configured to prevent attacks, or only to identify attacks, at a prevention check step 608. If the module is configured to prevent attacks, the controller transitions to a blocking state 610; otherwise, the controller transitions to a virtual blocking state 612. In these states, module 52 blocks stateful connection traffic of a certain type or types, which originates from a certain set of source addresses that are involved (or suspected of being involved) in an attack on the protected network.

Figure 21:
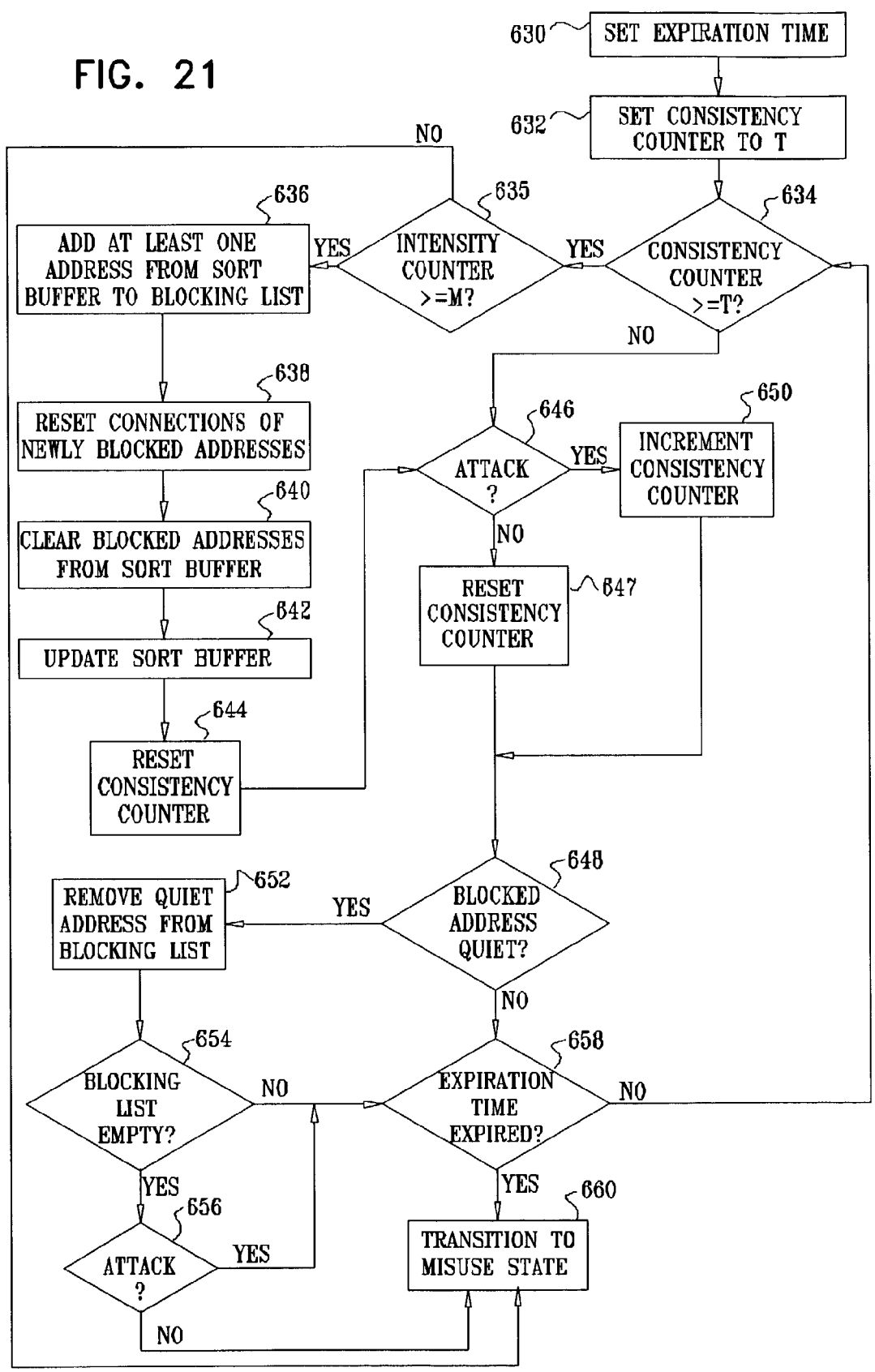
FIG. 21 is a flow chart schematically illustrating a method performed by a controller while in a blocking state, in accordance with an embodiment of the present invention.

FIG. 21 is a flow chart schematically illustrating a method performed by controller 500 while in blocking state 610, in accordance with an embodiment of the present invention. Upon entering blocking state 610, the controller sets an expiration time period for blocking state 610, e.g., to between about 60 and about 120 seconds, at an expiration time set step 630. Upon expiration of this period, the controller clears the blocking list and returns to misuse state 604. At a set consistency counter step 632, the controller sets the consistency counter equal to a constant T, such as 4. (Setting the consistency counter to T causes the controller to immediately add a first source address to the blocking list, as described below with reference to a step 634.)

At consistency counter check step 634, controller 500 determines whether the consistency counter is at least T. A positive indication occurs automatically upon entering blocking state 610, since the consistency counter is set to T at step 632. Subsequently, a positive determination indicates that system 20 has experienced stable negative feedback, i.e., an attack has continued, despite filtering, for at least T seconds. In either case, when the consistency counter is greater than or equal to T, the controller checks whether the intensity counter of the highest-ranked source address in the sort buffer exceeds threshold M, at an intensity check step 635. If the controller finds that the intensity counter is less than M, the controller typically returns to misuse state 604, at a transition step 660. (The reason for this transition may be that continued ineffective blocking is pointless, and the sort buffer does not contain additional source addresses that are likely to increase the effectiveness of blocking.) If, however, the controller finds that the intensity counter exceeds M, the controller adds one or more source addresses from the sort buffer to the blocking list, at a blocking list addition step 636. When adding these addresses to the blocking list, the controller generally gives priority to addresses in the sort buffer that have the highest intensity counters, determined as described below with reference to FIG. 22. Source addresses on the blocking list are filtered by filtering module 508, as described hereinbelow. For any given attack, the first time the controller adds source addresses to the blocking list (i.e., immediately upon entering blocking state 610), the controller typically adds only a single address. When adding additional addresses during the same attack, the controller typically adds two more addresses each time the consistency counter condition is satisfied at step 634.

After adding the additional addresses to the blocking list, controller 500, at a reset connections step 638, directs stateful inspection module 502 to reset all TCP connections associated with the blocked source addresses (for the relevant protected service), as described hereinbelow in the section entitle "The stateful inspection module." At a clear blocked sources step 640, the controller clears from the sort buffer source addresses that have been added to the blocking list. The controller updates the sort buffer, at an update sort buffer step 642, as described hereinbelow with reference to FIG. 22. The controller then resets the consistency counter, at a reset consistency counter step 644, and proceeds to an attack check step 646, which is described below.

Returning now to step 634, if controller 500 finds at this step that the consistency counter is less than T, the controller periodically, typically once per second, directs module 506 to analyze filtered traffic 58, at attack check step 646. The purpose of this analysis is to determine whether filtering module 508 successfully filtered the attack during the current second. This analysis of the filtered traffic is an implementation of feedback loop 512 (FIG. 2). If the filtering module successfully filtered the attack, the controller resets the consistency counter, at a reset consistency counter step 647. Otherwise, the controller increments the consistency counter, at an increment consistency counter step 650. From both steps 647 and 650, the controller proceeds to a blocked address quiet check step 648, which is described below.

Successful filtering of the attack does not necessarily imply that the attack has ceased. In order to determine whether the attack has ceased, controller 500 monitors each blocked IP address to see whether the IP address has tried (and failed, because of the blocking) to open a new TCP connection to the protected service, at step 648. If the controller determines that one of the blocked IP addresses has not tried to open a TCP connection for at least a threshold period of time, such as between about 5 and about 15 seconds, the controller removes the IP address from the blocking list, at a blocking list removal step 652. In addition to enabling a determination that the attack has ceased, as described below, removing inactive IP addresses from the blocking list may decrease the likelihood of blocking legitimate traffic.

Upon removing an address from the blocking list, controller 500 checks whether the blocking list is now empty, at a blocking list empty check step 654. If the blocking list is empty, the controller determines whether the attack has ceased, based on input from FIS module 506, which analyzes the non-filtered traffic, at an attack determination step 656. If the controller finds that the attack has ceased, the controller transitions back to misuse state 604, at transition step 660. If the controller finds that the attack has not ceased, the controller checks whether the expiration time set at step 630 has expired, at an expiration check step 658. If the time has expired, even though it may appear that the attack has not ceased, the controller transitions back to misuse state 604, at a transition step 660. Otherwise, the controller returns to step 634 and continues to monitor and react to the attack.

Alternatively, if controller 500 finds at step 654 that the blocking list is not empty, or at step 648 that none of the IP addresses on the blocking list is quiet, the controller still checks whether the expiration time set at step 630 has expired, at expiration check step 658, and then takes action accordingly.

Although the steps of the method of FIG. 21 have been described as generally occurring sequentially, this sequential order is presented mainly for the sake of clarity of description. In actual implementations of system 20, a number of the steps, particularly the check steps, generally occur simultaneously.

In virtual blocking state 612, system 20 detects attacks as in normal operation, but does not filter traffic to protect against the attacks. Administrators, before making a decision to enable true blocking, are able to use state 612 to monitor and analyze attacks and to assess the expected behavior of system 20 were true blocking to be enabled. The system is typically configurable to enable detection-only mode by type of attack and/or type of controller. In the virtual blocking state, the controller generally performs the same steps as in blocking state 610, except for the following differences:

Instead of blocking the next address in the sort buffer at step 634, the controller sends an administrative alert that the next address in the sort buffer would be blocked in normal blocking mode; and At step 638, the controller does not reset the connections of blocked sources.

In addition, in virtual blocking state 612, the controller typically ignores any test statistics that refer to the blocked address.

Figure 22:
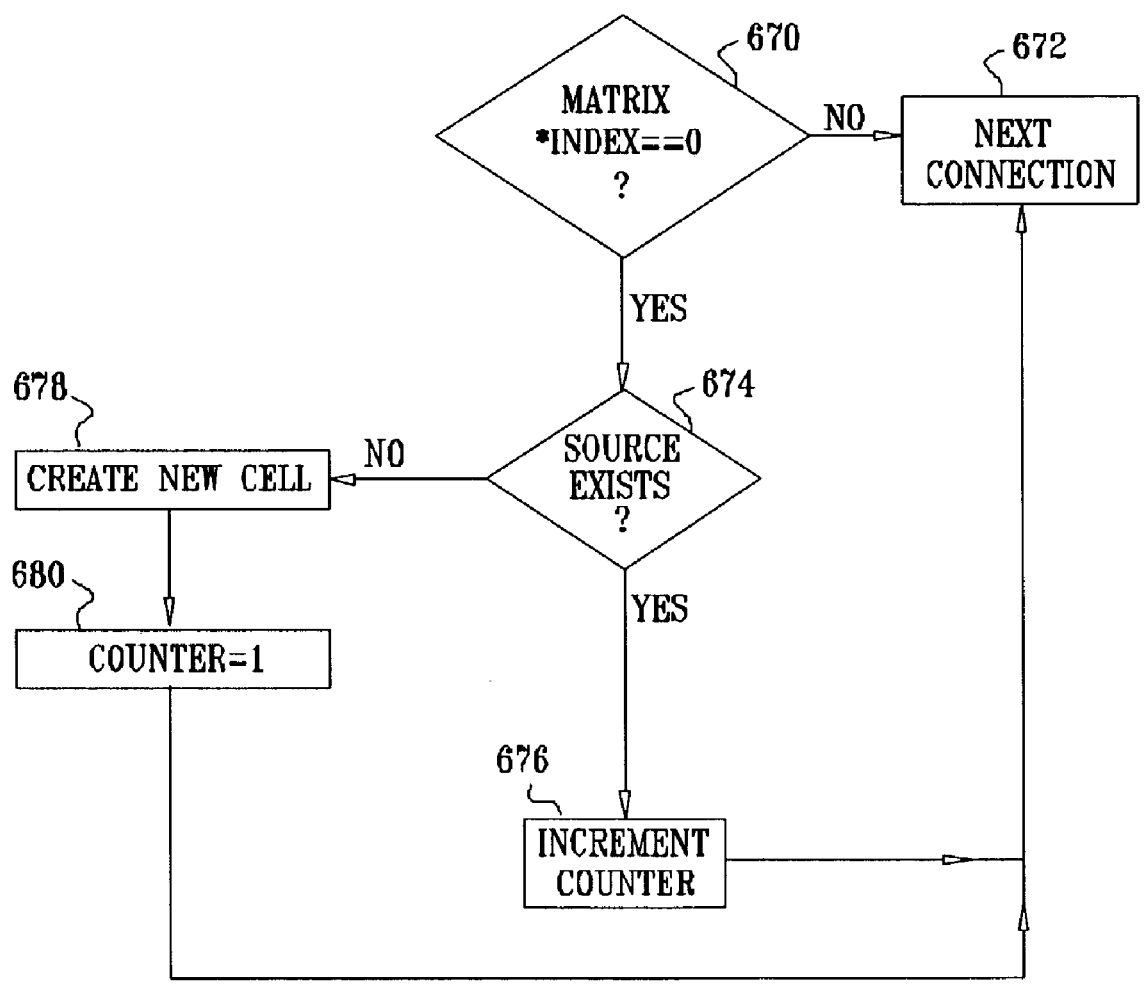
FIG. 22 is a flow chart that illustrates a method for updating a sort buffer, in accordance with an embodiment of the present invention.

FIG. 22 is a flow chart that illustrates a method for updating the sort buffer of controller 500 at step 642 in the method of FIG. 21, in accordance with an embodiment of the present invention. The controller uses this method to count the number of misused TCP connections associated with each unique source address in the sort buffer. The controller periodically, typically once per second, performs this method for each connection tracked by stateful inspection module 502.

At an index check step 670, controller 500 checks whether the matrix index of a connection equals 0. As described in more detail hereinbelow with reference to FIG. 24, each region (typically, but necessarily, a rectangle) of the spectrum matrix is assigned a unique matrix index. Matrix index 0 is the region characterized by the lowest frequency and payload parameters. System 20 updates the matrix index of each connection during each timeframe (typically once each second). Connections most likely to be dangerous commonly fall in the region of matrix index 0. If the controller finds at step 670 that the index does not equal zero, it goes on to check another connection, at a next connection step 672, until the controller has checked all the connections.

If, however, the matrix index of the connection equals 0, indicating that the connection is potentially misused, the controller checks whether the source address of the connection already exists in the sort buffer, at a source existence check step 674. If the source address already exists in the sort buffer, the controller increments the intensity counter of the source address, at an increment counter step 676. The controller then applies the method to the next connection, at step 672.

On the other hand, if at step 674 the controller determines that the source address does not already exist in the sort buffer, the controller creates a new cell in the sort buffer for the new source address, at a new cell creation step 678. The controller sets the intensity counter for this address to 1, at a counter set step 680. The controller then proceeds to the next connection, at step 672.

Once the controller has updated the intensity counters for all connections, the controller sorts the source addresses in the sort buffer according to the intensity counters of the source addresses. The controller typically considers the top 10 source addresses as the most likely candidates for blocking, as described hereinabove with reference to step 636 of FIG. 21.

FIGS. 23A and 23B are a table 700 summarizing actions of controller 500 in various states, in accordance with an embodiment of the present invention.

The table shows typical actions stateful connection controller 500 takes in each of its states. The first column lists the different states, and the second column indicates whether or not FIS module 62 currently detects an attack, based on analysis of traffic 56, which has not been filtered by filtering module 508. The third column indicates whether the intensity counter (I) of the highest-ranked source address in the sort buffer exceeds a threshold value M, such as between about 10 and about 50 misused connections. The fourth column indicates whether stable negative feedback has been achieved in misuse state 604, based on the value of the counter TIC, as described hereinabove with reference to FIG. 20. The fifth column indicates whether stable negative feedback has been achieved in blocking states 610 and 612, based on the stability counter, as described hereinabove with reference to FIG. 20. The sixth column indicates whether the attack has ceased, as indicated by determining that all source addresses have been removed from the blocking list, as described hereinabove with reference to step 654 of FIG. 21. The remaining columns summarize the actions performed and feedback provided by the controller based on the conditions specified in the first six columns.

The Stateful Inspection Module

Stateful inspection module 502, which comprises a TCP state machine and session handlers, tracks all connections between elements 24 of protected network 22 and remote elements communicating with protected network over WAN 26 (FIGS. 1A and 1B). The TCP state machine implemented by module 502 is similar to TCP state machines used in typical TCP stack implementations (see, for example, DARPA RFC 793). The module measures statistics for each connections, such as TCP packet rate (Hz), TCP average load (bytes/packet), and transition frequencies between protocol states both in the transmission and the application layers. The module typically aggregates these statistics once per second. The module passes the aggregated results to spectrum analyzer module 504.

For each connection it tracks, stateful inspection module 502 typically records and keeps the following information current in real-time:
  source IP address;
  destination IP address;
  source port;
  destination port; and
  sequence and acknowledgment numbers.

This information enables the stateful inspection module to reset any given TCP connection when directed to do so by the controller in blocking state 610, at step 644 of FIG. 21.

Typically, stateful inspection module 502 additionally checks whether each connection is behaving according to protocol standards, and drops packets that do not comply with the standards.

The Spectrum Analyzer Module

Spectrum analyzer module 504 uses statistical methods to collect, filter, correlate, and analyze time-series data received from stateful inspection module 502, in order to detect abnormal traffic patterns. Module 504 is typically implemented using digital signal processing techniques.

Figure 24:
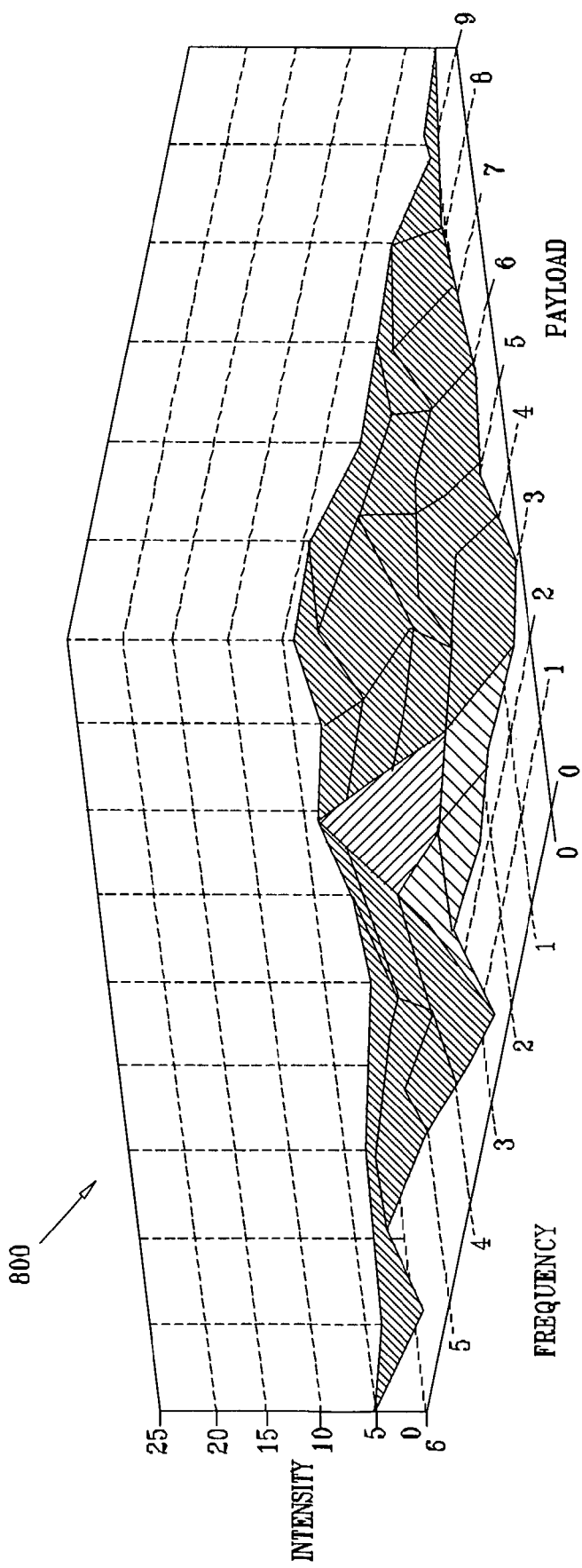
FIG. 24 is a three-dimensional graph showing an exemplary spectrum matrix, in accordance with an embodiment of the present invention.

FIG. 24 is a three-dimensional graph showing an exemplary spectrum matrix 800, in accordance with an embodiment of the present invention. The spectrum analyzer module typically aggregates two traffic features received from stateful inspection module 502: the frequency of receipt of packets on TCP connections (in Hz, i.e., packets/sec), and the average payload size (in bytes) of these packets. The module typically performs this aggregation once per second. For each combination of these traffic features, the module calculates an intensity, which is equal to the number of connections exhibiting this combination of the features during a given timeframe. In spectrum matrix 800, payload and frequency are plotted on the x- and y-axes, respectively, and intensity is plotted on the z-axis.

As can be seen in the graph, by transforming traffic parameters into the frequency domain, module 502 is able to detect unusual traffic activity. In this example, connections in the lower left corner exhibit low packet frequency and low packet payload with relatively high intensity. This sort of intense, low-frequency behavior is characteristic of connection flood attacks, such as DoS and DDOS attacks using NAPTHA tools, HELO (SMTP) flood attacks, File Transfer Protocol (FTP) flood attacks, Post Office Protocol (POP) flood attacks, Internet Message Access Protocol (IMAP) flood attacks, and other attack types, both known and unknown. Spectrum analyzer module 504 performs index calculations every timeframe, typically every second, in order to refresh the intensity counters in the spectrum matrix.

Module 504 divides the spectrum matrix into regions (typically, but not necessarily, rectangles), each of which is characterized by a range of payload sizes in a first dimension, and a range of frequencies in a second dimension. Each region of the spectrum matrix is assigned a unique matrix index. Matrix index 0 is the region characterized by the lowest frequency and payload parameters. Connections most likely to be dangerous typically fall in the region of matrix index 0. For example, module 504 may use the following payload limits for setting the boundaries of the regions in the payload dimension:
  less than 1 byte/packet,
  between 1 and 10 bytes/packet,
  between 11 and 100 bytes/packet,
  between 101 and 300 bytes/packet,
  between 301 and 600 bytes/packet,
  between 601 and 1000 bytes/packet,
  between 1001 and 1500 bytes/packet, and
  greater than 1500 bytes/packet.

P Module 504 may use the following frequency limits for the second dimension for protected networks having a bandwidth of greater than 2 Mbits/sec:
  less than 0.05 Kbit/sec,
  between 0.05 and 1.25 Kbit/sec,
  between 1.25 and 5 Kbit/sec,
  between 5 and 10 Kbit/sec,
  between 10 and 33 Kbit/sec, and
  greater than 33 Kbit/sec.

Module 504 may use the following frequency limits for protected networks having a bandwidth of no more than 2 Mbits/sec:
  less than 0.05 Kbit/sec,
  between 0.05 and 1 Kbit/sec,
  between 1 and 3 Kbit/sec,
  between 3 and 7 Kbit/sec,
  between 7 and 20 Kbit/sec, and
  greater than 20 Kbit/sec.

Module 504 may implement the following algorithm for updating the matrix index of each region of the spectrum matrix in each timeframe:

P≡Payload

F≡Frequency ix≡Matrix_Entry

M≡Matrix

P1, P2, . . . , P6≡Payload_Limits

F1, F2, . . . , F5≡Frequency_Limits if (P<P1)
   ix=0;

elseif (P<P2)
   ix=6;

elseif (P<P3)
   ix=12;

elseif (P<P4)
   ix=18;

elseif (P<P5)
   ix=24;

elseif (P<P6)
   ix=30;

else
   ix=36;

if (F<F1);
   ix;

elseif (F<F2)
   ix+=1;

elseif (F<F3)
   ix+=2;

elseif (F<F4)
   ix+=3;

elseif (F<F5)
   ix+=4;

else
   ix+=5;

*M(+ix)++

Return.

In the above code, the following payload size parameters may be used: P1=1; P2=11; P3=101; P4=301; P5=601; P6=1001. For protected networks having a bandwidth of greater than 2 Mbits/sec, the following frequency parameters may be used: F1=0.05; F2=1.25; F3=5; F4=10; F5=33; while for protected networks having a bandwidth of no more than 2 Mbits/sec, the parameters may be: F1=0.05; F2=1; F3=3; F4=7; F5=20.

FIG. 25 is a chart showing exemplary matrix indices 350 of a spectrum matrix 352, in accordance with an embodiment of the present invention. Each combination of payload group and frequency group defines a region 354 that is characterized by a single matrix index 350 (expressed in the example in units of thousands of connections). An attack zone 356 comprises four regions 354 in the upper left corner of matrix 352. Module 504 analyzes the matrix indices of the regions in the attack zone for indications of an attack.

Spectrum analyzer module 504 typically uses the results of the spectral analysis to derive three features that serve as inputs to FIS module 506:

Intensity, which is defined as the matrix index 350 having the greatest value in attack zone 356 of spectrum matrix 352. In the example shown in FIG. 25, the matrix index at coordinates (payload group 1, frequency group 1) has the greatest value, 16.01;

Portion, which is defined as the ratio of the sum of the matrix indices in attack zone 356 to the sum of the matrix indices in a normal area 358, which typically comprises all regions 354 of spectrum matrix 352 other than those in attack zone 356. In the example shown in FIG. 25, the sums of the matrix indices in the attack zone and the normal area are 36.57 and 153.67, respectively, resulting in a portion 36.57/153.67=0.24; and Noise, which is defined as the maximum matrix index in normal area 358 In the example shown in FIG. 25, this matrix index is found in region 360, and has a value of 5.65. (optionally, noise may be defined as the nth highest matrix index in normal area 358, in order to lower the noise parameter if desired.) FIS module 506 typically uses this feature to adaptively adjust the fuzzy membership functions during each timeframe, as described hereinbelow with reference to FIG. 11.

In an embodiment of the present invention, spectrum analyzer module 504 employs IIR filters to smooth frequency and/or payload values of each TCP connection. As a result, the module generally disregards transient drops in these values, which commonly occur during normal Internet communication. The IIR filters smooth the sudden falling off of the value, and respond quickly to a rise in the value when it recovers.

Module 54 typically applies the IIR filters once in each timeframe, to each connection separately, using the following equations:

$$P_N = \alpha \times P_{COUNTER} + (1-\alpha) P_{N-1}$$

$$f_N = \alpha \times f_{COUNTER} + (1-\alpha) f_{N-1}$$

wherein $P_{COUNTER}$ is the payload in bytes arriving on the given connection during the entire timeframe N, $f_{COUNTER}$ is the total number of packets arriving on the given connection during the entire timeframe N, and $P_N$ and $f_N$ are the filtered values of these parameters at the end of timeframe N. α is a factor between 0 and 1, which determines the rate of response of the IIR filters to changes in the packet frequency and payload values.

In order to respond quickly to high values of the packet frequency and payload values (thereby avoiding false negatives), module 504 may also apply the following equations to the results of the IIR equations:

$$P_N = \text{Max}(P_N, P_{COUNTER})$$

$$f_N = \text{Max}(f_N, f_{COUNTER})$$

The FIS Module

FIS module 506 generally operates similarly to FIS module 62, described hereinabove with reference to FIG. 10. FIS module 506 typically uses as inputs parameters that include the intensity and portion features output by spectrum analyzer module 504. FIS module 506 typically uses six input membership functions, three for each of the two parameters: a non-attack membership function, a potential attack membership function, and an attack membership function. FIS module 506 typically uses three output membership functions: a non-attack membership function, a potential attack membership function, and an attack membership function. FIS module 506 typically uses the fuzzy logic inference methods described herein above with reference to FIG. 13, mutatis mutandis, to derive a single value indicative of a degree of attack, which is passed to stateful connection controller 500.

Reference is again made to FIG. 11. In an embodiment of the present invention, FIS module 506 uses input membership functions 280 for fuzzy analysis of the intensity feature output by spectrum analyzer module 504. In order to adapt input membership functions 280 during each timeframe using information provided by spectrum analyzer module 504, FIS module 506:

sets g1 equal to the noise level generated by spectrum analyzer module 504, as described hereinabove with reference to FIG. 25;

sets g2 equal to the product of the noise level and a first constant, such as 2; and sets g3 equal to the product of the noise level and a second constant greater than the first constant, such as 3.

In addition, FIS module 506 uses input membership functions 280 for fuzzy analysis of the portion feature output by spectrum analyzer module 504. The FIS module typically does not adapt these input membership functions, but instead uses the following constant values: g1=0.1, g2=0.25, and g3=0.4.

In an embodiment of the present invention, FIS module 506 is configurable to support four levels of sensitivity. Based on the sensitivity level, the noise parameter described hereinabove is adjusted, in order to vary the level of sensitivity of the membership functions used by FIS module 506. For this purpose, the FIS module applies a MAX function to limit the lowest level of noise that can be used by FIS module 506. The FIS typically implements this function as follows for each timeframe, prior to adapting the membership functions:

Normal_noise=Max(Sensitivity_level,Normal_noise)

wherein Sensitivity_level is may be defined as:
High—30
Medium—100
Low—300 (large servers—load balancing)
Very Low—600 (very large servers—load balancing), Normal_noise is the noise feature received from spectrum analyzer module 504, as described hereinabove.

The Filtering Module

Filtering module 508 blocks packets from IP addresses included on the current blocking list. The filtering module typically blocks only inbound SYN packets, although it may be configured to block other types of stateful protocol packets, as well. The filtering module is also responsible for determining that an attack has terminated.

Administration and Management

Security system 20 typically supports administration via a central management system. This system includes setup and configuration tools, and real-time monitoring of one or more deployed security systems. The management system typically includes monitoring capabilities such as:
display of network topology;
display of security status of each managed element; and
presentation of detailed attack information, including attack source and destination, severity, and timing.

The management system typically supports generation of reports such as:
top attackers;
attack distribution by type; and
network behavior statistics.

Network flood controller 60 and stateful connection controller 500 typically send notifications to the central management system based on the current states of the controllers. This approach generally minimizes the number of notifications sent, and prevents the administrator from being exposed to excessive unnecessary information.

Default Learning Configuration

Reference is now made to FIG. 26, which presents table 900, setting forth default values useful for determining baseline parameters prior to or in place of the automated learning process carried out by module 66, in accordance with an embodiment of the present invention. As described hereinabove with reference to step 100 of FIG. 3, the baseline parameters of network flood protection module 50 may be set using configurable default values in order to begin network protection prior to performing sufficient baseline learning. In order to apply these default values, the bandwidth of protected network 22 (i.e., of the connection between protected network 22 and WAN 26) is typically provided by an administrator. Alternatively, system 20 may determine the effective bandwidth of the protected network, using techniques known in the art. System 20 typically provides default values for this purpose, which may optionally be modified by the administrator.

Network flood protection module 50 typically determines the baseline frequency (data rate) of each type of packet (UDP, TCP, and ICMP), expressed in bytes (or kilobytes) per second, using the following formula and appropriate default values from table 900:

Baseline frequency=$Q \times Nor \times BW$ wherein Q represent the quota shown in the table, Nor represents the normal factor shown in the table, and BW represents the bandwidth of the protected network. The quota represents the estimated portion of traffic represented by each protocol type of packet. For some applications, e.g., ICMP back-scattering detection, module 50 calculates separate baseline frequencies for inbound and outbound packets (in which case separate inbound and outbound bandwidth values may be used, if applicable).

Network flood protection module 50 typically sets the baseline portion of each type of packet (UDP, TCP, and ICMP) to the appropriate quota value shown in table 900.

Module 50 uses the baseline parameters determined in accordance with table 900 in order to adapt the fuzzy input membership functions, for example as described hereinabove with reference to FIG. 11 in the description of FIS module 62 in network flood module 50.

Although the embodiments described above relate specifically to protection from attack in IP networks, based on particular transport-layer protocols used in such networks, the principles of the present invention may be applied, mutatis mutandis, to protecting against attacks in other types of networks and using other protocols known in the art. It will thus be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

What is claimed is:

1. A method for protecting a network, the method comprising:

measuring in real-time a property of traffic entering the network;

analyzing, by an attack detection module, the property in real-time using at least one detection algorithm in order to detect an attack;

upon detection of the attack, developing, by a signature detection module, a plurality of signatures each of which characterizes packets participating in the detected attack, and organizing the signatures into a group ordered by respective levels of specificity of the signatures for characterizing the packets participating in the attack;

using a filtering algorithm, filtering the traffic entering the network that is characterized by a first one of the signatures having a highest level of specificity among the group of signatures, in order to block traffic participating in the attack and allow filtered traffic to pass into the network;

periodically analyzing, by the attack detection module, the filtered traffic that passed into the network and was not blocked by the filtering algorithm, using the at least one detection algorithm; and upon finding, using a feedback control loop having as input the analysis of the filtered traffic, that the filtering algorithm is not successfully blocking the traffic participating in the attack, increasing a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, and wherein analyzing comprises analyzing the property using the at least one fuzzy logic detection algorithm, wherein measuring the property comprises determining a parameter characteristic of the traffic, and wherein analyzing the property comprises fuzzifying the parameter using an input membership function of the at least one fuzzy logic algorithm, and wherein fuzzifying the parameter comprises determining a degree of membership using the input membership function, and wherein analyzing the property further comprises applying the degree of membership to an output membership function.

2. The method according to claim 1, wherein developing the signatures comprises providing a group of signature types that identify respective packet header fields, counting occurrences of values of each of the packet header fields in the packets of the traffic, and designating a plurality of the values as respective ones of the signatures when respective numbers of the occurrences of the values of respective packet header fields exceed respective thresholds.

3. The method according to claim 2, wherein designating the values as the signatures comprises determining that the respective numbers of occurrences occurred within a certain period of time.

4. The method according to claim 1, wherein the packets have packet header fields, and wherein at least one of the signatures comprises a value of one of the packet header fields.

5. The method according to claim 4, wherein the one of the packet header fields is selected from a list consisting of: Transmission Control Protocol (TCP) sequence number, Internet Protocol (IP) identification number, source port, source IP address, type of service (ToS), packet size, Internet Control Message Protocol (ICMP) message type, destination undefined port, destination undefined IP address, destination defined port, destination defined IP address, time-to-live (TTL), and transport layer checksum.

6. The method according to claim 1, wherein the packets have payloads, and wherein at least one of the signatures comprises a value of one of the packet payloads.

7. The method according to claim 1, wherein analyzing the property comprises detecting a first type of attack, wherein filtering the traffic comprises blocking the traffic participating in the attack of the first type, wherein analyzing the property further comprises analyzing the filtered traffic to detect a second type of attack, and comprising filtering the filtered traffic in order to block the traffic participating in the attack of the second type.

8. The method according to claim 1, wherein analyzing the property comprises determining at least one baseline characteristic of the traffic, and adapting the at least one fuzzy logic algorithm responsively to the baseline characteristic.

9. The method according to claim 8, wherein determining the at least one baseline characteristic comprises applying Infinite Impulse Response (IIR) filtering to at least one parameter of the traffic.

10. The method according to claim 8, wherein determining the at least one baseline characteristic comprises determining separate baseline characteristics for each hour of a week.

11. The method according to claim 8, wherein adapting the at least one fuzzy logic algorithm comprises adapting at least one input membership function of the at least one fuzzy logic algorithm, responsively to the baseline characteristic.

12. The method according to claim 1, wherein analyzing the property comprises setting a parameter of an attack input membership function of the at least one fuzzy logic algorithm responsively to a maximum bandwidth of a connection between the protected network and a wide-area network from which the traffic enters the protected network.

13. The method according to claim 12, wherein analyzing the property comprises setting a further parameter of the attack input membership function responsively to a relation between an average normal rate of packets of the traffic of the certain protocol type and the maximum bandwidth.

14. The method according to claim 1, wherein applying the degree of membership to the output membership function comprises applying the degree of membership to at least one of a non-attack output membership function, a potential attack output membership function of the at least one fuzzy logic algorithm, and an attack output membership function of the at least one fuzzy logic algorithm.

15. The method according to claim 1, wherein analyzing the filtered traffic comprises determining a degree of attack in the filtered traffic, and wherein finding that the filtering algorithm is not successfully blocking the traffic participating in the attack comprises analyzing the degree of attack.

16. The method according to claim 1, and further comprising upon finding, using the feedback control loop, that the filtering algorithm is successfully blocking the traffic participating in the attack, decreasing the level of restrictiveness of the filtering by blocking the traffic entering the network that is characterized by the first one or the second one of the signatures using an "OR" relationship and a sub-signature using an "AND" relationship.

17. Apparatus for protecting a network, the apparatus comprising:
an interface; and
a network security processor, which comprises:
an attack detection module, which is adapted to monitor, via the interface, traffic entering the network, to measure in real-time a property of the traffic, and to analyze the property in real-time using at least one detection algorithm in order to detect an attack;

a signature detection module, which is adapted, upon detection of the attack, to develop a plurality of signatures each of which characterizes packets participating in the detected attack, and to organize the signatures into a group ordered by respective levels of specificity of the signatures for characterizing the packets participating in the attack; and a filtering module, which is adapted to filter, using a filtering algorithm the traffic entering the network that is characterized by a first one of the signatures having a highest level of specificity among the group of signatures, in order to block traffic participating in the attack and allow filtered traffic to pass into the network, wherein the attack detection module is adapted to periodically analyze the filtered traffic that passed into the network and was not blocked by the filtering algorithm, using the at least one detection algorithm, and wherein the network security processor is adapted, upon finding, using a feedback control loop having as input the analysis of the filtered traffic, that the filtering algorithm is not successfully blocking the traffic participating in the attack, to increase a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, and wherein the attack detection module is adapted to analyze the property using the at least one fuzzy logic detection algorithm, wherein the attack detection module is adapted to measure the property by determining a parameter characteristic of the traffic, to analyze the property by fuzzifying the parameter using an input membership function of the at least one fuzzy logic algorithm, to fuzzify the parameter by determining a degree of membership using the input membership function, and to analyze the property by applying the degree of membership to an output membership function.

18. The apparatus according to claim 17, wherein the network security processor is adapted to develop the signatures by providing a group of signature types that identify respective packet header fields, counting occurrences of values of each of the packet header fields in the packets of the traffic, and designating a plurality of the values as respective ones of the signatures when respective numbers of the occurrences of the values of respective packet header fields exceed respective thresholds.

19. The apparatus according to claim 17, wherein the packets have packet header fields, and wherein at least one of the filtering parameters comprises a value of one of the packet header fields.

20. The apparatus according to claim 17, wherein the packets have payloads, and wherein at least one of the filtering parameters comprises a value of one of the packet payloads.

21. The apparatus according to claim 17, wherein the network security processor is not assigned an Internet Protocol (IP) address.

22. The apparatus according to claim 17, wherein the network security processor is adapted to analyze the property in order to detect a level of the attack.

23. The apparatus according to claim 17, wherein the network security processor is adapted to detect a first type of attack, to filter the traffic by blocking the traffic participating in the attack of the first type, to analyze the filtered traffic to detect a second type of attack, and to filter the filtered traffic in order to block the traffic participating in the attack of the second type.

24. The apparatus according to claim 17, wherein the network security processor is adapted to determine at least one baseline characteristic of the traffic, and to adapt the at least one fuzzy logic algorithm responsively to the baseline characteristic.

25. The apparatus according to claim 24, wherein the network security processor is adapted to determine the at least one baseline characteristic by applying Infinite Impulse Response (IIR) filtering to at least one parameter of the traffic.

26. The apparatus according to claim 24, wherein the network security processor is adapted to determine the at least one baseline characteristic by determining separate baseline characteristics for each hour of a week.

27. The apparatus according to claim 24, wherein the network security processor is adapted to adapt at least one input membership function of the at least one fuzzy logic algorithm, responsively to the baseline characteristic.

28. The apparatus according to claim 17, wherein the network security processor is adapted to analyze the property by setting a parameter of an attack input membership function of the at least one fuzzy logic algorithm responsively to a maximum bandwidth of a connection between the protected network and a wide-area network from which the traffic enters the protected network.

29. The apparatus according to claim 28, wherein the network security processor is adapted to analyze the property by setting a further parameter of the attack input membership function responsively to a relation between an average normal rate of packets of the traffic of the certain protocol type and the maximum bandwidth.

30. The apparatus according to claim 17, wherein the network security processor is adapted to determine a parameter characteristic of the traffic, and to fuzzify the parameter using an input membership function of the at least one fuzzy logic algorithm.

31. The apparatus according to claim 30, wherein the input membership function comprises at least one of a non-attack input membership function, a potential attack input membership function, and an attack input membership function.

32. The apparatus according to claim 17, wherein the network security processor is adapted to analyze the filtered traffic by determining a degree of attack in the filtered traffic, and to find that the filtering algorithm is not successfully blocking the traffic participating in the attack by analyzing the degree of attack.

33. The apparatus according to claim 17, wherein the network security processor is adapted to, upon finding, using the feedback control loop, that the filtering algorithm is successfully blocking the traffic participating in the attack, decrease the level of restrictiveness of the filtering by blocking the traffic entering the network that is characterized by the first one or the second one of the signatures using an "OR" relationship and a sub-signature using an "AND" relationship.

34. The apparatus according to claim 17, wherein the attack detection module is adapted to apply the degree of membership to the output membership function by applying the degree of membership to at least one of a non-attack output membership function, a potential attack output membership function of the at least one fuzzy logic algorithm, and an attack output membership function of the at least one fuzzy logic algorithm.

35. A computer software product for protecting a network, the product comprising a tangible computer-readable medium in which program instructions are stored, which instructions, when read by a computer, cause the computer to measure in real-time a property of traffic entering the network, to analyze the property in real-time using at least one detection algorithm in order to detect an attack, upon detection of the attack, to develop a plurality of signatures each of which characterizes packets participating in the detected attack, and to organize the signatures into a group ordered by respective levels of specificity of the signatures for characterizing the packets participating in the attack, to filter, using a filtering algorithm the traffic entering the network that is characterized by a first one of the signatures having a highest level of specificity among the group of signatures, in order to block traffic participating in the attack and allow filtered traffic to pass into the network, to periodically analyze the filtered traffic that passed into the network and was not blocked by the filtering algorithm, using the at least one detection algorithm, and, upon finding, using a feedback control loop having as input the analysis of the filtered traffic, that the filtering algorithm is not successfully blocking the traffic participating in the attack, to increase a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, and wherein the instructions cause the computer to analyze the property using the at least one fuzzy logic detection algorithm, to measure the property by determining a parameter characteristic of the traffic, to analyze the property by fuzzifying the parameter using an input membership function of the at least one fuzzy logic algorithm, to fuzzify the parameter by determining a degree of membership using the input membership function, and to analyze the property by applying the degree of membership to an output membership function.

36. The product according to claim 35, wherein the instructions cause the computer to develop the signatures by providing a group of signature types that identify respective packet header fields, counting occurrences of values of each of the packet header fields in the packets of the traffic, and designating a plurality of the values as respective ones of the signatures when respective numbers of the occurrences of the values of respective packet header fields exceed respective thresholds.

37. The product according to claim 35, wherein the packets have packet header fields, and wherein at least one of the filtering parameters comprises a value of one of the packet header fields.

38. The product according to claim 35, wherein the packets have payloads, and wherein at least one of the filtering parameters comprises a value of one of the packet payloads.

39. The product according to claim 35, wherein the instructions cause the computer to analyze the property in order to detect a level of the attack.

40. The product according to claim 35, wherein the instructions cause the computer to detect a first type of attack, to filter the traffic by blocking the traffic participating in the attack of the first type, to analyze the filtered traffic to detect a second type of attack, and to filter the filtered traffic in order to block the traffic participating in the attack of the second type.

41. The product according to claim 35, wherein the instructions cause the computer to determine at least one baseline characteristic of the traffic, and to adapt the at least one fuzzy logic algorithm responsively to the baseline characteristic.

42. The product according to claim 41, wherein the instructions cause the computer to determine the at least one baseline characteristic by applying Infinite Impulse Response (IIR) filtering to at least one parameter of the traffic.

43. The product according to claim 41, wherein the instructions cause the computer to determine the at least one baseline characteristic by determining separate baseline characteristics for each hour of a week.

44. The product according to claim 41, wherein the instructions cause the computer to adapt at least one input membership function of the at least one fuzzy logic algorithm, responsively to the baseline characteristic.

45. The product according to claim 35, wherein the instructions cause the computer to analyze the property by setting a parameter of an attack input membership function of the at least one fuzzy logic algorithm responsively to a maximum bandwidth of a connection between the protected network and a wide-area network from which the traffic enters the protected network.

46. The product according to claim 45, wherein the instructions cause the computer to analyze the property by setting a further parameter of the attack input membership function responsively to a relation between an average normal rate of packets of the traffic of the certain protocol type and the maximum bandwidth.

47. The product according to claim 35, wherein the instructions cause the computer to determine a parameter characteristic of the traffic, and to fuzzify the parameter using an input membership function of the at least one fuzzy logic algorithm.

48. The product according to claim 47, wherein the input membership function comprises at least one of a non-attack input membership function, a potential attack input membership function, and an attack input membership function.

49. The product according to claim 35, wherein the instructions cause the computer to analyze the filtered traffic by determining a degree of attack in the filtered traffic, and to find that the filtering algorithm is not successfully blocking the traffic participating in the attack by analyzing the degree of attack.

50. The product according to claim 35, wherein the instructions cause the computer to, upon finding, using the feedback control loop, that the filtering algorithm is successfully blocking the traffic participating in the attack, decrease the level of restrictiveness of the filtering by blocking the traffic entering the network that is characterized by the first one or the second one of the signatures using an "OR" relationship and a sub-signature using an "AND" relationship.

51. The product according to claim 35, wherein the instructions cause the computer to apply the degree of membership to the output membership function by applying the degree of membership to at least one of a non-attack output membership function, a potential attack output membership function of the at least one fuzzy logic algorithm, and an attack output membership function of the at least one fuzzy logic algorithm.

52. A method for protecting a network, the method comprising:
measuring in real-time a property of traffic entering the network;
analyzing, by an attack detection module, the property in real-time using at least one detection algorithm in order to detect an attack;

upon detection of the attack, developing, by a signature detection module, a plurality of signatures each of which characterizes packets participating in the detected attack, and organizing the signatures into a group ordered by respective levels of specificity of the signatures for characterizing the packets participating in the attack;

using a filtering algorithm, filtering the traffic entering the network that is characterized by a first one of the signatures having a highest level of specificity among the group of signatures, in order to block traffic participating in the attack and allow filtered traffic to pass into the network;

periodically analyzing, by the attack detection module, the filtered traffic that passed into the network and was not blocked by the filtering algorithm, using the at least one detection algorithm; and upon finding, using a feedback control loop having as input the analysis of the filtered traffic, that the filtering algorithm is not successfully blocking the traffic participating in the attack, increasing a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, and wherein analyzing comprises analyzing the property using the at least one fuzzy logic detection algorithm, wherein measuring the property comprises determining a parameter characteristic of the traffic, and wherein analyzing the property comprises fuzzifying the parameter using an input membership function of the at least one fuzzy logic algorithm, and wherein determining the parameter comprises measuring a first parameter and a second parameter characteristic of the traffic, and wherein fuzzifying the parameter comprises:

fuzzifying the first parameter and the second parameter using the input membership function, so as to determine a first degree of membership and a second degree of membership in the input membership function for the first parameter and the second parameter, respectively; and combining the first degree of membership and the second degree of membership in order to determine a combined degree of membership.

53. The method according to claim 52, wherein combining the first degree of membership and the second degree of membership comprises determining the combined degree of membership using a logical OR operation.

54. The method according to claim 52, wherein analyzing the property further comprises applying the combined degree of membership to an output membership function.

55. The method according to claim 54, wherein applying the combined degree of membership comprises applying a truncation fuzzy implication rule.

56. Apparatus for protecting a network, the apparatus comprising:
an interface; and
a network security processor, which comprises:
an attack detection module, which is adapted to monitor, via the interface, traffic entering the network, to measure in real-time a property of the traffic, and to analyze the property in real-time using at least one detection algorithm in order to detect an attack;

a signature detection module, which is adapted, upon detection of the attack, to develop a plurality of signatures each of which characterizes packets participating in the detected attack, and to organize the signatures into a group ordered by respective levels of specificity of the signatures for characterizing the packets participating in the attack; and a filtering module, which is adapted to filter, using a filtering algorithm the traffic entering the network that is characterized by a first one of the signatures having a highest level of specificity among the group of signatures, in order to block traffic participating in the attack and allow filtered traffic to pass into the network, wherein the attack detection module is adapted to periodically analyze the filtered traffic that passed into the network and was not blocked by the filtering algorithm, using the at least one detection algorithm, wherein the network security processor is adapted, upon finding, using a feedback control loop having as input the analysis of the filtered traffic, that the filtering algorithm is not successfully blocking the traffic participating in the attack, to increase a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, and wherein the attack detection module is adapted to analyze the property using the at least one fuzzy logic detection algorithm, and wherein the attack detection module is adapted to measure the property by determining a parameter characteristic of the traffic, to analyze the property by fuzzifying the parameter using an input membership function of the at least one fuzzy logic algorithm, to determine the parameter by measuring a first parameter and a second parameter characteristic of the traffic, and to fuzzify the parameter by:

fuzzifying the first parameter and the second parameter using the input membership function, so as to determine a first degree of membership and a second degree of membership in the input membership function for the first parameter and the second parameter, respectively, and combining the first degree of membership and the second degree of membership in order to determine a combined degree of membership.

57. The apparatus according to claim 56, wherein the attack detection module is adapted to combine the first degree of membership and the second degree of membership by determining the combined degree of membership using a logical OR operation.

58. The apparatus according to claim 56, wherein the attack detection module is adapted to apply the combined degree of membership to an output membership function.

59. The apparatus according to claim 58, wherein the attack detection module is adapted to apply the combined degree of membership by applying a truncation fuzzy implication rule.

60. A computer software product for protecting a network, the product comprising a tangible computer-readable medium in which program instructions are stored, which instructions, when read by a computer, cause the computer to measure in real-time a property of traffic entering the network, to analyze the property in real-time using at least one detection algorithm in order to detect an attack, upon detection of the attack, to develop a plurality of signatures each of which characterizes packets participating in the detected attack, and to organize the signatures into a group ordered by respective levels of specificity of the signatures for characterizing the packets participating in the attack, to filter, using a filtering algorithm the traffic entering the network that is characterized by a first one of the signatures having a highest level of specificity among the group of signatures, in order to block traffic participating in the attack and allow filtered traffic to pass into the network, to periodically analyze the filtered traffic that passed into the network and was not blocked by the filtering algorithm, using the at least one detection algorithm, and, upon finding, using a feedback control loop having as input the analysis of the filtered traffic, that the filtering algorithm is not successfully blocking the traffic participating in the attack, to increase a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, and wherein the instructions cause the computer to analyze the property using the at least one fuzzy logic detection algorithm, to measure the property by determining a parameter characteristic of the traffic, to analyze the property by fuzzifying the parameter using an input membership function of the at least one fuzzy logic algorithm, to determine the parameter by measuring a first parameter and a second parameter characteristic of the traffic, and to fuzzify the parameter by: fuzzifying the first parameter and the second parameter using the input membership function, so as to determine a first degree of membership and a second degree of membership in the input membership function for the first parameter and the second parameter, respectively; and combining the first degree of membership and the second degree of membership in order to determine a combined degree of membership.

61. The product according to claim 60, wherein the instructions cause the computer to combine the first degree of membership and the second degree of membership by determining the combined degree of membership using a logical OR operation.

62. The product according to claim 60, wherein the instructions cause the computer to apply the combined degree of membership to an output membership function.

63. The product according to claim 62, wherein the instructions cause the computer to apply the combined degree of membership by applying a truncation fuzzy implication rule.

64. A method for protecting a network, the method comprising:

measuring in real-time a property of traffic entering the network;

analyzing, by an attack detection module, the property in real-time using at least one detection algorithm in order to detect an attack;

upon detection of the attack, developing, by a signature detection module, a plurality of signatures each of which characterizes packets participating in the detected attack, and organizing the signatures into a group ordered by respective levels of specificity of the signatures for characterizing the packets participating in the attack;

using a filtering algorithm, filtering the traffic entering the network that is characterized by a first one of the signatures having a highest level of specificity among the group of signatures, in order to block traffic participating in the attack and allow filtered traffic to pass into the network;

periodically analyzing, by the attack detection module, the filtered traffic that passed into the network and was not blocked by the filtering algorithm, using the at least one detection algorithm; and upon finding, using a feedback control loop having as input the analysis of the filtered traffic, that the filtering algorithm is not successfully blocking the traffic participating in the attack, increasing a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, and wherein analyzing comprises analyzing the property using the at least one fuzzy logic detection algorithm, and wherein the method comprises measuring an outbound property of traffic exiting the network, wherein analyzing the property comprises analyzing the property of the traffic entering the network using at least a first fuzzy logic algorithm, and analyzing the outbound property using at least a second fuzzy logic algorithm, wherein the traffic entering the network comprises User Datagram Protocol (UDP) packets, and wherein the traffic exiting the network comprises Internet Control Message Protocol (ICMP) packets, and wherein the outbound property comprises a comparison of a number of inbound UDP packets and a number of outbound ICMP packets.

65. Apparatus for protecting a network the apparatus comprising:

an interface: and a network security processor, which comprises:

an attack detection module, which is adapted to monitor, via the interface, traffic entering the network, to measure in real-time a property of the traffic, and to analyze the property in real-time using at least one detection algorithm in order to detect an attack;

a signature detection module, which is adapted, upon detection of the attack, to develop a plurality of signatures each of which characterizes packets participating in the detected attack, and to organize the signatures into a group ordered by respective levels of specificity of the signatures for characterizing the packets participating in the attack; and a filtering module, which is adapted to filter, using a filtering algorithm the traffic entering the network that is characterized by a first one of the signatures having a highest level of specificity among the group of signatures, in order to block traffic participating in the attack and allow filtered traffic to pass into the network, wherein the attack detection module is adapted to periodically analyze the filtered traffic that passed into the network and was not blocked by the filtering algorithm, using the at least one detection algorithm, wherein the network security processor is adapted, upon finding, using a feedback control loop having as input the analysis of the filtered traffic, that the filtering algorithm is not successfully blocking the traffic participating in the attack, to increase a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, and wherein the attack detection module is adapted to analyze the property using the at least one fuzzy logic detection algorithm, wherein the network security processor is adapted to measure an outbound property of traffic exiting the network, to analyze the property of the traffic entering the network using at least a first fuzzy logic algorithm, and to analyze the outbound property using at least a second fuzzy logic algorithm, wherein the traffic entering the network comprises User Datagram Protocol (UDP) packets, and wherein the traffic exiting the network comprises Internet Control Message Protocol (ICMP) packets, and wherein the outbound property comprises a comparison of a number of inbound UDP packets and a number of outbound ICMP packets.

66. A computer software product for protecting a network, the product comprising a tangible computer-readable medium in which program instructions are stored, which instructions, when read by a computer, cause the computer to measure in real-time a property of traffic entering the network, to analyze the property in real-time using at least one detection algorithm in order to detect an attack, upon detection of the attack, to develop a plurality of signatures each of which characterizes packets participating in the detected attack, and to organize the signatures into a group ordered by respective levels of specificity of the signatures for characterizing the packets participating in the attack, to filter, using a filtering algorithm the traffic entering the network that is characterized by a first one of the signatures having a highest level of specificity among the group of signatures, in order to block traffic participating in the attack and allow filtered traffic to pass into the network, to periodically analyze the filtered traffic that passed into the network and was not blocked by the filtering algorithm, using the at least one detection algorithm, and, upon finding, using a feedback control loop having as input the analysis of the filtered traffic, that the filtering algorithm is not successfully blocking the traffic participating in the attack, to increase a level of restrictiveness of the filtering by blocking the traffic entering the network that is characterized by, using an "OR" relationship, the first one of the signatures or a second one of the signatures having a lower level of specificity than the first one of the signatures, wherein the at least one detection algorithm comprises at least one fuzzy logic detection algorithm, wherein the instructions cause the computer to analyze the property using the at least one fuzzy logic detection algorithm, to measure an outbound property of traffic exiting the network, to analyze the property of the traffic entering the network using at least a first fuzzy logic algorithm, and to analyze the outbound property using at least a second fuzzy logic algorithm, wherein the traffic entering the network comprises User Datagram Protocol (UDP) packets, wherein the traffic exiting the network comprises Internet Control Message Protocol (ICMP) packets, and wherein the outbound property comprises a comparison of a number of inbound UDP packets and a number of outbound ICMP packets.

* * * * *